(12) United States Patent
Loo et al.

(10) Patent No.: US 11,867,980 B2
(45) Date of Patent: *Jan. 9, 2024

(54) SLIP-RESISTANT EYEWEAR SYSTEM

(71) Applicant: LooLoops, LLC, Scottsdale, AZ (US)

(72) Inventors: Kent Chill Loo, Scottsdale, AZ (US); Joseph Pepe Elijio Velasquez, Tempe, AZ (US); Robert James Fulbright, Tempe, AZ (US)

(73) Assignee: LooLoops, LLC, Scottsdale, AZ (US)

( * ) Notice: Subject to any disclaimer, the term of this patent is extended or adjusted under 35 U.S.C. 154(b) by 31 days.

This patent is subject to a terminal disclaimer.

(21) Appl. No.: 17/549,778

(22) Filed: Dec. 13, 2021

(65) Prior Publication Data

US 2022/0099996 A1    Mar. 31, 2022

Related U.S. Application Data

(63) Continuation of application No. 16/597,832, filed on Oct. 9, 2019, now Pat. No. 11,199,724, which is a
(Continued)

(51) Int. Cl.
*G02C 5/12* (2006.01)
*G02C 3/00* (2006.01)
*G02B 7/00* (2021.01)
*G02C 5/14* (2006.01)
*G02C 5/20* (2006.01)
(Continued)

(52) U.S. Cl.
CPC ............. *G02C 3/003* (2013.01); *G02B 7/001* (2013.01); *G02C 3/006* (2013.01); *G02C 5/122* (2013.01); *G02C 5/143* (2013.01); *G02C 5/146* (2013.01); *G02C 5/20* (2013.01); *G02C 5/2227* (2013.01); *G02C 5/2263* (2013.01); *G02C 7/088* (2013.01); *G02C 11/04* (2013.01); *G02C 11/08* (2013.01);
(Continued)

(58) Field of Classification Search
CPC ........ G02C 3/003; G02C 3/006; G02C 5/122; G02C 5/143; G02C 5/146; G02C 5/20; G02C 5/2227; G02C 5/2263; G02C 7/088; G02C 11/04; G02C 11/08; G02C 2200/08; G02C 2200/18; G02C 2200/24; G02C 5/126; G02B 7/001
USPC ............................................ 351/41, 111, 123
See application file for complete search history.

(56) References Cited

U.S. PATENT DOCUMENTS

| 4,045,137 A | 8/1977 | Bradley, Jr. |
| 4,190,334 A | 2/1980 | O'Neil |

(Continued)

FOREIGN PATENT DOCUMENTS

| CN | 202210192 | 5/2012 |
| CN | 204595348 | 8/2015 |

(Continued)

*Primary Examiner* — Tuyen Tra
(74) *Attorney, Agent, or Firm* — Michelle L. Gross, P.C.

(57) ABSTRACT

A slip-resistant eyewear system comprising an angular adjustment screw configured to couple to a first hinge of an eyewear frame such that an angle of the eyewear frame is adjustable relative to a first bow and a unitary eyewear retainer comprising a first end configured to couple to the first bow and a second end configured to couple to a second
(Continued)

US 11,867,980 B2

Page 2 bow such that a tension is maintained on the unitary eyewear retainer when the unitary eyewear retainer extends around a back of a head of a user.

13 Claims, 57 Drawing Sheets

Related U.S. Application Data continuation of application No. 15/379,394, filed on Dec. 14, 2016, now Pat. No. 10,444,534, which is a continuation-in-part of application No. PCT/US2016/059586, filed on Oct. 28, 2016, and a continuation-in-part of application No. 15/263,266, filed on Sep. 12, 2016, now Pat. No. 10,031,345.

(60) Provisional application No. 62/267,558, filed on Dec. 15, 2015.

(51) Int. Cl.
*G02C 5/22* (2006.01)
*G02C 7/08* (2006.01)
*G02C 11/04* (2006.01)
*G02C 11/08* (2006.01)

(52) U.S. Cl.
CPC ..... *G02C 2200/08* (2013.01); *G02C 2200/18* (2013.01); *G02C 2200/24* (2013.01)

(56) References Cited

U.S. PATENT DOCUMENTS

| 4,204,750 | A | 5/1980 | Hilbert | |
|---|---|---|---|---|
| 4,280,758 | A | 7/1981 | Flader | |
| 5,200,771 | A | 4/1993 | Schmolz | |
| 5,737,055 | A | 4/1998 | Dittmeier | |
| 6,474,813 | B1* | 11/2002 | Yeh | G02C 5/2263 351/111 |
| 6,776,483 | B1* | 8/2004 | Wu | G02C 5/2263 351/120 |
| 7,377,664 | B2 | 5/2008 | Waters | |
| 7,635,184 | B2 | 12/2009 | Frahm | |
| 2002/0047985 | A1* | 4/2002 | Hollins | G02C 5/2263 351/114 |
| 2009/0021691 | A1 | 1/2009 | Yang | |
| 2012/0236252 | A1 | 9/2012 | Wang | |
| 2014/0090655 | A1 | 4/2014 | Robinson | |
| 2015/0293379 | A1 | 10/2015 | Votel | |
| 2015/0365757 | A1 | 12/2015 | Abreu | |

FOREIGN PATENT DOCUMENTS

| TW | M 245 439 | 10/2004 |
|---|---|---|
| WO | WO2008103386 | 8/2008 |
| WO | WO 2010021419 | 2/2010 |
| WO | WO2014201500 | 12/2014 |
| WO | WO2016139511 | 9/2016 |

* cited by examiner

SECTION A-A

SLIP-RESISTANT EYEWEAR SYSTEM

CROSS REFERENCE TO RELATED APPLICATIONS

This application is a continuation of and claims priority under Title 35, United States Code, Section 119(e) to U.S. application Ser. No. 16/597,832 entitled "Slip-Resistant Eyewear System" filed on Oct. 9, 2019 to Loo et al. (issued on Dec. 14, 2021 as U.S. Pat. No. 11,199,724) which is a continuation of U.S. application Ser. No. 15/379,394 entitled "Slip-Resistant Eyewear System" filed on Dec. 14, 2016 to Loo et al. (issued on Oct. 15, 2019 as U.S. Pat. No. 10,444,534) which is a continuation in part of U.S. application Ser. No. 15/263,266 entitled "Slip-Resistant Eyewear System" filed on Sep. 12, 2016 to Loo et al. (issued on Jul. 24, 2018 as U.S. Pat. No. 10,031,345), and International Application No. PCT/US2016/059586 filed on Oct. 28, 2016 which claims priority to U.S. provisional patent application Ser. No. 62/267,558 filed Dec. 15, 2015, the contents of which are hereby incorporated by reference in their entirety.

STATEMENT REGARDING FEDERALLY SPONSORED RESEARCH OR DEVELOPMENT

Not applicable to this application.

BACKGROUND

1. Field of the Invention

Example embodiments in general relate to an eyewear system that resists slippage or an unintended change in position when worn by a user.

2. Related Art

Physicians, dentists, veterinarians, jewelers, and many other professionals utilize eyewear such as loupes for magnifying an area on which they are working. It is commonly known among these professionals that loupes are quite heavy even at low magnification powers and can increase in weight substantially as the magnification power desired by the user increases. When loupes are attached to a traditional eyewear frame, the weight of the loupes often causes the eyewear to slide or otherwise change position as the user works and moves, which causes the user to manually readjust the position of the eyewear on the user's face. This problem is compounded for users who have a flat or less pronounced nasal bridge which is a common facial characteristic among certain ancestral heritages.

Conventional solutions to this problem include attaching a cord or other string-like device to the bows of the eyewear frame and securing the cord behind the head of the user to minimize sliding or other movement of the eyewear when in use. This solution, however, leads to hygienic issues as a soft material such as a cord cannot be sanitized to comply with medical and dental sanitization standards and may be touched by the user throughout the course of patient treatment leading to cross-contamination across patients. Tightening a cord behind the user's head can also be quite uncomfortable as the cord must be tightened sufficiently that a great deal of pressure may be applied to the user's face. While such prior solutions are suitable for lightweight eyewear such as, for example, sunglasses, they are not suitable for comfortably securing heavier eyewear such as loupes.

SUMMARY

An example embodiment of the present invention is directed to a slip-resistant eyewear system. The slip-resistant eyewear system includes various features that individually or in combination prevent eyewear from slipping or changing position when worn by a user.

There has thus been outlined, rather broadly, some of the features of the slip-resistant eyewear system in order that the detailed description thereof may be better understood, and in order that the present contribution to the art may be better appreciated. There are additional features of the slip-resistant eyewear system that will be described hereinafter and that will form the subject matter of the claims appended hereto. In this respect, before explaining at least one embodiment of the slip-resistant eyewear system in detail, it is to be understood that the slip-resistant eyewear system is not limited in its application to the details of construction or to the arrangements of the components set forth in the following description or illustrated in the drawings. The slip-resistant eyewear system is capable of other embodiments and of being practiced and carried out in various ways. Also, it is to be understood that the phraseology and terminology employed herein are for the purpose of the description and should not be regarded as limiting.

Implementations of a slip-resistant eyewear system may comprise a tension adjuster configured to couple to a first hinge of the eyewear frame and a first bow, the tension adjuster comprising a housing configured to house an internally threaded barrel that passes at least partially through a spring, the internally threaded barrel and the spring configured to seat at least partially within a first end of a first bow that passes at least partially into the housing and an adjustment screw configured to threadably couple to the internally threaded barrel to adjust a tension of the first bow. The system may further comprise an angular adjustment screw configured to couple to the first hinge of the eyewear such that an angle of the eyewear frame is adjustable relative to the tension adjuster housing and a unitary eyewear retainer comprising a first end configured to couple to the first bow and a second end configured to couple to a second bow such that a tension is maintained on the unitary eyewear retainer when the unitary eyewear retainer extends around a back of a head of a user.

Particular aspects may comprise one or more of the following features. The unitary eyewear retainer may be configured to detach from the first and second bows. The system may further comprise an attachment screw configured to couple a second end of at least one of the first and second bows to at least one of the first and second ends of the unitary eyewear retainer. The second end of at least one of the first and second bows and at least one of the first and second ends of the unitary eyewear retainer may each comprise an attachment opening through which the attachment screw passes to couple the second end of the at least one of the first and second bows and the at least one of the first and second ends of the unitary eyewear retainer. The system may further comprise a light configured to couple to the eyewear frame. The system may further comprise at least one counterweight configured to couple to the unitary eyewear retainer.

Implementations of a slip-resistant eyewear system may comprise an eyewear frame comprising a first hinge and a second hinge coupled to the eyewear frame, the first and second hinges coupled to first and second spring-loaded tension adjusters, respectively. The system may further comprise a first bow and a second bow coupled to the first and second spring-loaded tension adjusters, respectively, and an angular adjustment screw configured to couple to the first hinge of the eyewear such that an angle of the eyewear frame is adjustable relative to the first spring-loaded tension adjuster. The system may further comprise an eyewear retainer comprising a first end configured to couple to the first bow and a second end configured to couple to the second bow such that a tension is maintained on the eyewear retainer when the eyewear retainer extends around a back of a head of a user.

Particular aspects may comprise one or more of the following features. A second end of the first bow may be configured to mate within an opening in a second end of the first bow extension element. The system may further comprise an eyewear retainer extension coupled to and extending from at least one of the eyewear frame and the eyewear retainer, the eyewear retainer extension configured to retain the eyewear around a neck of a user when the eyewear retainer is disengaged. The system may further comprise a light configured to couple to the eyewear frame. At least one of the spring-loaded tension adjuster and the eyewear retainer may comprise a channel configured to pass a power cord of the light there through. The system may further comprise at least one counterweight configured to couple to at least one of the first and second bow extension elements. The system may further comprise a nosepiece comprising a nosepiece material configured to couple to a bridge of an eyewear frame. The system may further comprise a plurality of raised protrusions on an end of the first and second bows distal from the spring-loaded tension adjusters and configured to mate with a plurality of openings in the first and second bow extension elements, respectively.

Implementations of a slip-resistant eyewear system may comprise an eyewear frame comprising a first hinge and a second hinge coupled to the eyewear frame, the first and second hinges coupled to first and second tension adjusters, respectively, and a first bow and a second bow coupled to the first and second tension adjusters, respectively. The system may further comprise an angular adjustment screw configured to couple to the first hinge of the eyewear such that an angle of the eyewear frame is adjustable relative to the first tension adjuster and a unitary eyewear retainer comprising a first end configured to couple to the first bow and a second end configured to couple to a second bow such that a tension is maintained on the unitary eyewear retainer when the unitary eyewear retainer extends around a back of a head of a user.

Particular aspects may comprise one or more of the following features. The system may further comprise an eyewear retainer extension coupled to and extending from at least one of the eyewear frame and the unitary eyewear retainer, the eyewear retainer extension configured to retain the eyewear around a neck of a user when the eyewear retainer is disengaged. The eyewear retainer extension may be configured to detach from the slip-resistant eyewear system. The system may further comprise at least one of a first secondary bow extension element and a second secondary bow extension element extending from the first and second bows, respectively, and configured to couple to first and second ends of the eyewear retainer extension, respectively. At least one of the first and second secondary bow extension elements may be configured to mate within an opening of at least one of the first and second ends of the eyewear retainer extension. A second end of at least one of the first and second bows may comprise a plurality of notches or protrusions configured to mate with a corresponding protrusion or notch within an opening of at least one of the first and second ends of the unitary eyewear retainer.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Brief Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein. Elements and acts in the figures are illustrated for simplicity and have not necessarily been rendered according to any particular sequence or embodiment.

FIG. 41 depicts an exemplary embodiment of a slip-resistant eyewear system comprising a detachable eyewear retainer.

FIGS. 42-43 depict an exemplary structure of an attachment point for the detachable eyewear retainer of FIG. 41.

DETAILED DESCRIPTION

Figure 1:
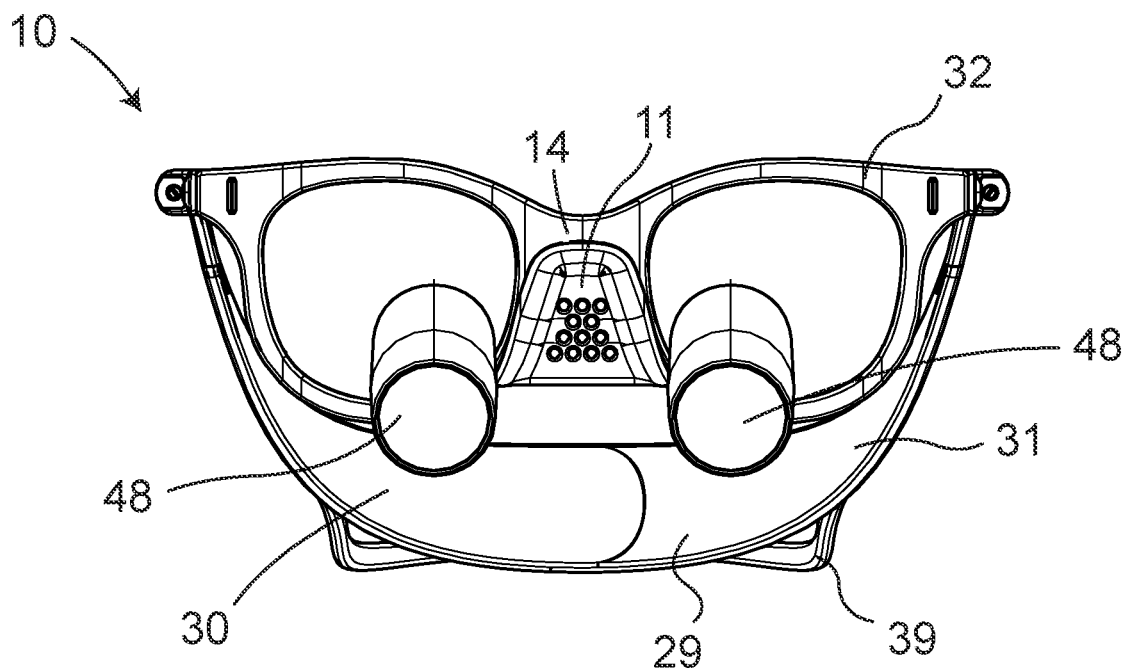
FIG. 1 is a front perspective view of a slip-resistant eyewear system in accordance with an exemplary embodiment.
Figure 2:
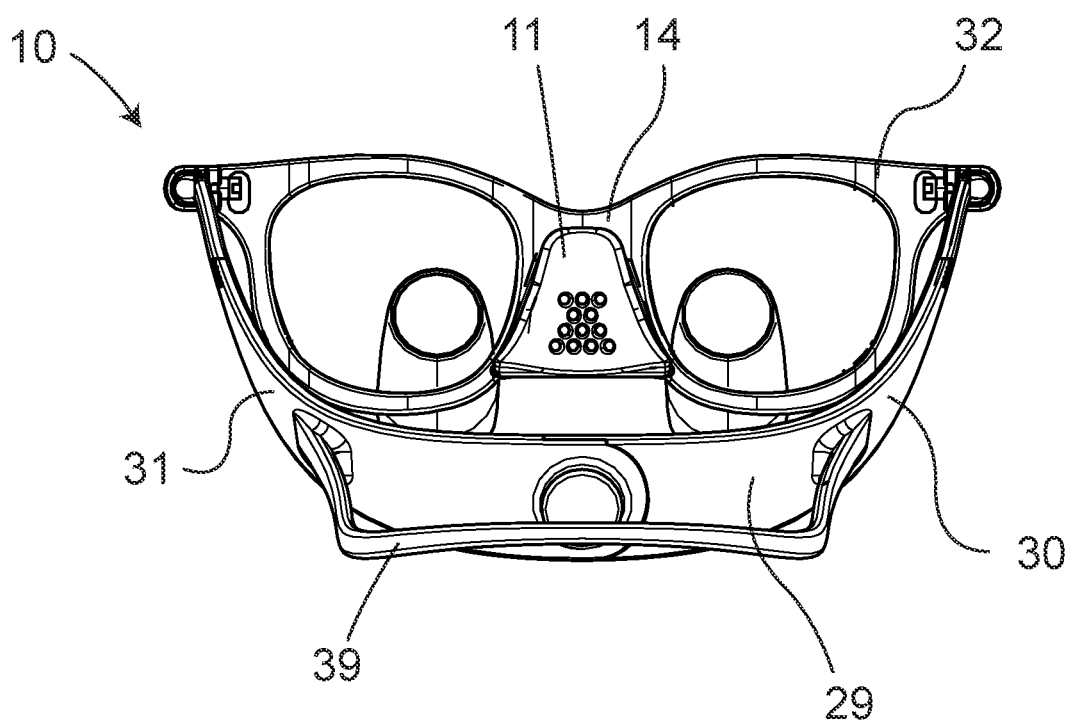
FIG. 2 is a rear perspective view of a slip-resistant eyewear system in accordance with the exemplary embodiment of FIG. 1.
Figure 3:
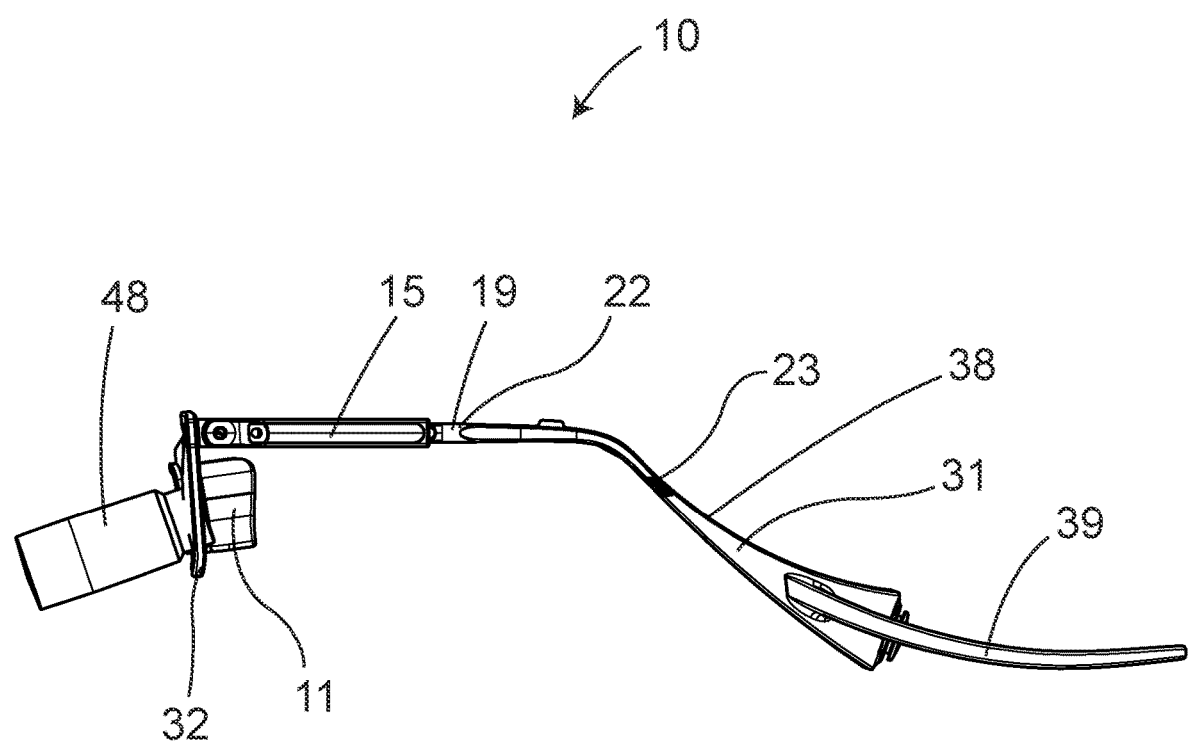
FIG. 3 is a side view of a slip-resistant eyewear system in accordance with the exemplary embodiment of FIGS. 1-2.

Unless otherwise defined, all technical and scientific terms used herein have the same meaning as commonly understood by one of ordinary skill in the art to which this invention belongs. Although methods and materials similar to or equivalent to those described herein can be used in the practice or testing of a slip-resistant eyewear system, suitable methods and materials are described above. All publications, patent applications, patents, and other references mentioned herein are incorporated by reference in their entirety to the extent allowed by applicable law and regulations. The slip-resistant eyewear system may be embodied in other specific forms without departing from the spirit or essential attributes thereof, and it is therefore desired that the present embodiments be considered in all respects as illustrative and not restrictive. Any headings utilized within the description are for convenience only and have no legal or limiting effect.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably.

The features, structures, or characteristics of the invention described throughout this specification may be combined in any suitable manner in one or more embodiments. For example, the usage of the phrases "exemplary embodiments", "some embodiments" or other similar language refers to the fact that a particular feature, structure, or characteristic described in connection with the embodiment may be included in at least one embodiment of the present invention. Thus, appearances of the phrases "exemplary embodiments", "in some embodiments", "in other embodiments" or other similar language, throughout this specification do not necessarily all refer to the same group of embodiments, and the described features, structures, or characteristics may be combined in any suitable manner in one or more embodiments.

FIGS. 1-7 provide an exemplary embodiment of a slip-resistant eyewear system 10 that is designed to remain in place on the face of a user without changing position during use. While it is contemplated that the system may be used with any type of eyewear, such a system may be particularly useful when loupes 48 are employed such as those used in the medical, dental, veterinary, or jewelry industries. While loupes 48 may be of various weights, they are generally heavy as compared to the weight of the eyewear frame 32 which results in conventional eyewear systems sliding downward when the user looks down or changes the position of the user's head in the normal course of viewing a subject at magnification. To prevent this from occurring, embodiments of a slip-resistant eyewear system 10 as disclosed herein may comprise one or more of the elements described throughout this document to retard slippage and retain the eyewear system in a proper position when in use.

Figure 15:
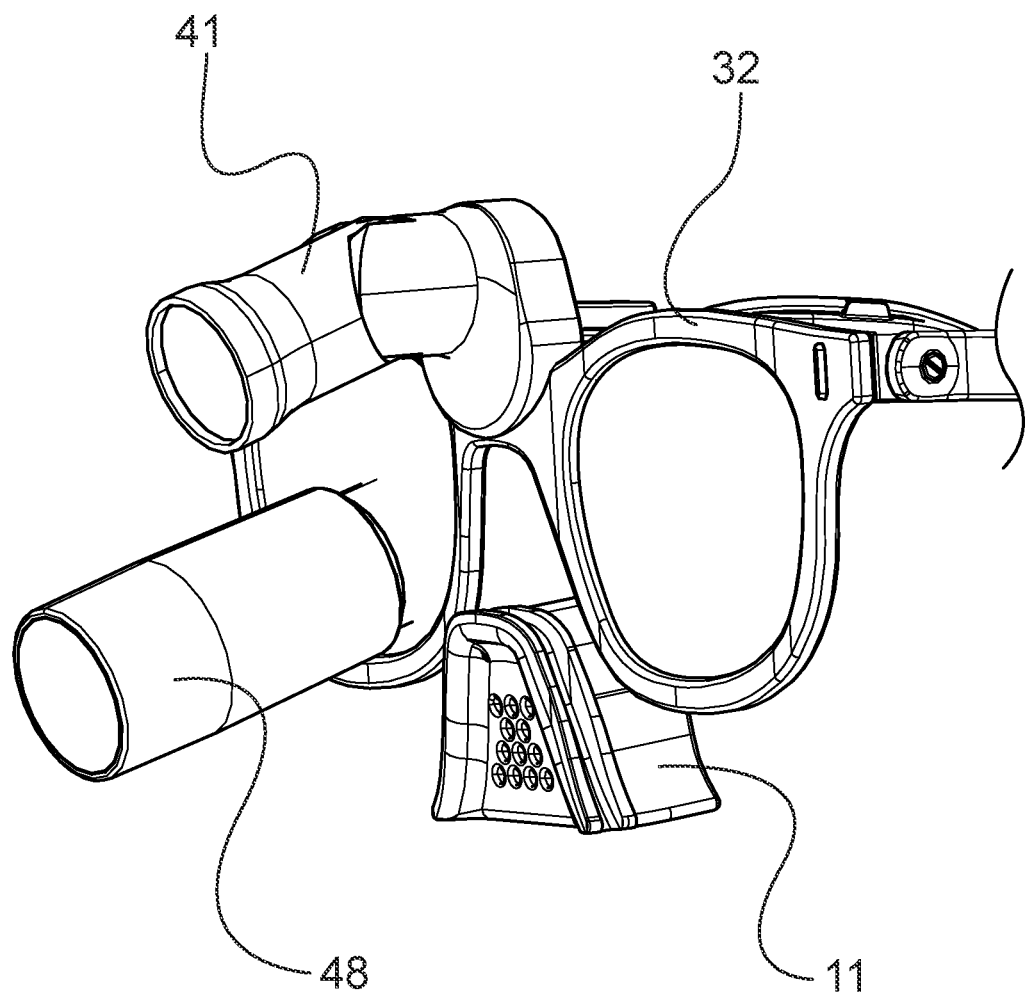
FIG. 15 depicts an exemplary embodiment of a slip-resistant eyewear system comprising a removable nosepiece.
Figure 16:
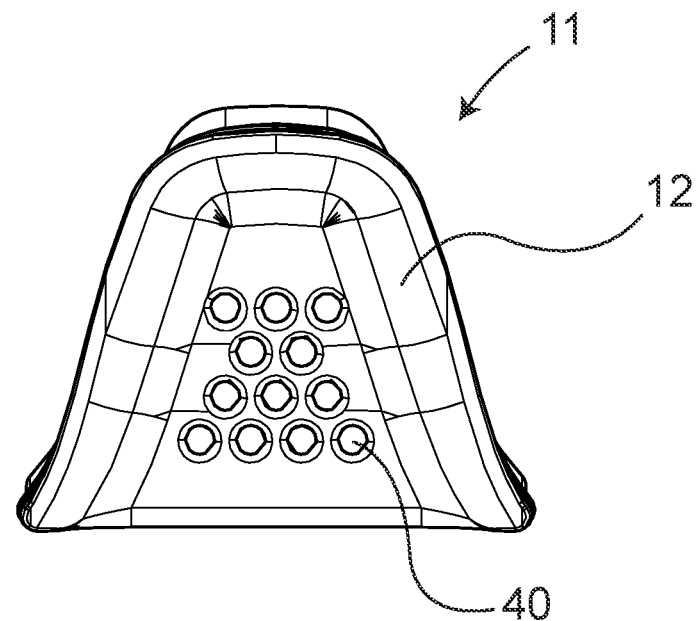
FIGS. 16-23 provide various views of a nosepiece comprising a nosepiece material.
Figure 17:
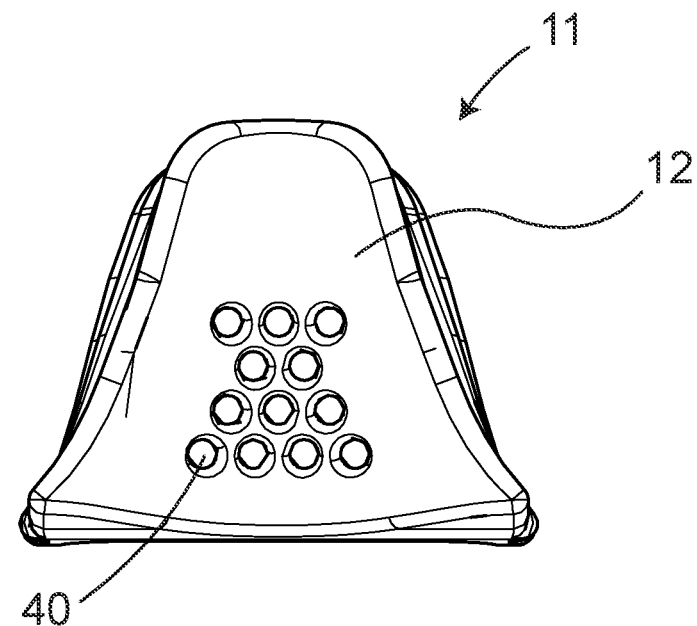
Figure 37:
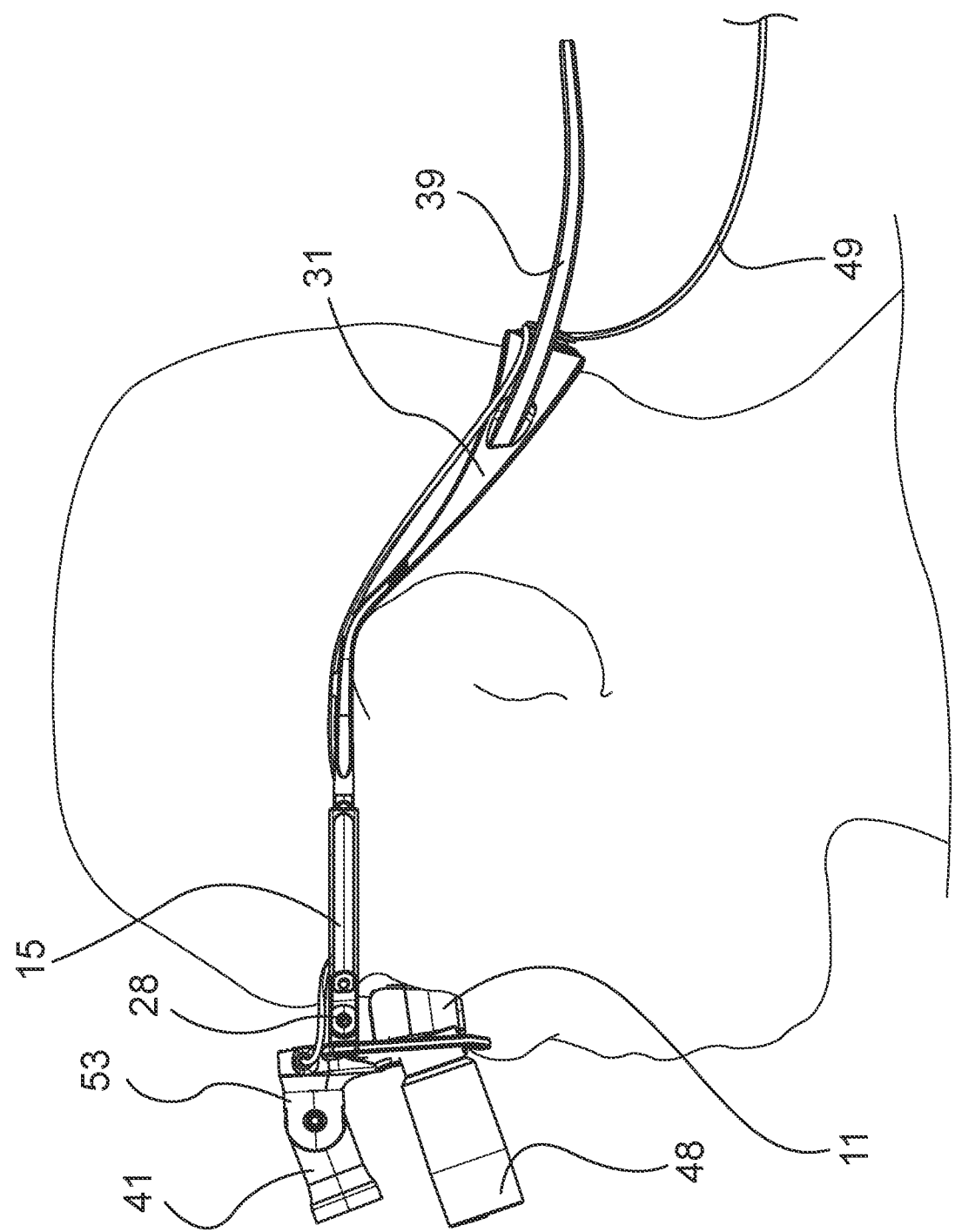
FIGS. 37-39 provide views of a slip-resistant eyewear system in use.
Figure 38:
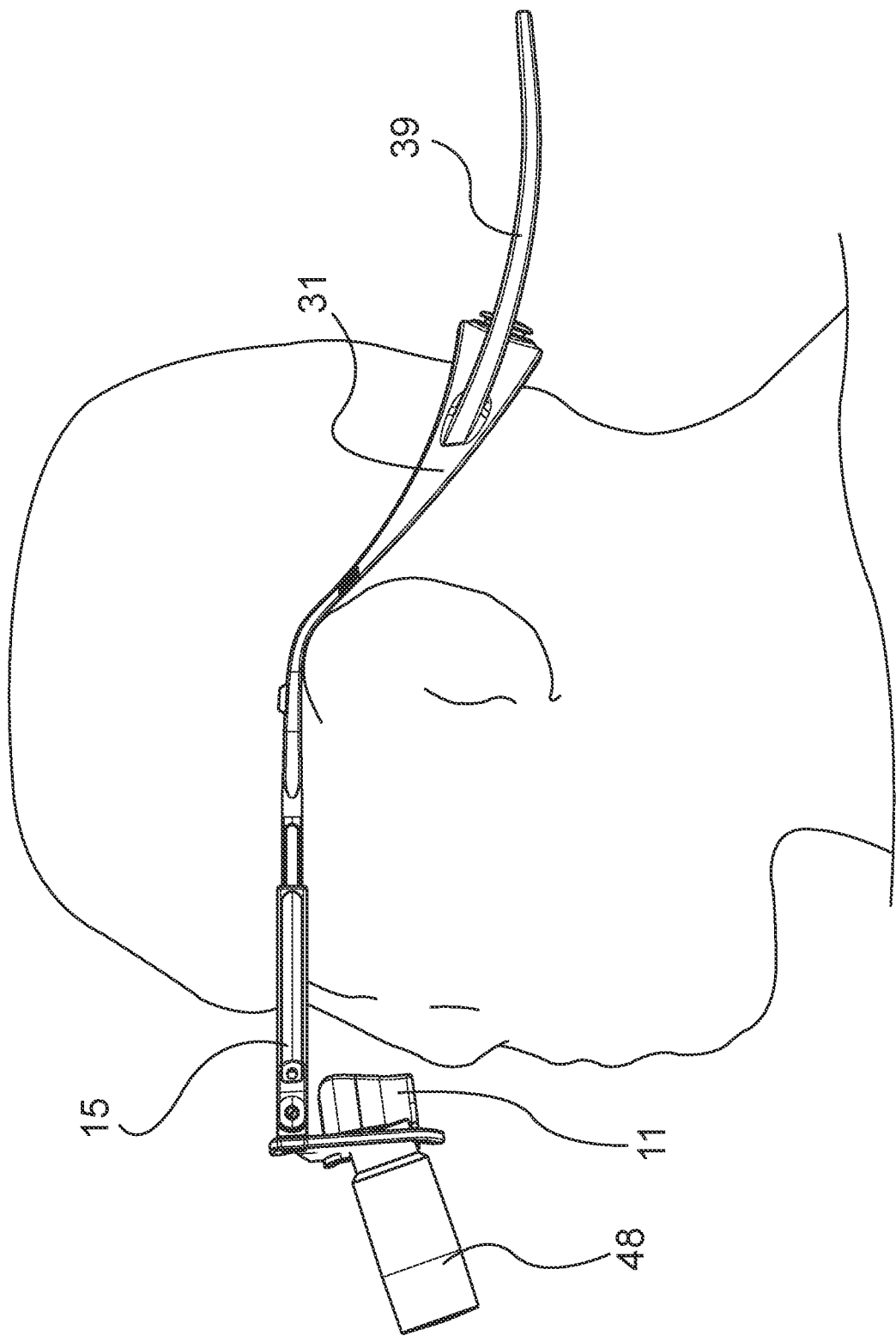
Figure 39:
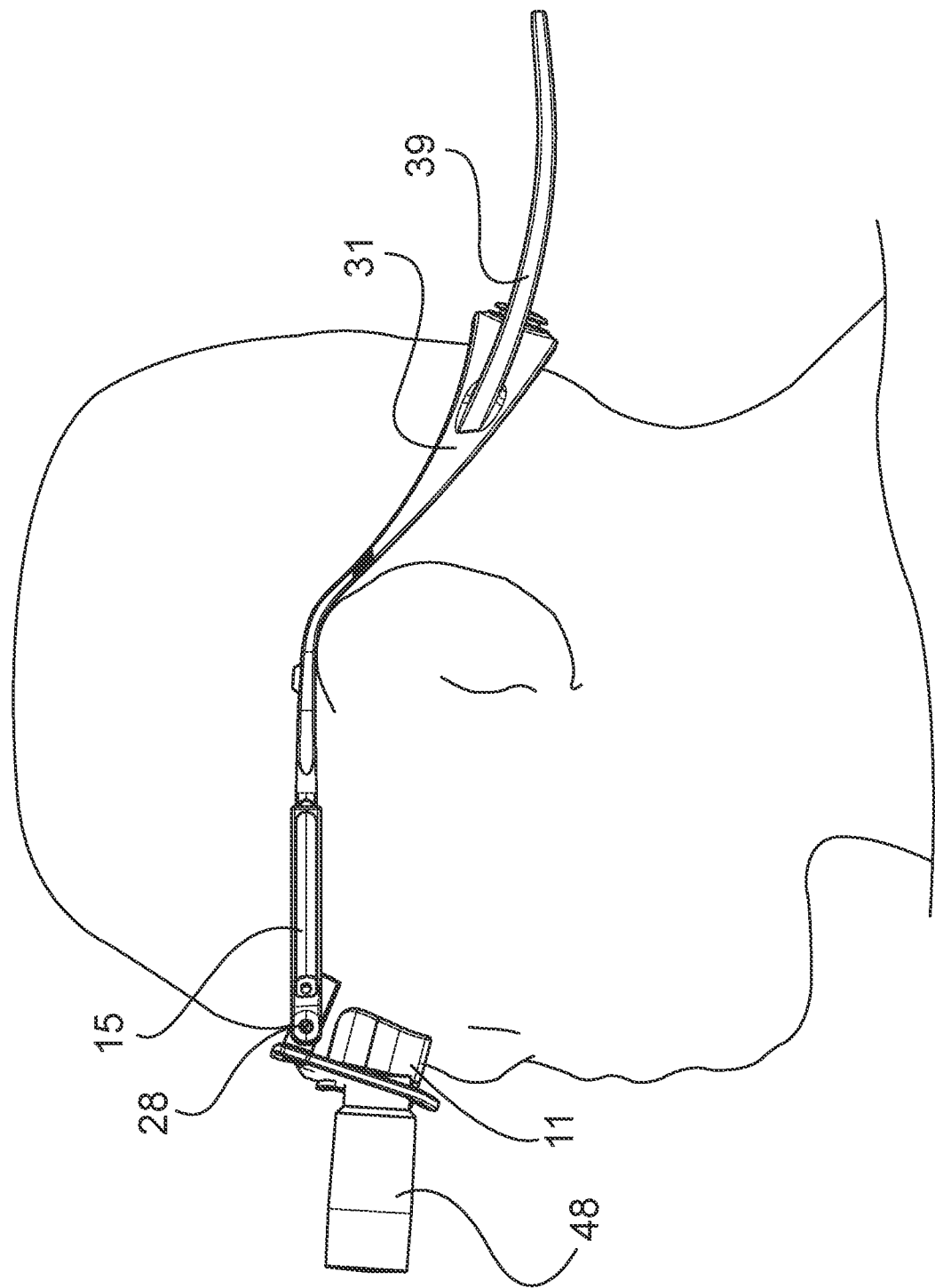

Some embodiments of a slip-resistant eyewear system 10 may comprise a nosepiece 11 that is configured to mate with or otherwise couple to a bridge 14 of an eyewear frame 32. The nosepiece 11 may be detachable as shown in FIG. 15 or alternatively, may be integral to the bridge 14 of the eyewear frame 32. FIGS. 16-21 provide rear, front, side, top and bottom views of an exemplary embodiment of a nosepiece 11. As shown, the nosepiece 11 is comprised of a nosepiece material 12 that may be shaped in accordance with the individual facial features of the user. This may be accomplished by constructing the nosepiece 11 from a moldable material or by three-dimensionally scanning the face of a user and manufacturing the nosepiece 11 to fit the contours of the user's face. This is particularly advantageous when the nosepiece 11 is an element of a slip-resistant eyewear system 10 that is intended to be worn by a user having a flattened or less pronounced nasal bridge, as shown in FIGS. 37-39. By customizing the depth, shape, and contours of the portion of the nosepiece material 12 that will be in contact with the user's face, the nosepiece 11 allows a wearer with a less pronounced nasal bridge to avoid the presence of a gap between the bridge 14 of the eyewear frame 32 and the nasal bridge or other facial surface of the user.

Figure 18:
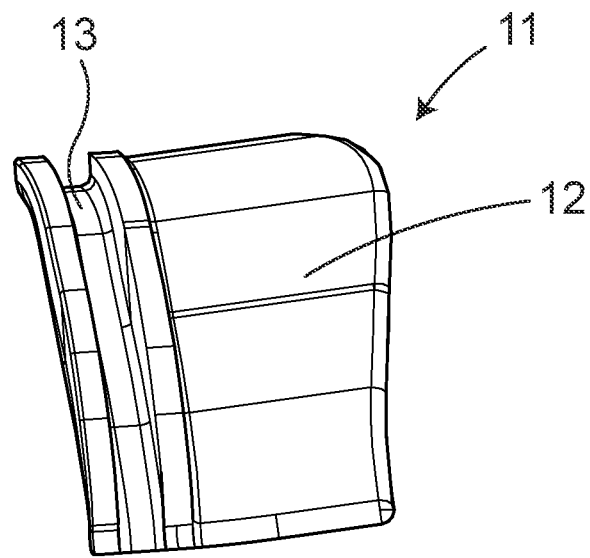
Figure 19:
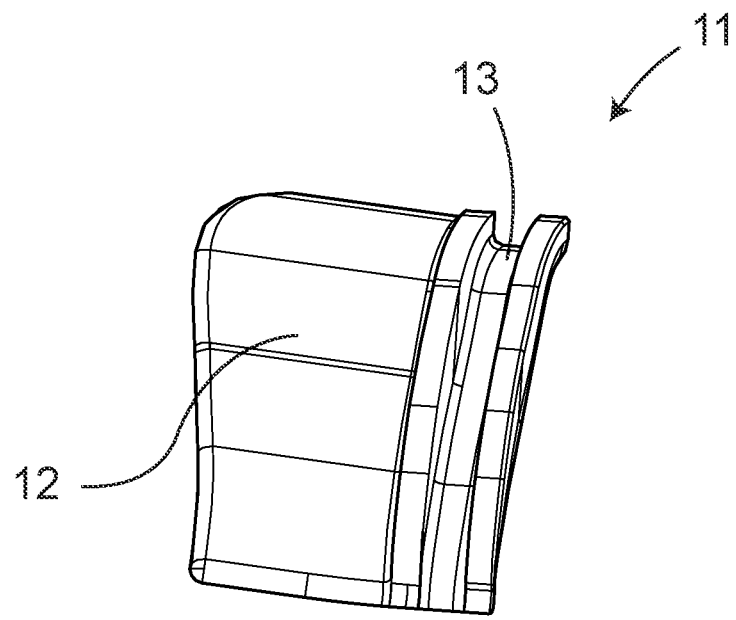
Figure 20:
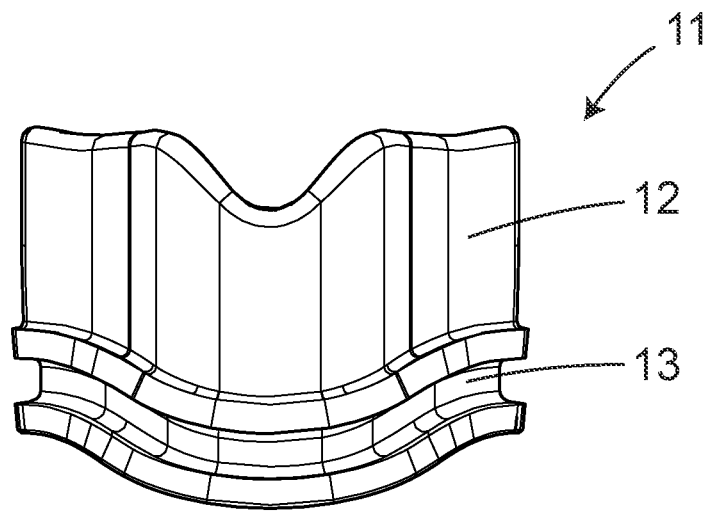
Figure 21:
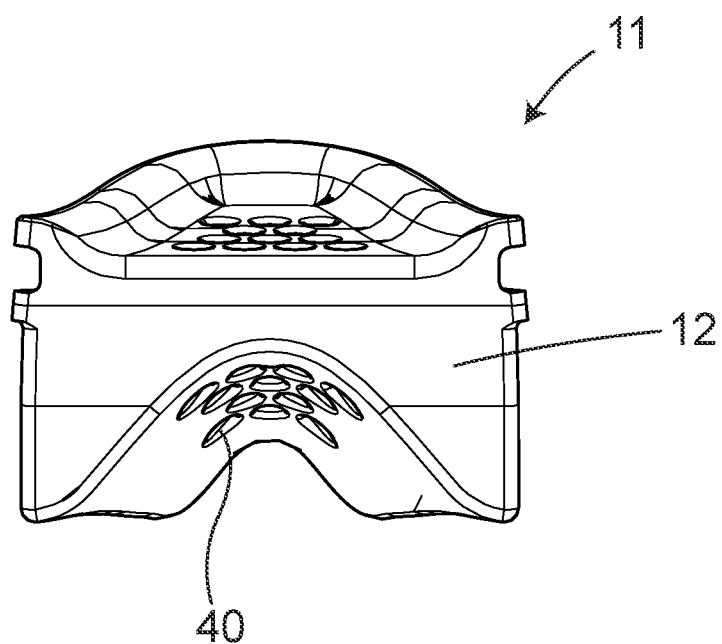
Figure 22:
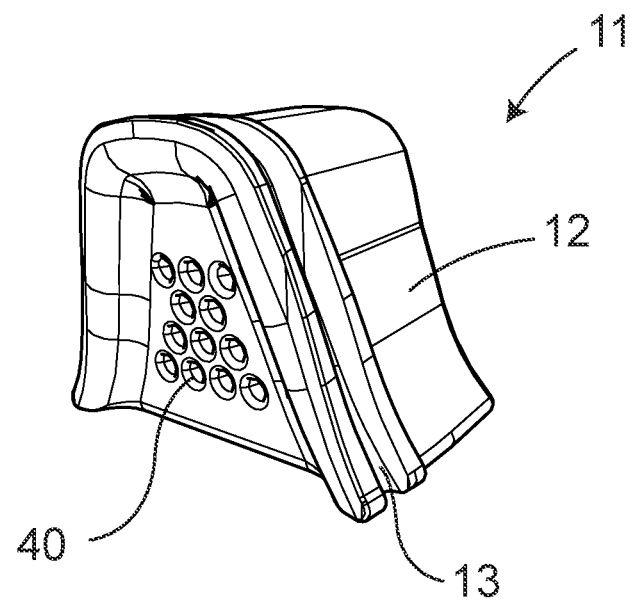
Figure 23:
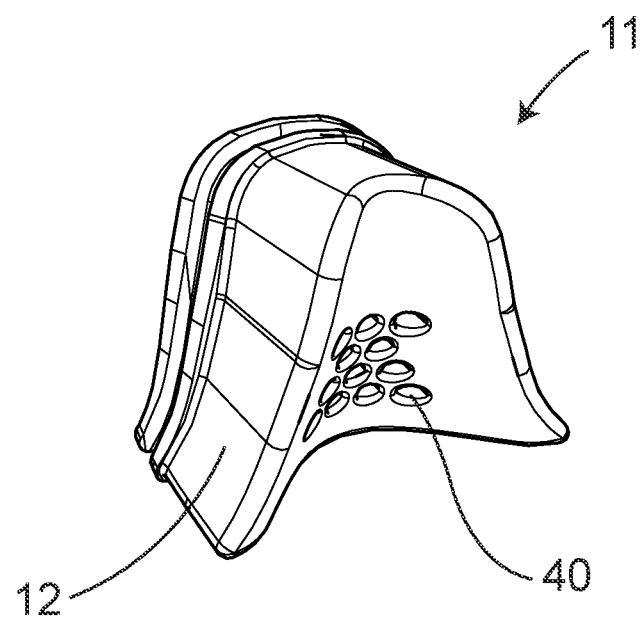
Figure 24:
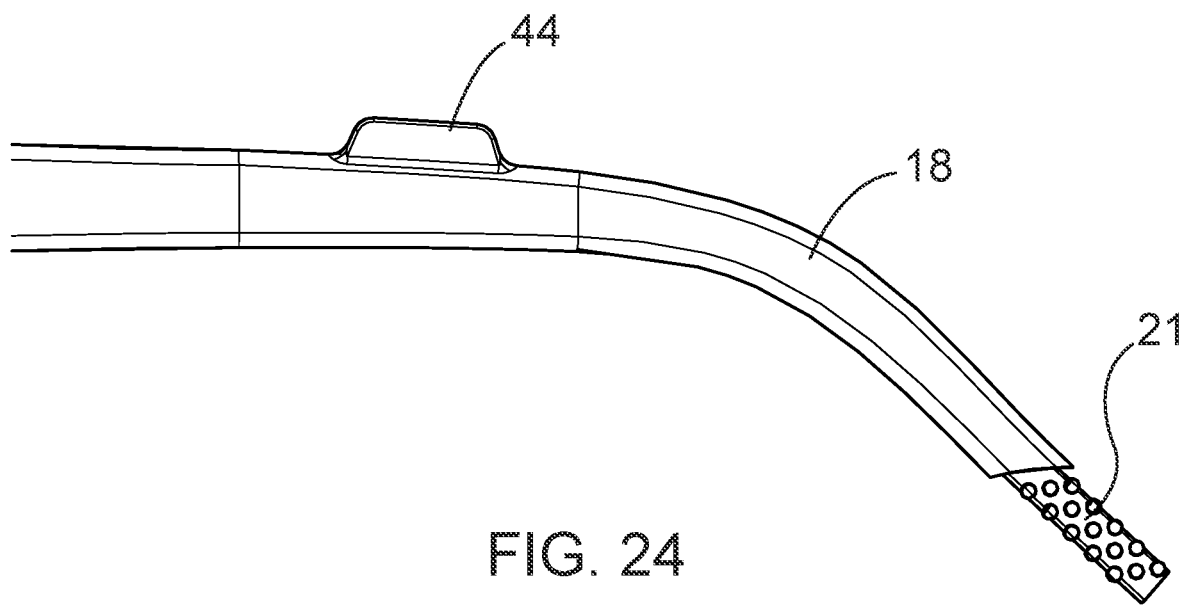
FIG. 24 depicts an exemplary embodiment of a first bow of a slip-resistant eyewear system comprising a clip.
Figure 25:
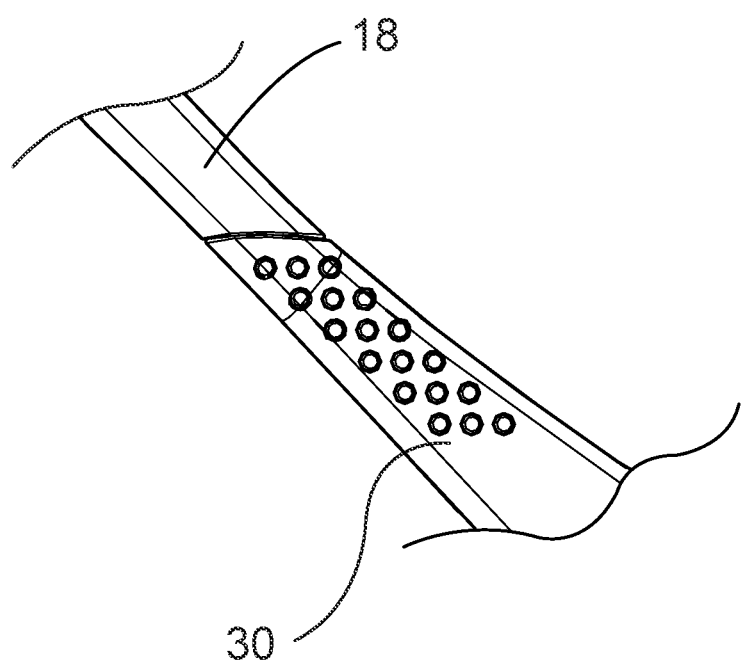
FIGS. 25-27 depict an exemplary embodiment of a first bow and a first bow extension element of a slip-resistant eyewear system.
Figure 26:
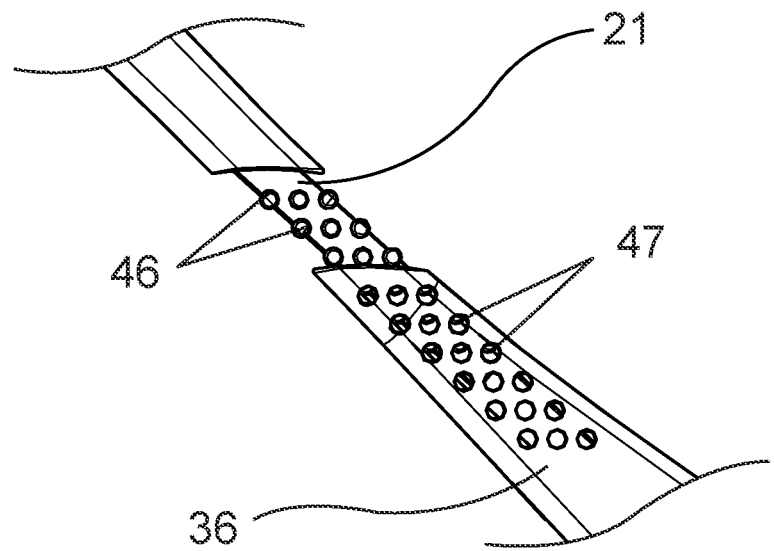
Figure 27:
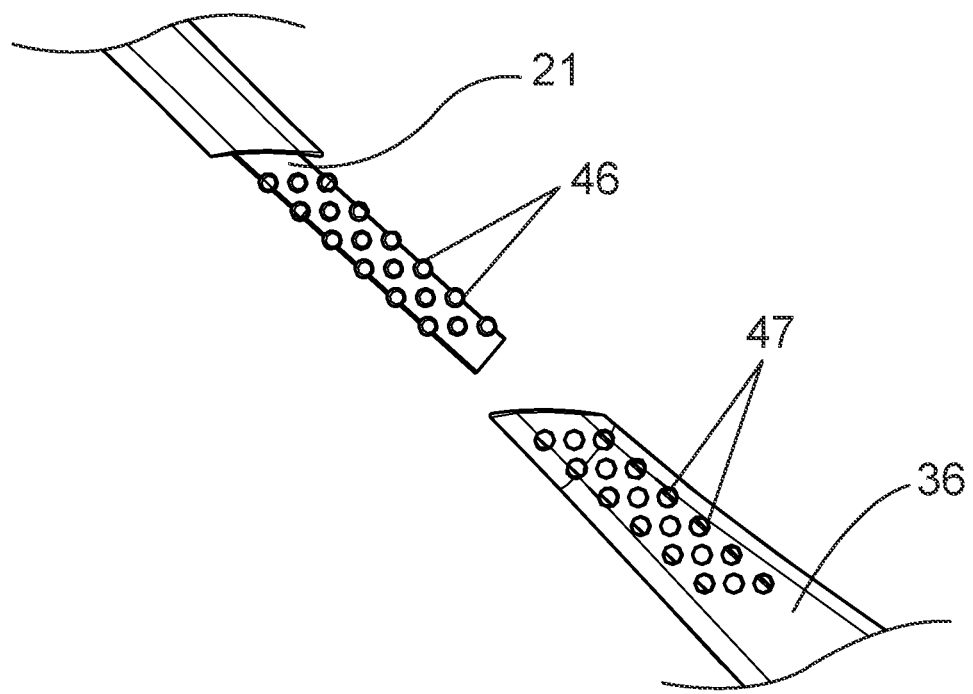

As shown in FIGS. 18-19, the nosepiece 11 may comprise a nosepiece groove 13 running along at least a portion of the top surface of the nosepiece 11. This nosepiece groove 13 is configured to mate with the bridge 14 of the eyewear frame 32 such that the nosepiece 11 is secured to the eyewear frame 32 when the slip-resistant eyewear system 10 is in use. While the nosepiece groove 13 is depicted proximal to the front of the nosepiece 11 as this configuration keeps the nosepiece 11 from protruding excessively past the front of the eyewear frame 32, it is contemplated the nosepiece groove 13 may be located anywhere on the top surface of the nosepiece 11. In some embodiments, it may be preferable that the nosepiece 11 comprises at least one ventilation opening 40, as shown in FIGS. 22-23, to allow air to pass through the nosepiece 11 to enhance the comfort of the user of the slip-resistant eyewear system 10.

Figure 9:
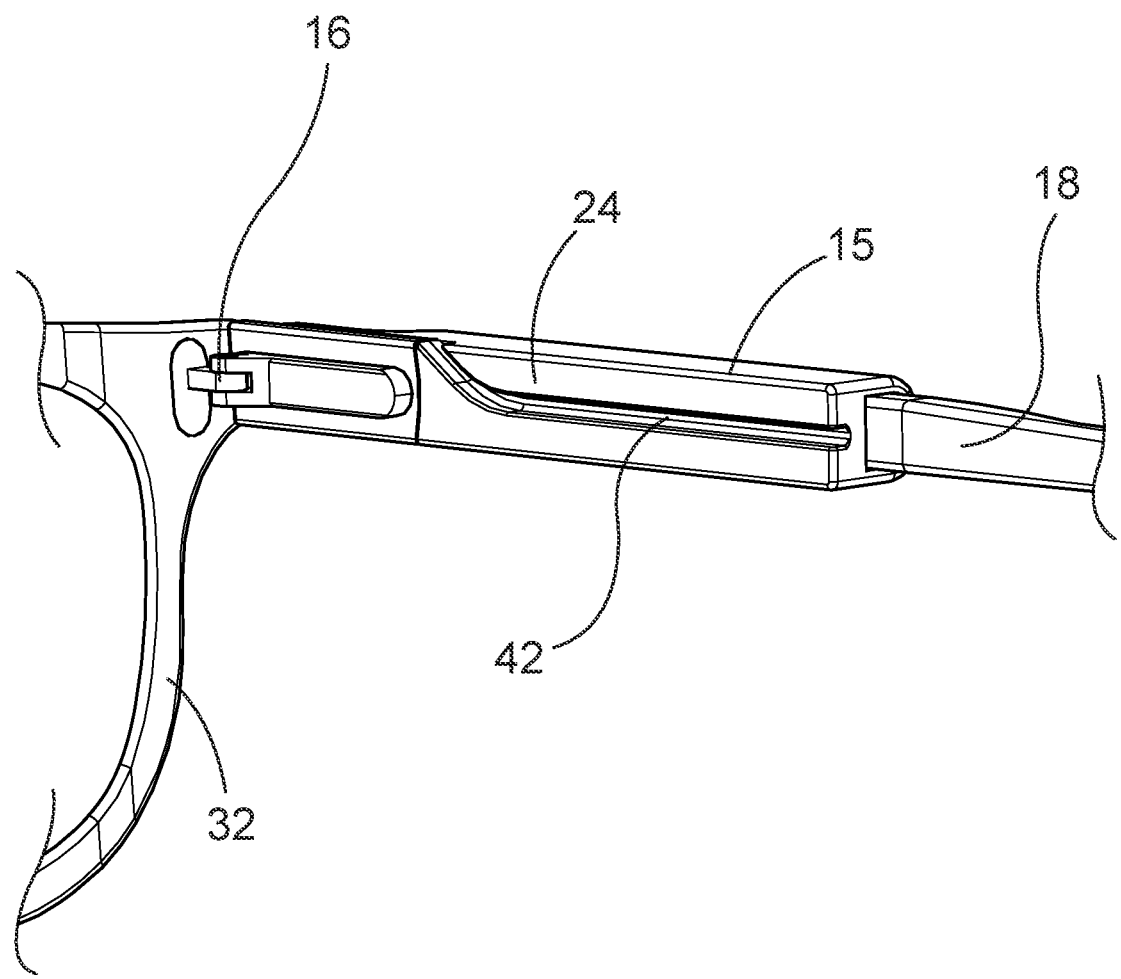
FIG. 9 depicts an exemplary embodiment of a first bow of a slip-resistant eyewear system comprising a channel configured to house a power cord.
Figure 12:
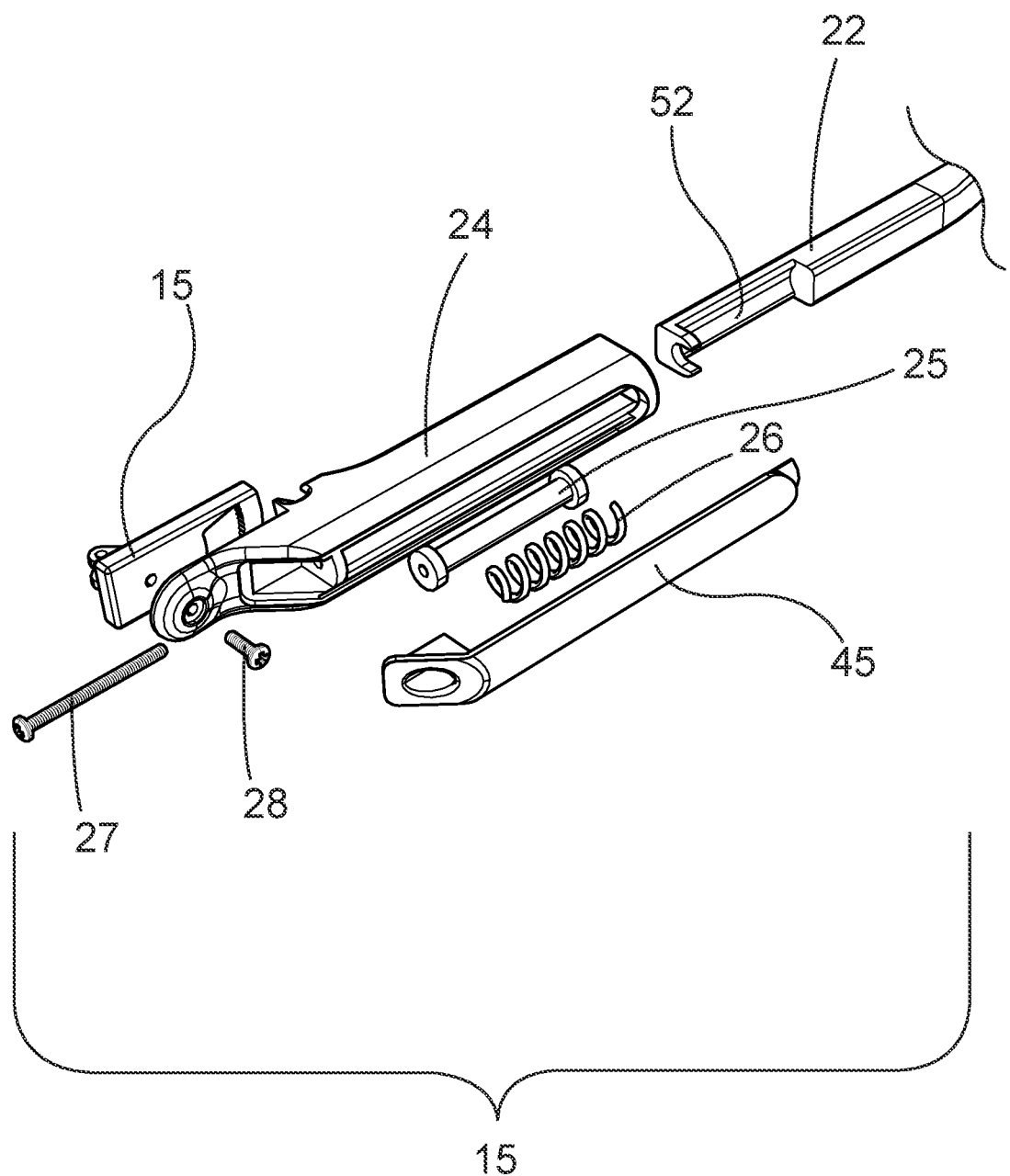
FIGS. 12-14 depict exploded views of an exemplary embodiment of a tension adjuster.
Figure 13:
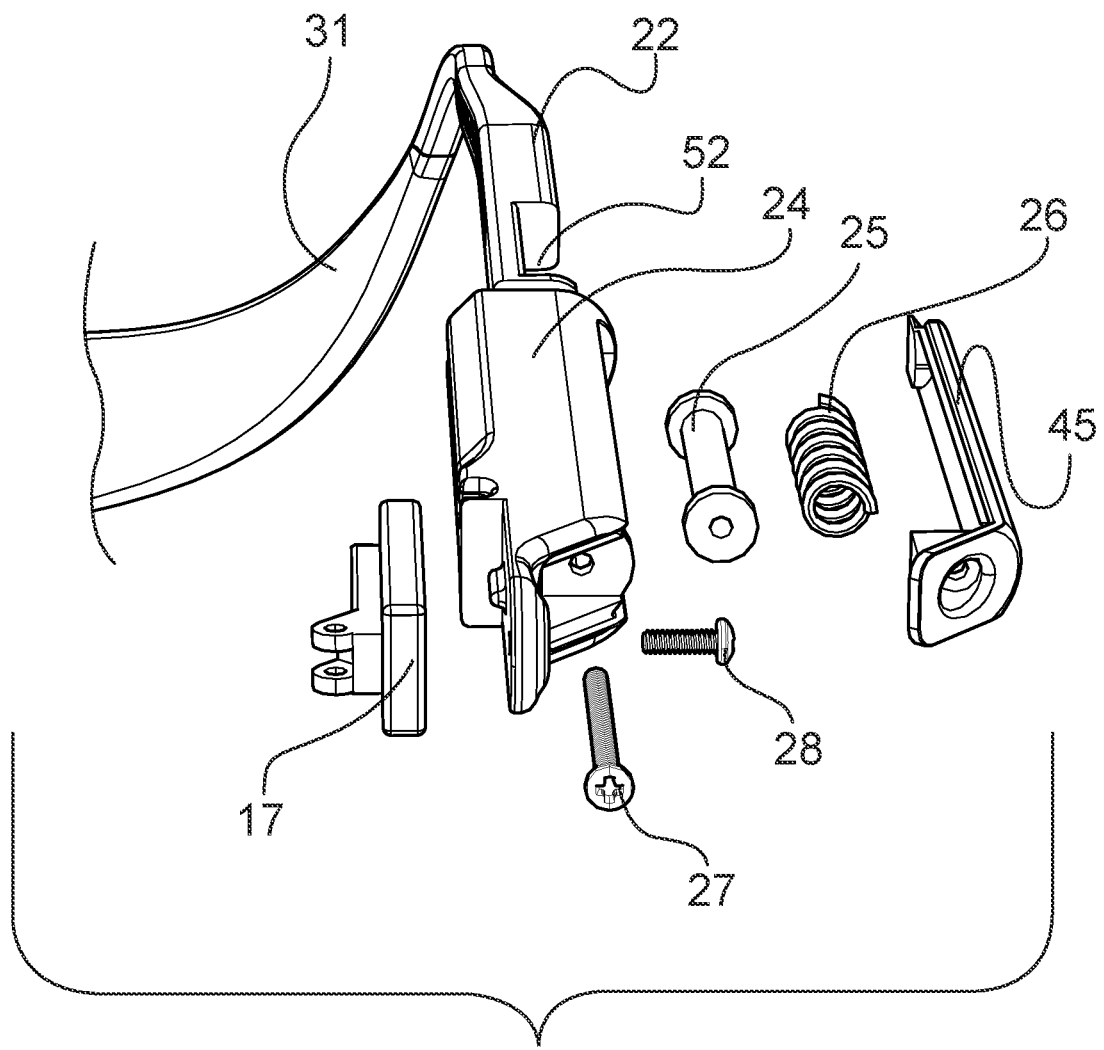
Figure 14:
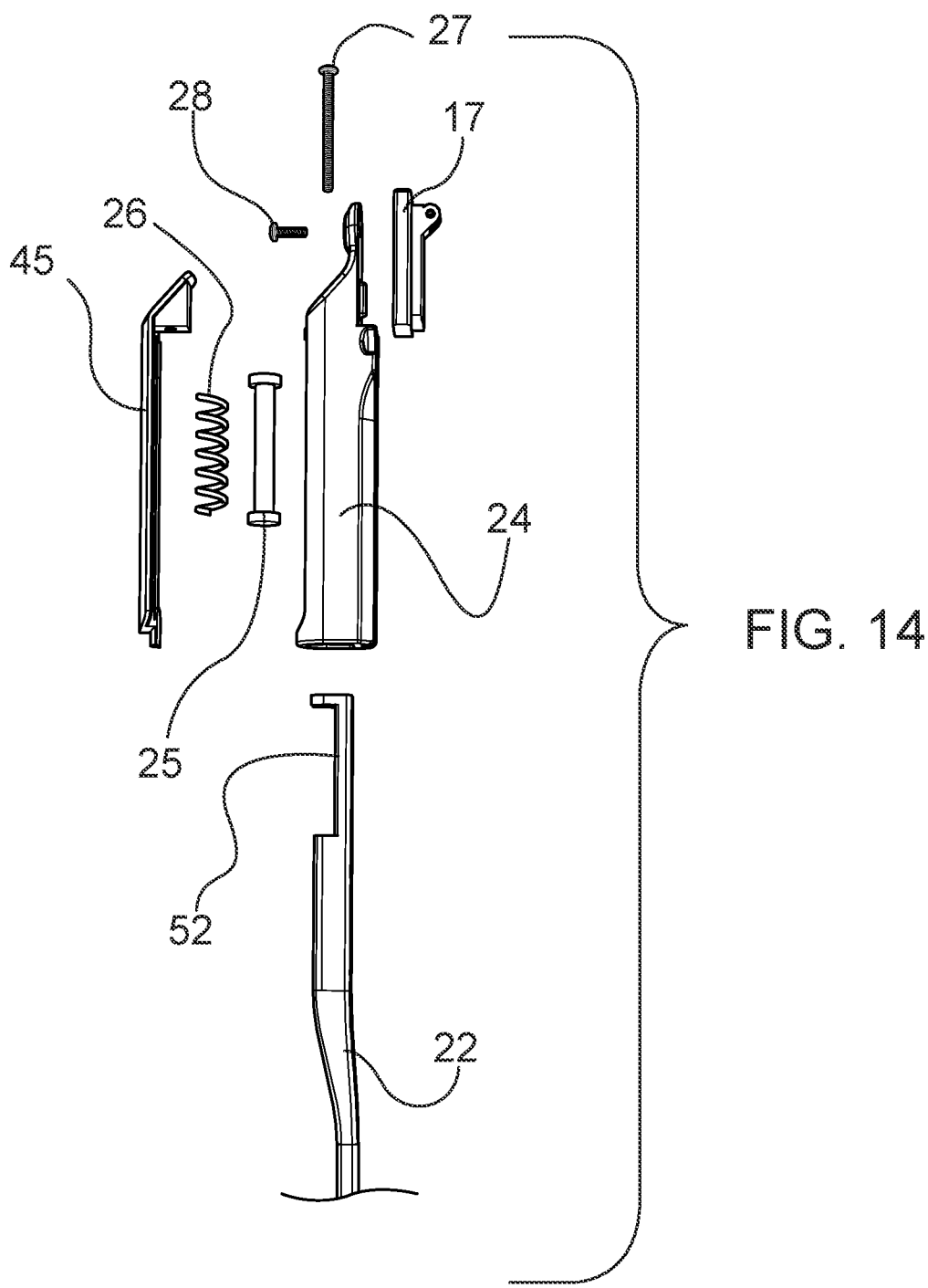
Figure 28:
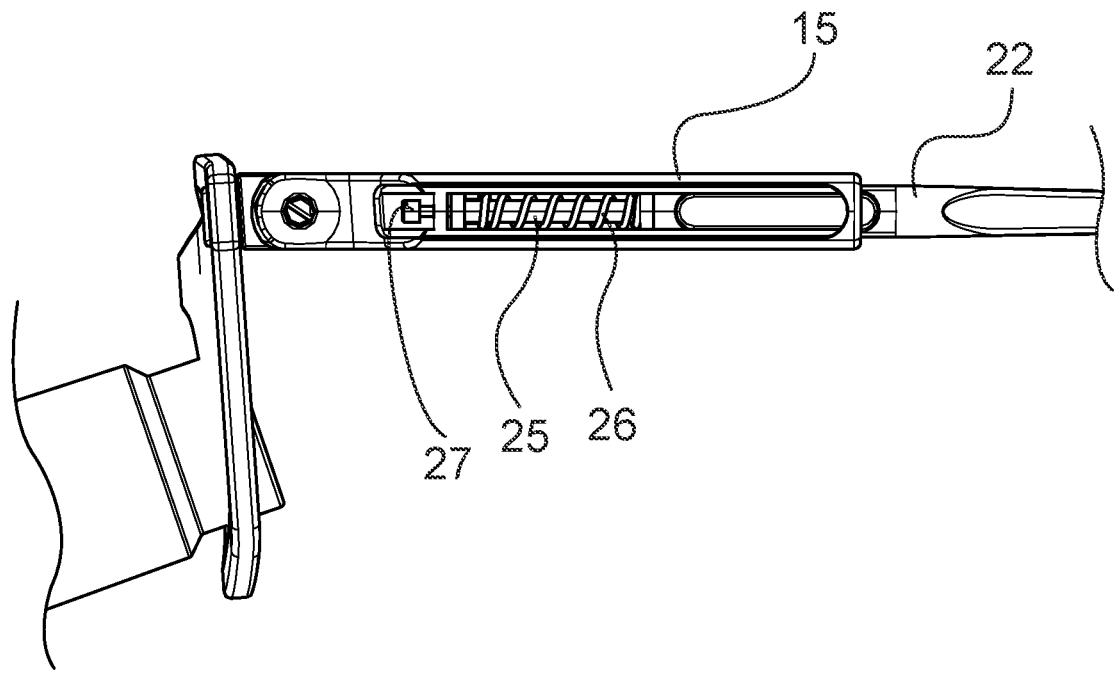
FIGS. 28-29 provide an exemplary embodiment of a tension adjuster as shown on a second bow.
Figure 29:
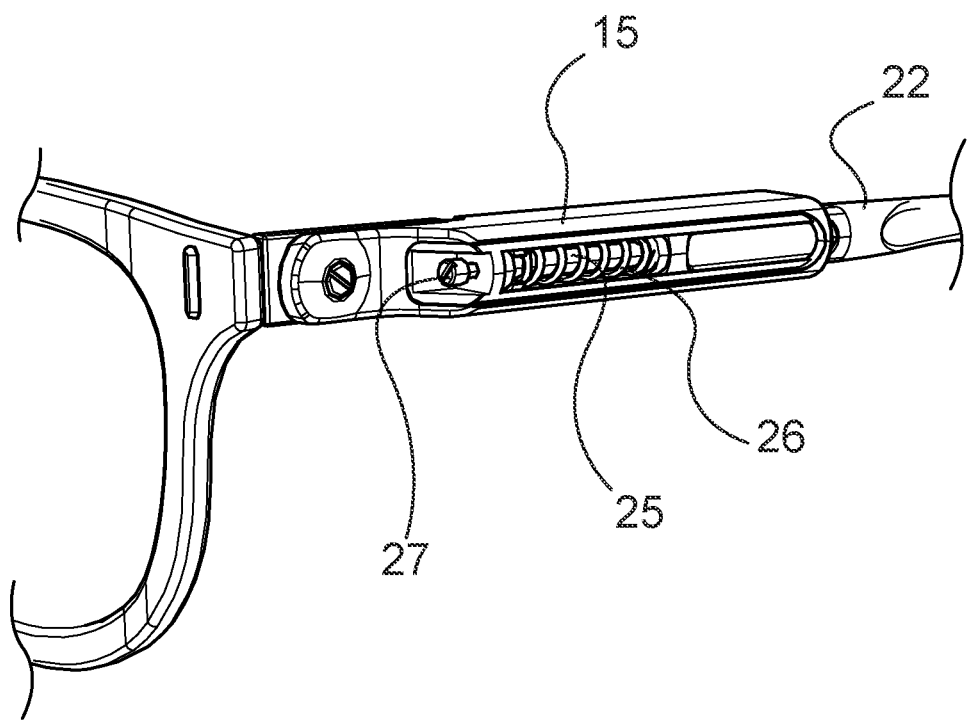
Figure 30:
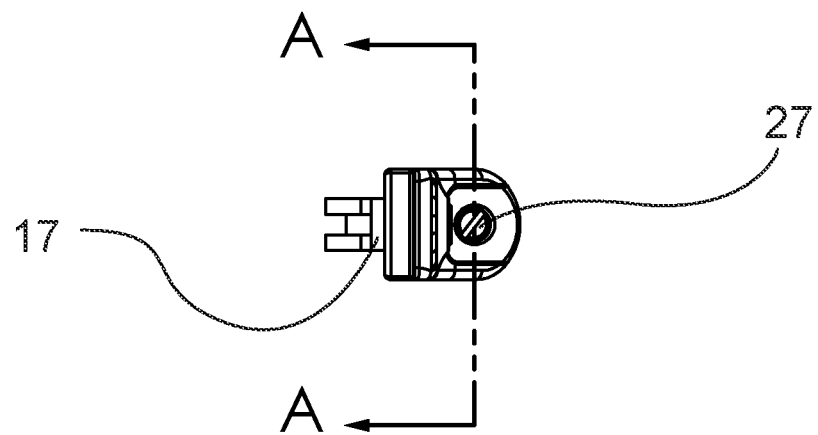
FIGS. 30-34 provide cross-sectional views of a tension adjuster.
Figure 31:
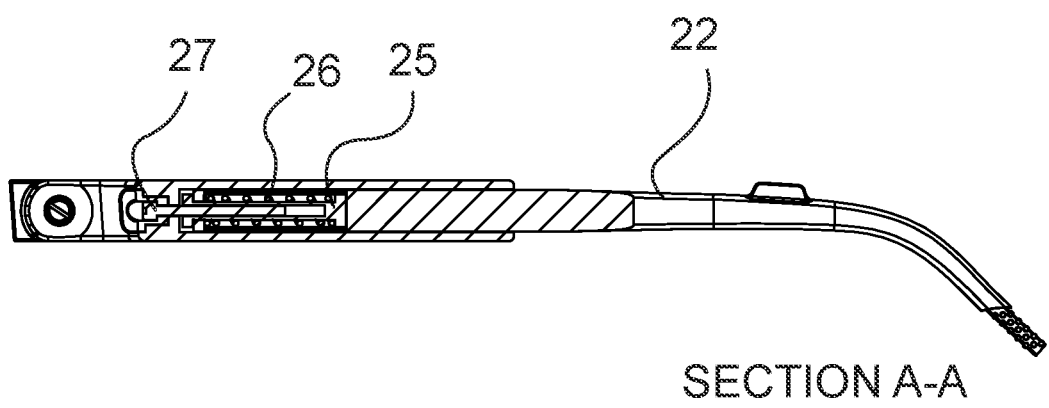
Figure 32:
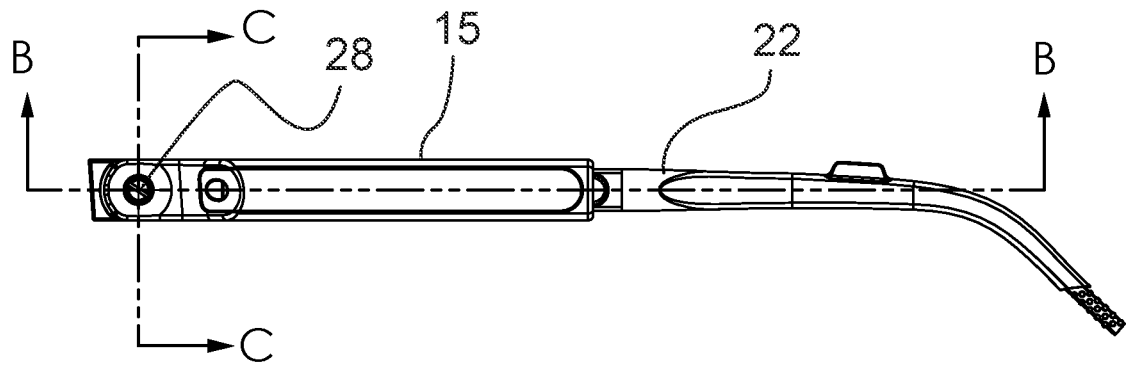

Some embodiments of a slip-resistant eyewear system 10 may comprise a tension adjuster 15 coupled to at least one of a first 18 and a second bow 19 of the eyewear frame 32 as shown in FIG. 9 which depicts an example of a tension adjuster 15 coupled to a first hinge 16 and first bow 18 of the eyewear frame 32. Turning now to FIGS. 12-14 which provide an exploded view of an example of a tension adjuster 15, the tension adjuster 15 may comprise a housing 24 within which a first end of the second bow 22 at least partially passes. The first end of the second bow 22 may comprise a recess 52 configured to seat an internally threaded barrel 25 and spring 26 therein. The internally threaded barrel 25 passes at least partially through the spring 26 as shown in the assembled depiction of FIGS. 28-29. An adjustment screw 27 passes at least partially into the housing 24, the recessed portion 52 of the first end of the second bow 22, and the internally threaded barrel 25 within which the adjustment screw 27 threadably couples to the internally threaded barrel 25. The user may adjust how far into the internally threaded barrel 25 the adjustment screw 27 passes by turning the adjustment screw 27 in order to tighten or loosen the tension and corresponding fit of the slip-resistant eyewear system 10 when worn by a user as shown in the cross-sectional views of the tension adjuster 15 in FIGS. 30-32. The internally threaded barrel 25, spring 26, and recessed portion 52 of the first end of the second bow 22 may be protected by a cover 45, through which the adjustment screw 27 may also pass. In some embodiments, the cover 45 may be substantially transparent to allow the user to see how far the adjustment screw 27 has been tightened or the cover 45 may comprise one or more measurement gradations to aid the user in consistently adjusting both tension adjusters 15 when each bow 18, 19 comprises a tension adjuster 15.

Figure 33:
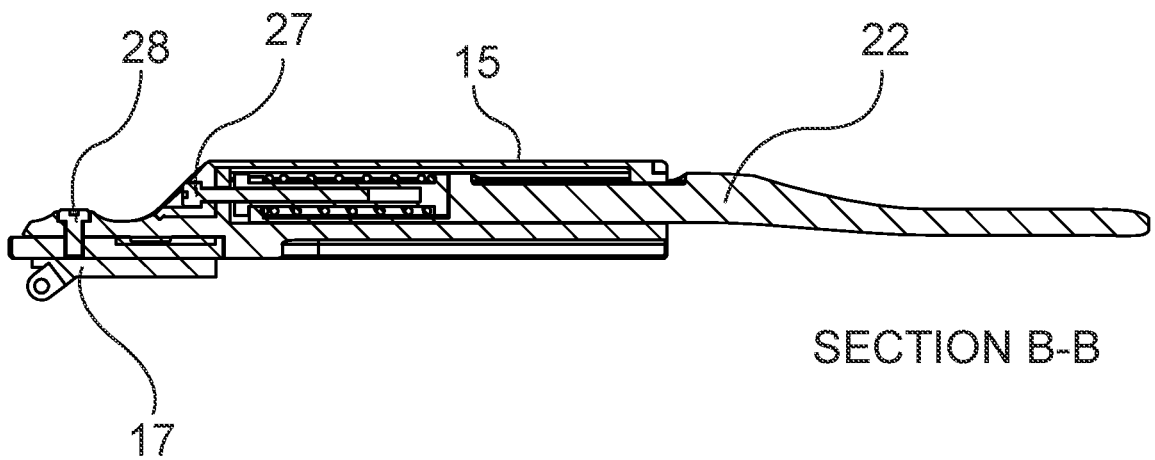
Figure 34:
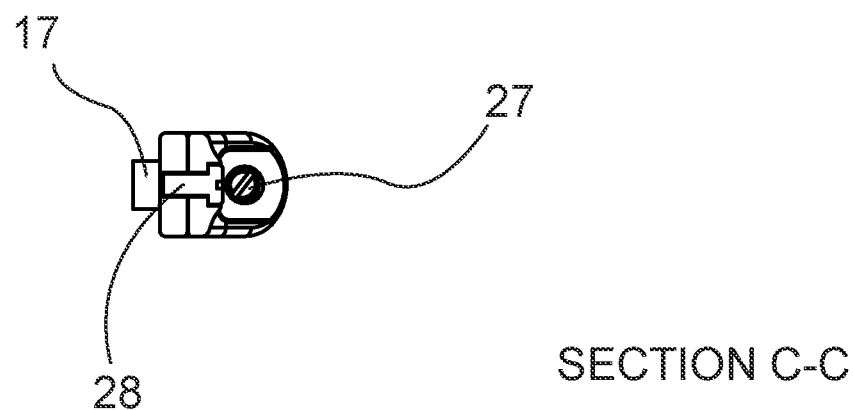

In some applications, such as for example, when the eyewear system comprises loupes 48, the user may desire to adjust the angle of the eyewear frame 32 relative to the bows 18, 19 and/or tension adjuster(s) 15 so as to change the angle at which the loupes 48 or other magnifying lenses are viewed through without forcing the user to change position or hold the user's head at an uncomfortable angle to properly utilize the loupes 48. This may be accomplished through the use of an angular adjustment screw 28 which passes through an end of the tension adjuster housing 24 proximal to the hinge 16, 17 of the eyewear frame. As shown in FIGS. 12-14, the housing 24 may comprise a recessed portion that allows the hinge 17 to be seated therein to minimize how far the tension adjuster 15 protrudes outward from the user's head. FIG. 38 provides an example in which the hinge 17 is parallel to the tension adjuster 15 and first end of the second bow 22. In FIG. 39, however, the angular adjustment screw 28 has been tightened to hold the hinge 17 at an angle relative to the tension adjuster 15 and the first end of the second bow 22 such that the eyewear frame 32 has been tilted to allow the user to look through the loupes 48 when the loupes 48 are substantially parallel to the ground rather than angled toward the ground as in FIG. 38. FIGS. 33-34 depict cross-sectional views illustrating the positioning of the angular adjustment screw 28 when it is tightened so as to threadably couple with the hinge 17.

Figure 4:
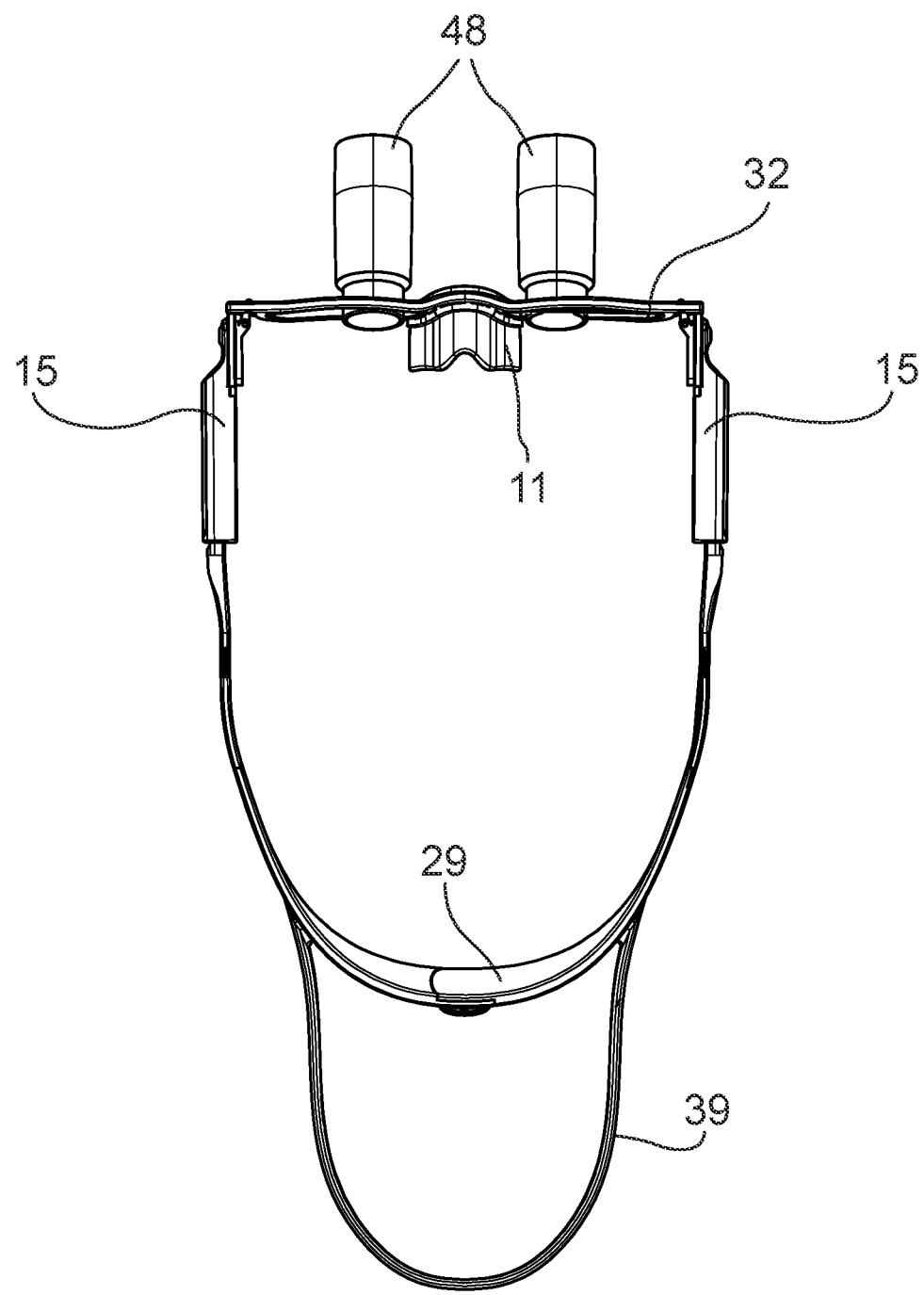
FIG. 4 is a top view of a slip-resistant eyewear system in accordance with the exemplary embodiment of FIGS. 1-3.
Figure 5:
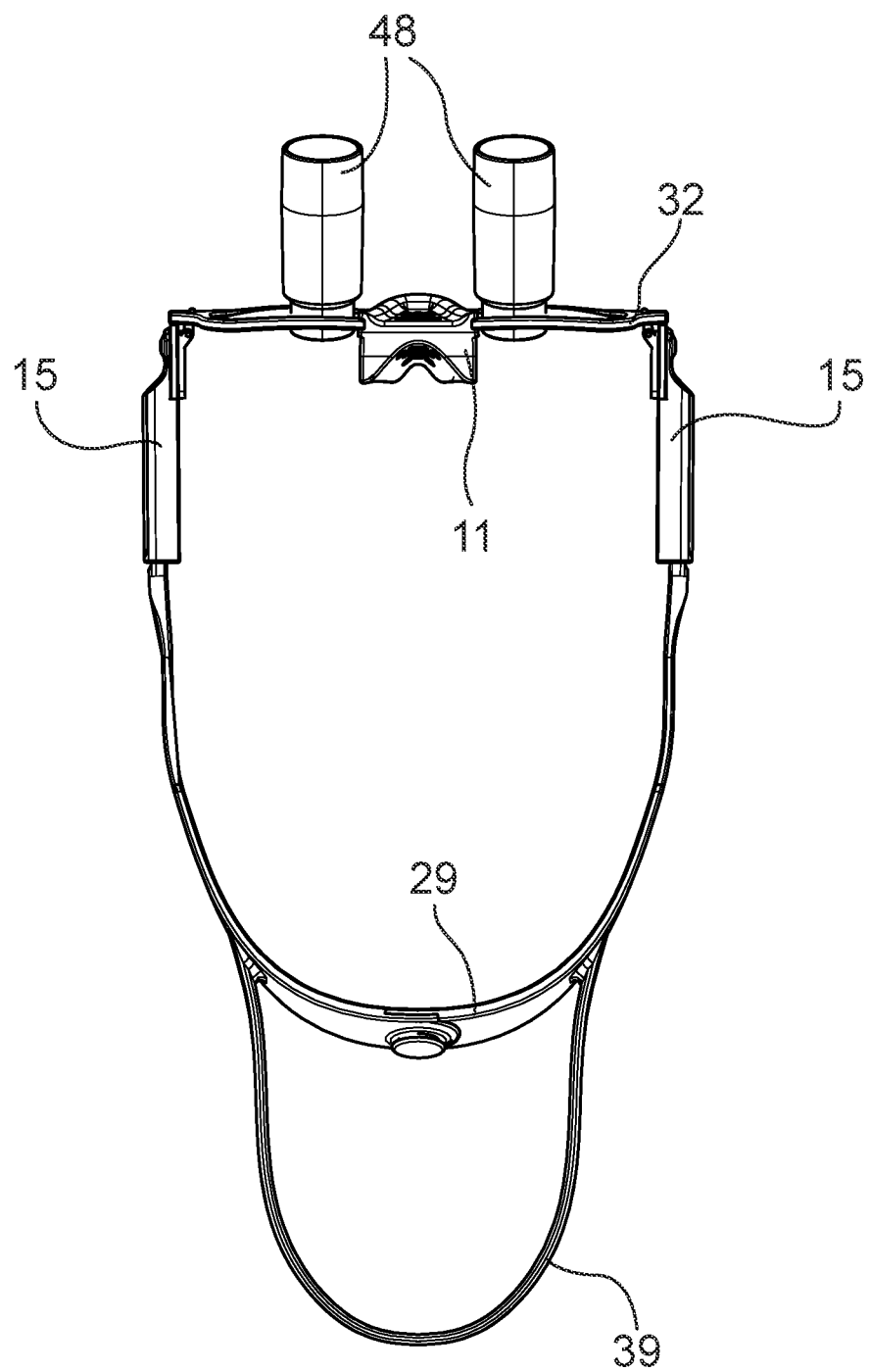
FIG. 5 is a bottom view of a slip-resistant eyewear system in accordance with the exemplary embodiment of FIGS. 1-4.
Figure 6:
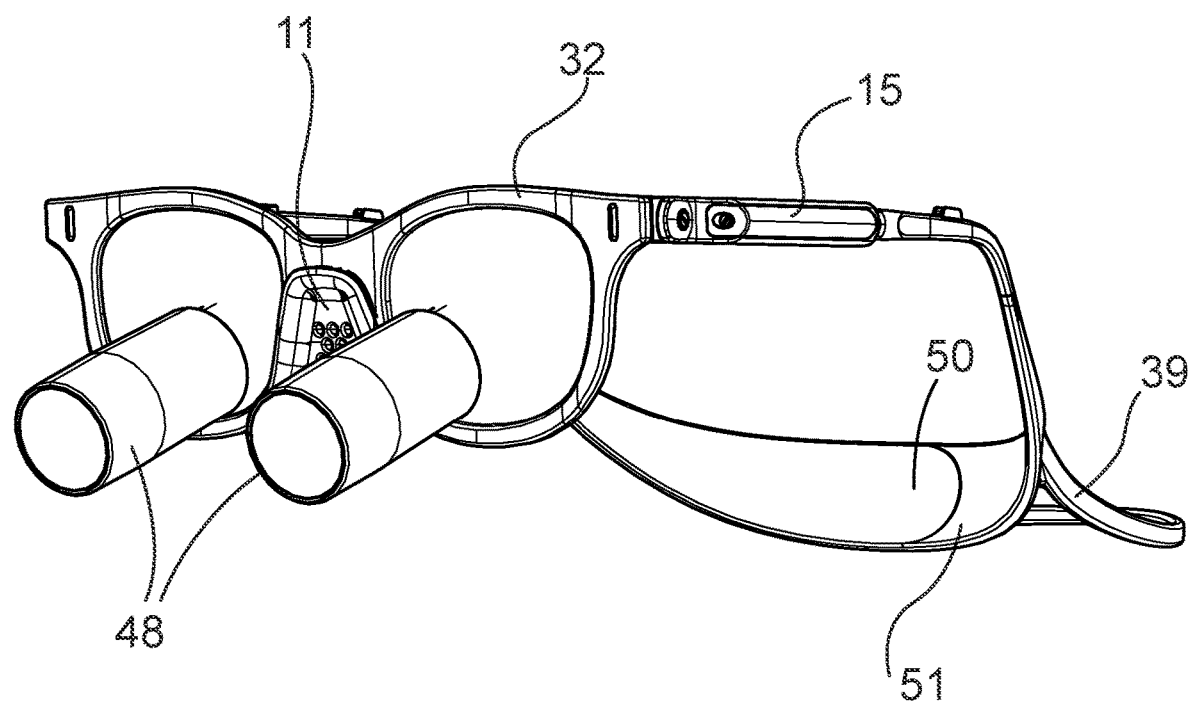
FIGS. 6-7 provide perspective views of exemplary embodiments of a slip-resistant eyewear system.
Figure 7:
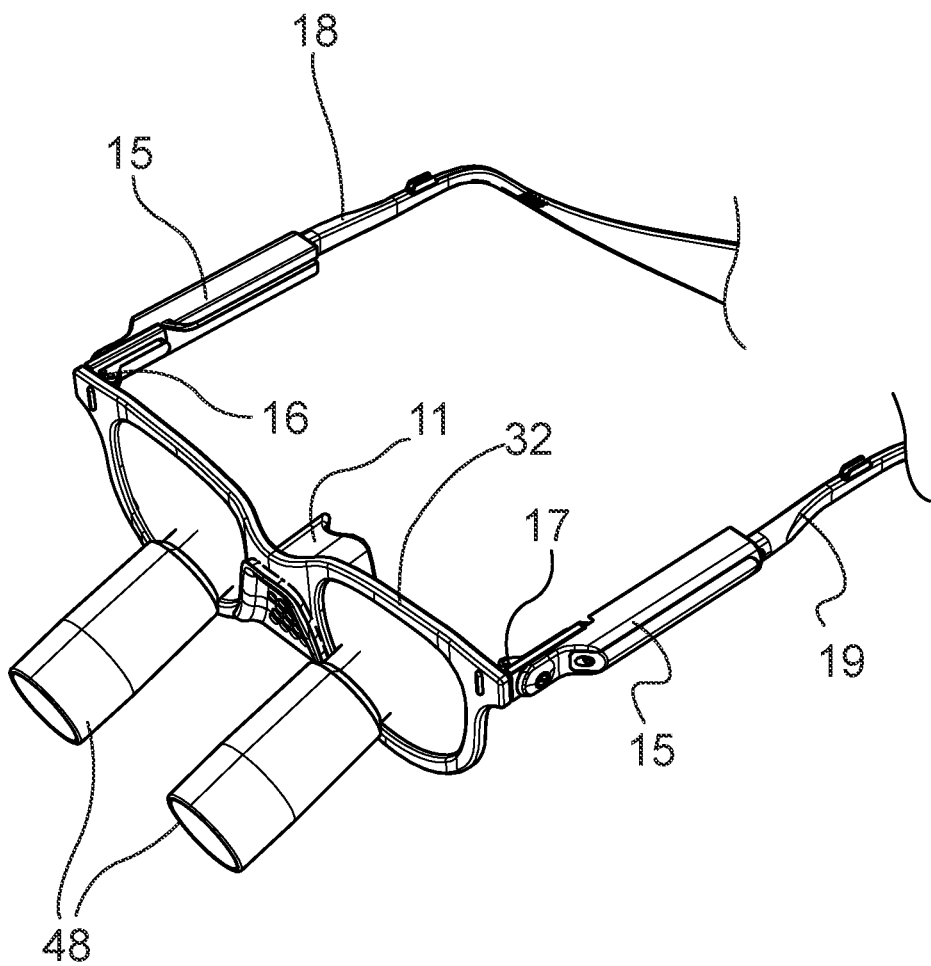
Figure 35:
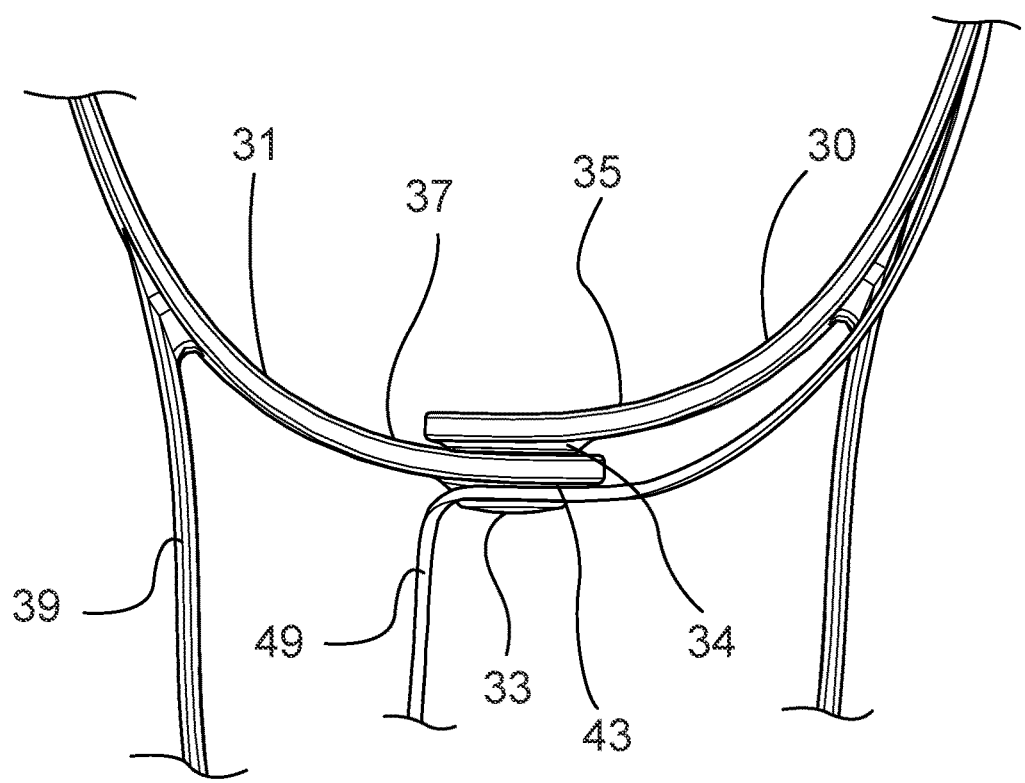
FIGS. 35-36 depict embodiments of a fasteners of an eyewear retainer of a slip-resistant eyewear system.
Figure 36:
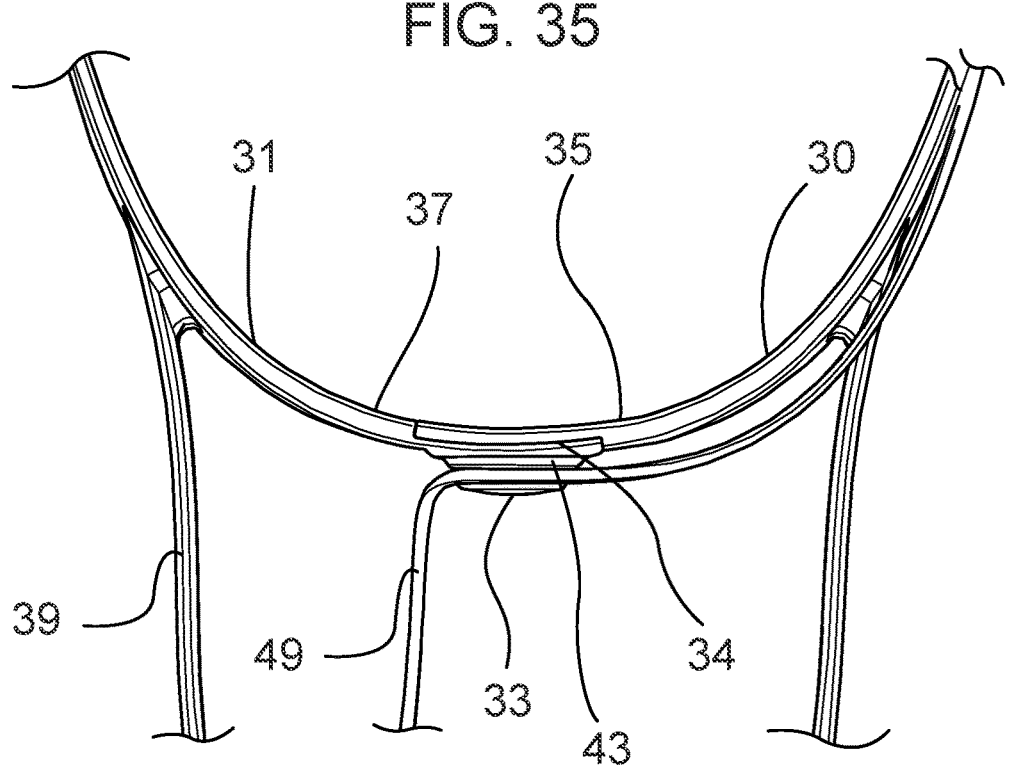

As shown in FIGS. 4-5, some embodiments of a slip-resistant eyewear system 10 may comprise an eyewear retainer 29 to securely fasten the slip-resistant eyewear system 10 to a user's head so as to prevent unintended movement or repositioning of the slip-resistant eyewear system 10 when in use. The eyewear retainer 29 may comprise first and second bow extension elements 30, 31 extending from a second end of the first and second bows 22, 23, respectively. While the first and second bow extension elements 30, 31 may be integral to the bows 18, 19 themselves, in some embodiments, the second end of the first and second bows 22, 23 are coupled to the second end of the first and second bow extension elements 36, 38, respectively. In order to allow a user to easily put on and remove the slip-resistant eyewear system 10, the eyewear retainer 29 may comprise first and a second fastening elements 50, 51 proximal to a first end of the first and second bow extension elements 35, 37. While this disclosure contemplates that any appropriate fastening mechanism may be used, such as for example, a magnetic or hook and loop closure, in some embodiments, as shown in FIG. 35, the first bow extension element 30 comprises a protrusion 33 proximal to the first end of the first bow extension element 35 that is received by an opening 34 in the second bow extension element 31 that is proximal to the first end of the second bow extension element 37 when the first ends of the bow extension elements 35, 37 are overlapped to secure the slip-resistant eyewear system 10 when in use. To enhance user comfort when the first and second bow extension elements 31, 31 are engaged with one another, the second bow extension element 31 may comprise a recess so that the first bow extension element remains substantially flush with the remaining portion of the first end of the second bow extension element 37 as shown in FIG. 36 rather than overlapping as in FIG. 35. This creates a smooth rather than uneven contact surface with the back of a user's head.

While any acceptable method of coupling the bow extension elements 30, 31 to the bows 18, 19 may be utilized, FIGS. 24-27 depict an exemplary manner of coupling the first and second bow extension elements 30, 31 to the second ends of the first and second bows 21, 23 which may be used on at least one each of the bows 18, 19 and bow extension elements 30, 31. As shown, the second end of the first bow 21 may comprise a plurality of raised protrusions 46 which mate with a plurality of corresponding openings 47 on the second end of the first bow extension element 36 to secure the first bow extension element 30 to the first bow 18.

Figure 10:
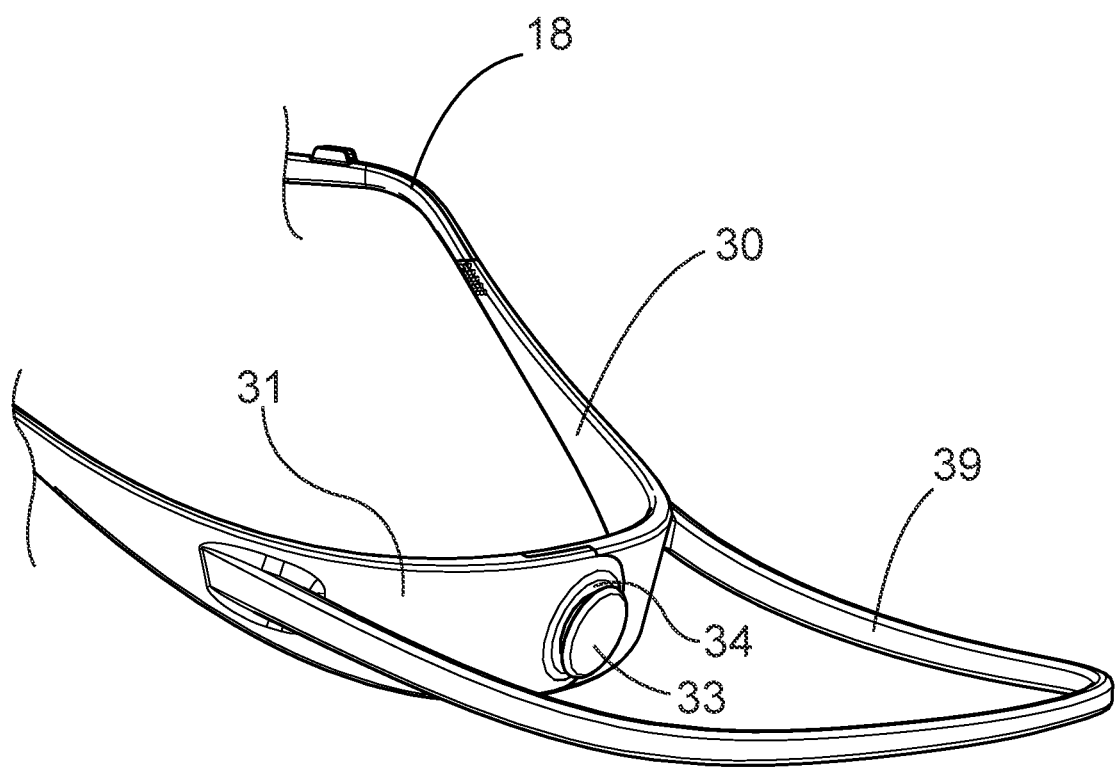
FIGS. 10-11 depict exemplary embodiments an eyewear retainer of a slip-resistant eyewear system.

Some embodiments of a slip-resistant eyewear system 10 may further comprise an eyewear retainer extension 39 that protrudes from the eyewear retainer 29 as shown in FIGS. 4-5 and 10. While the user could remove the slip-resistant eyewear system 10 by merely sliding the eyewear retainer 29 over the user's head, it may be preferable and more convenient for the user to avoid continually moving the system over the user's head. Thus, when the eyewear retainer 29 is fastened behind the head of a user, when the user desires to remove the slip-resistant eyewear system 10, the user unfastens the fastening elements 50, 51 of the eyewear retainer 29 and allows the slip-resistant eyewear system 10 to hang from the user's neck by the eyewear retainer extension 39 which supports the slip-resistant eyewear system 10 and allows the system to rest on the user's chest went not in use. This allows the slip-resistant eyewear system 10 to be easily reengaged by the user without the need to slide the system over the user's head.

Figure 8:
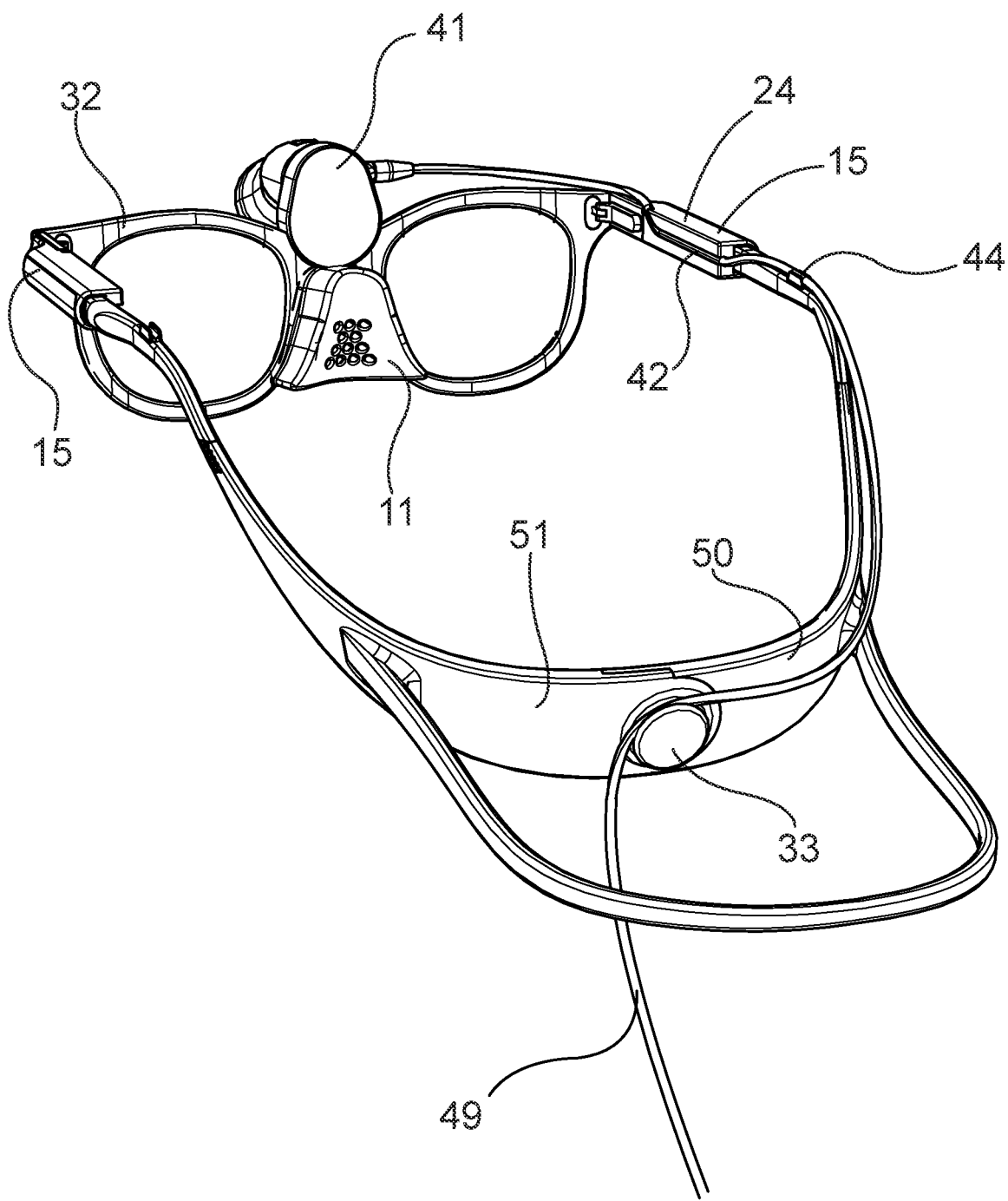
FIG. 8 depicts an exemplary embodiment of a slip-resistant eyewear system comprising a light mounted to at least a portion of an eyewear frame.
Figure 11:
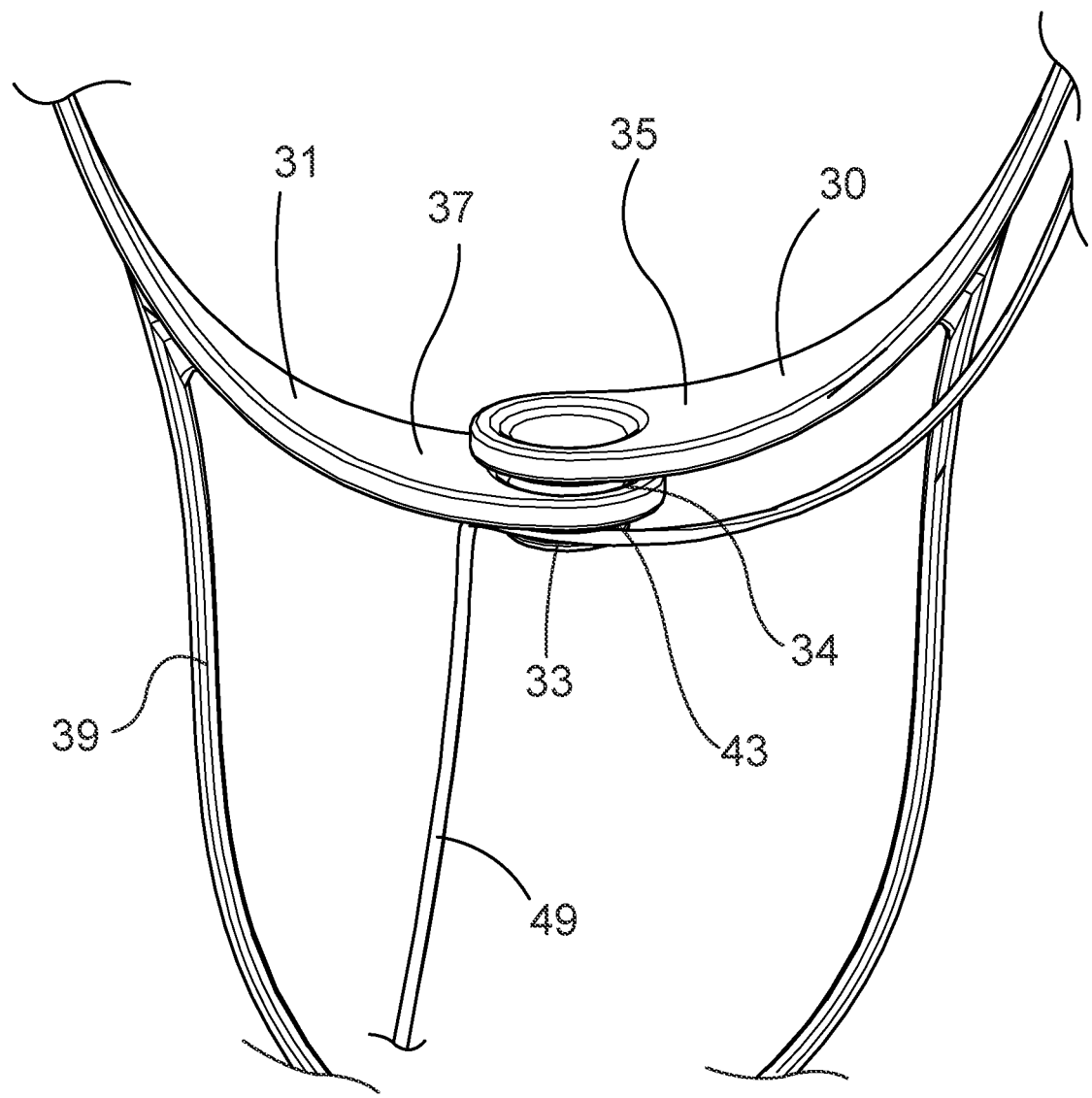

In some applications, the user may desire additional light to better illuminate the area that the user is viewing. Accordingly, some embodiments of a slip-resistant eyewear system 10 may comprise a light 41 or other source of illumination such as, for example, an LED bulb. FIG. 8 depicts such a light 41 coupled to the eyewear frame 32 proximal to the bridge 14 of the eyewear frame 32, but the illumination source may be located anywhere on the frame 32, such as for example, on one side of the frame or the other, that allows for appropriate illumination. A light bracket 53 (shown in FIG. 37) may be used to couple the light 41 to the eyewear frame 32 to allow for adjustment of the angle at which the light 41 is positioned relative to loupes 48 or to the work area to which the user's view is directed. If the light 41 requires a power source located remotely from the light 41, the power cord 49 of the light may be kept out of the user's way by running the power cord 49 through a channel 42 on either side of the housing 24 of one of the tension adjusters 15 as shown in FIG. 8. A clip 44 or other fastener may be located on the corresponding bow 18, 19 to further secure the power cord 49 and the eyewear retainer 29 may further comprise an eyewear retainer channel 43 in which the power cord 49 may be seated to allow the power cord 49 to run behind the back of the user. FIGS. 11 and 35-36 depict the eyewear retainer channel 43 being formed by the fastening elements 50, 51 of the eyewear retainer 29, but any other suitable location is also contemplated by this disclosure.

Figure 40:
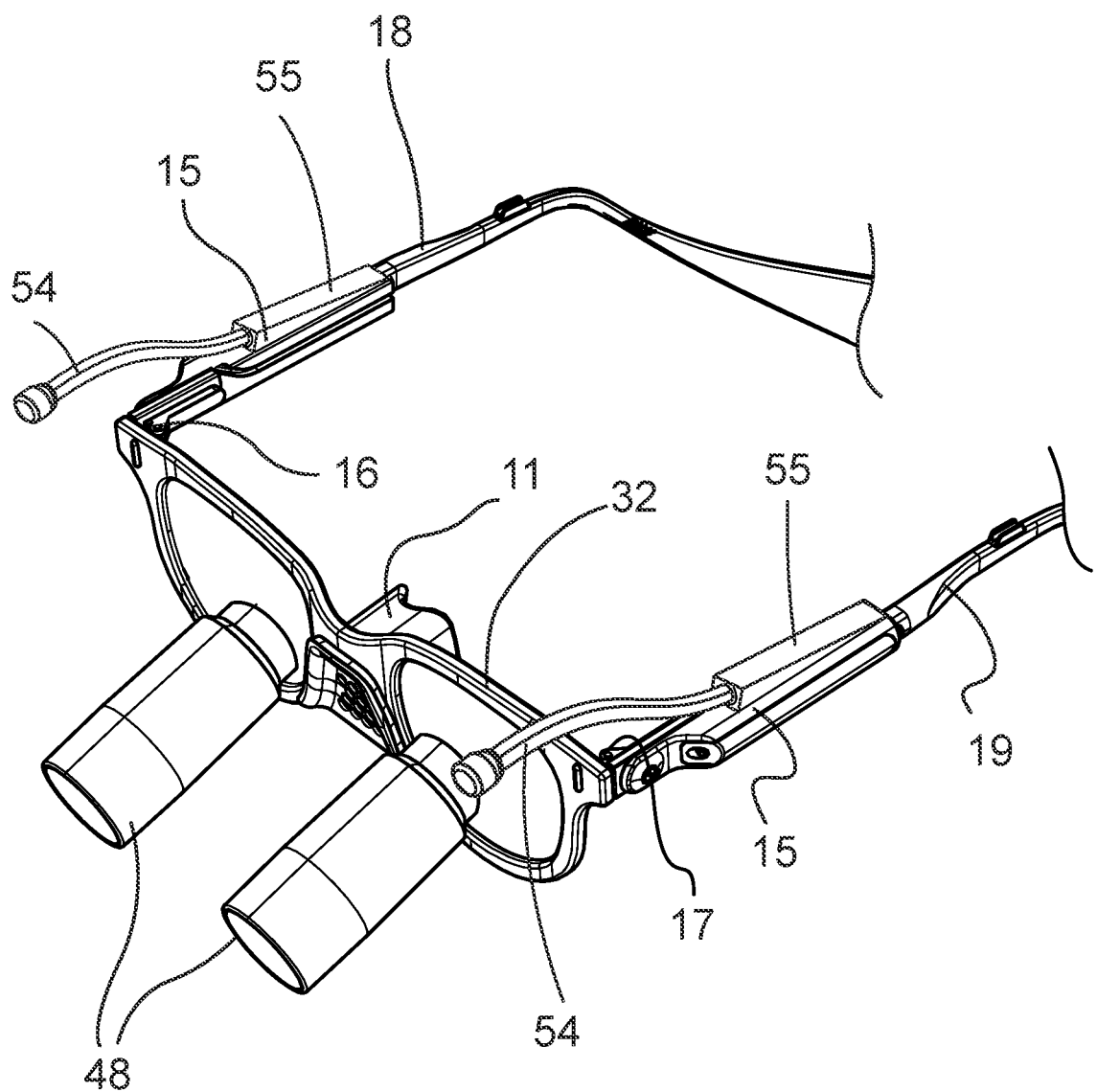
FIG. 40 depicts an exemplary embodiment of a slip-resistant eyewear system comprising a flexible-neck lighting system.

It may be desirable for the user to have the ability to adjust the angle or direction of one or more lights 41 on the slip-resistant eyewear system 10. Therefore, in some embodiments, as shown in FIG. 40, the slip-resistant eyewear system may further comprise a flexible-neck lighting system comprising one or more flexible-neck lights 54 to allow for adjustment. The one or more flexible-neck lights 54 may be located anywhere on the slip-resistant eyewear system 10, but in some embodiments as shown in FIG. 40, it may be preferable to locate a flexible-neck light 54 along the upper portion of the bow 18, 19 or tension adjustor 15. If the flexible-neck light 54 comprises a power cord 49, the power cord 49 may pass through a channel in the tension adjustor housing 24 or eyewear retainer 29 as discussed in association with other embodiments above. For lights 54 with a very low power requirement such as for example, light emitting diodes (LEDs), it may be preferable to use a battery as a power source which may be housed in flexible-neck light base 55 which may be located on the housing 24 of the tension adjustor 15, the bow 18, 19, the eyewear retainer 29, or any other suitable location on the slip-resistant eyewear system 10.

Figures 41, 43:
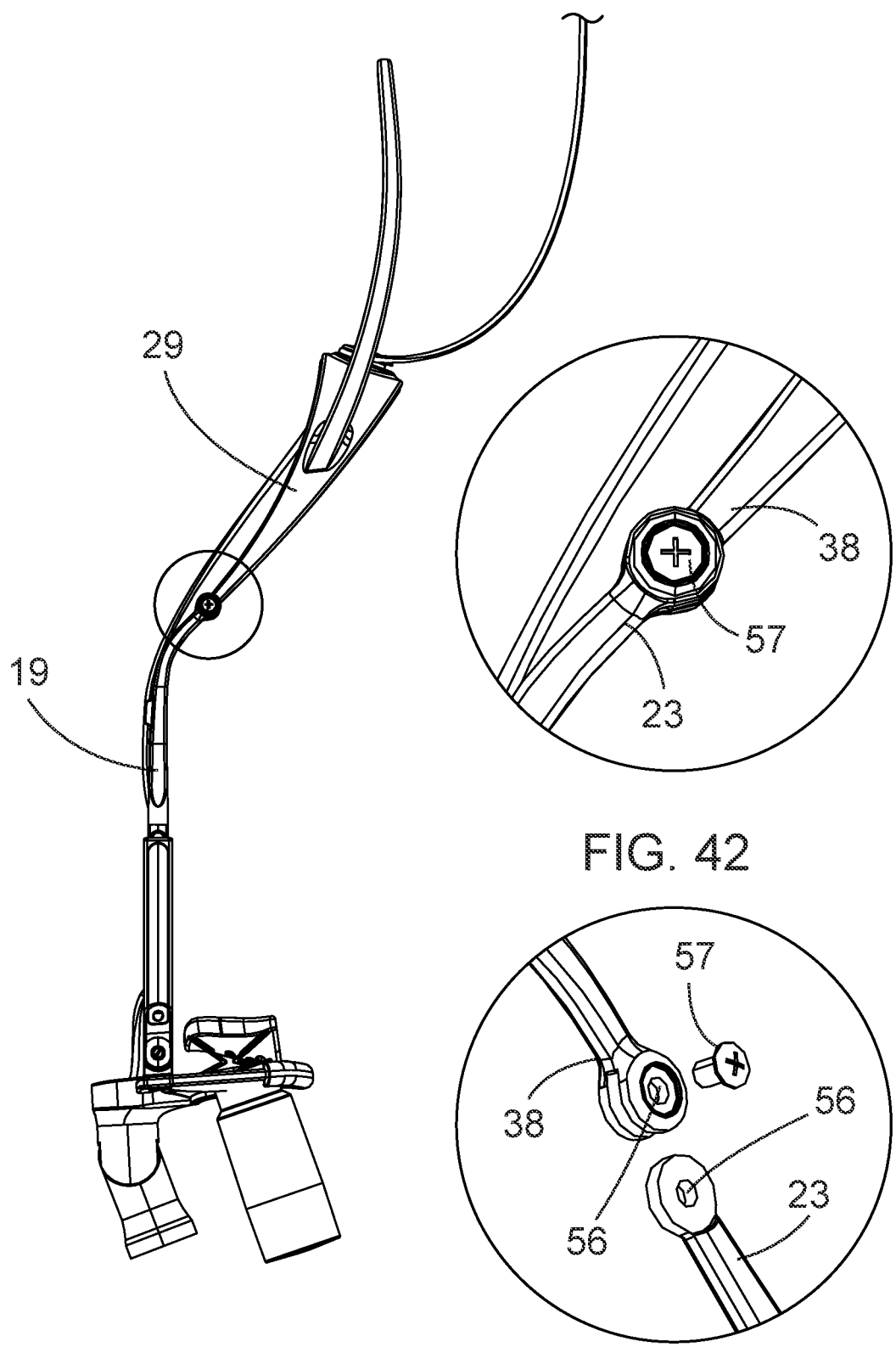
Figure 44:
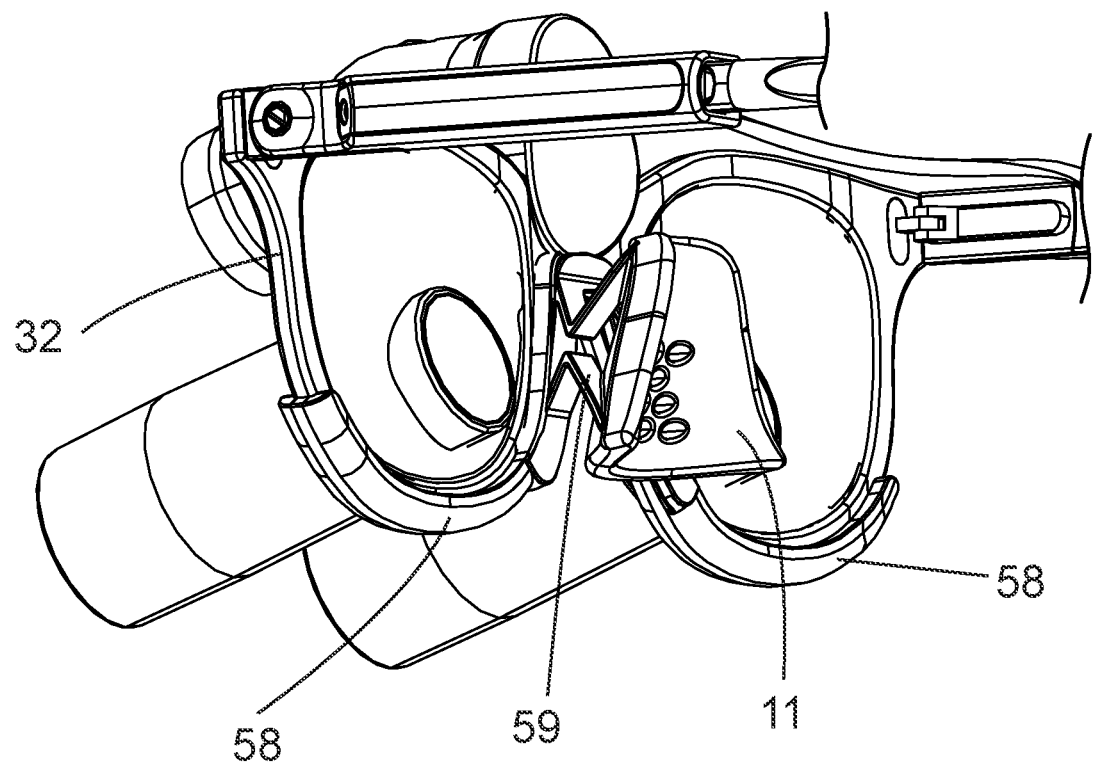
FIG. 44 provides an example of a slip-resistant eyewear system comprising a detachable nosepiece.

In some embodiments such as that which is depicted in FIG. 41, the slip-resistant eyewear system 10 may comprise a detachable eyewear retainer 29 so that the system may be used without the eyewear retainer 29 and eyewear retainer extension 39 or these elements may be used with an alternative slip-resistant eyewear system 10 if repair of the loupes 48 is necessary and the user has auxiliary loupes 48 that can be used while the primary item(s) are sent out for repair. While any suitable method for attaching the eyewear retainer 29 to the bows 18, 19 may be used, in some embodiments, the second end of each bow 21, 23 and the second ends of the first and second bow extension elements 36, 38 may comprise an opening 56 configured to pass an eyewear retainer attachment screw 57 therethrough to secure the eyewear retainer 29 to the bows 18, 19.

Figure 45:
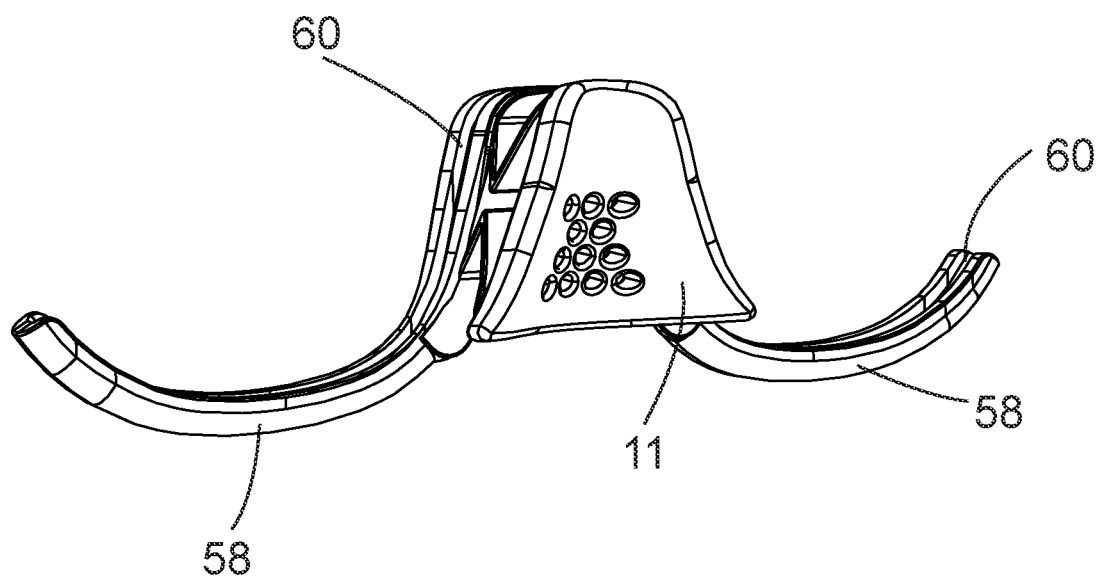
FIG. 45 depicts an exemplary embodiment of a detachable nosepiece comprising lower frame overlays.
Figure 46:
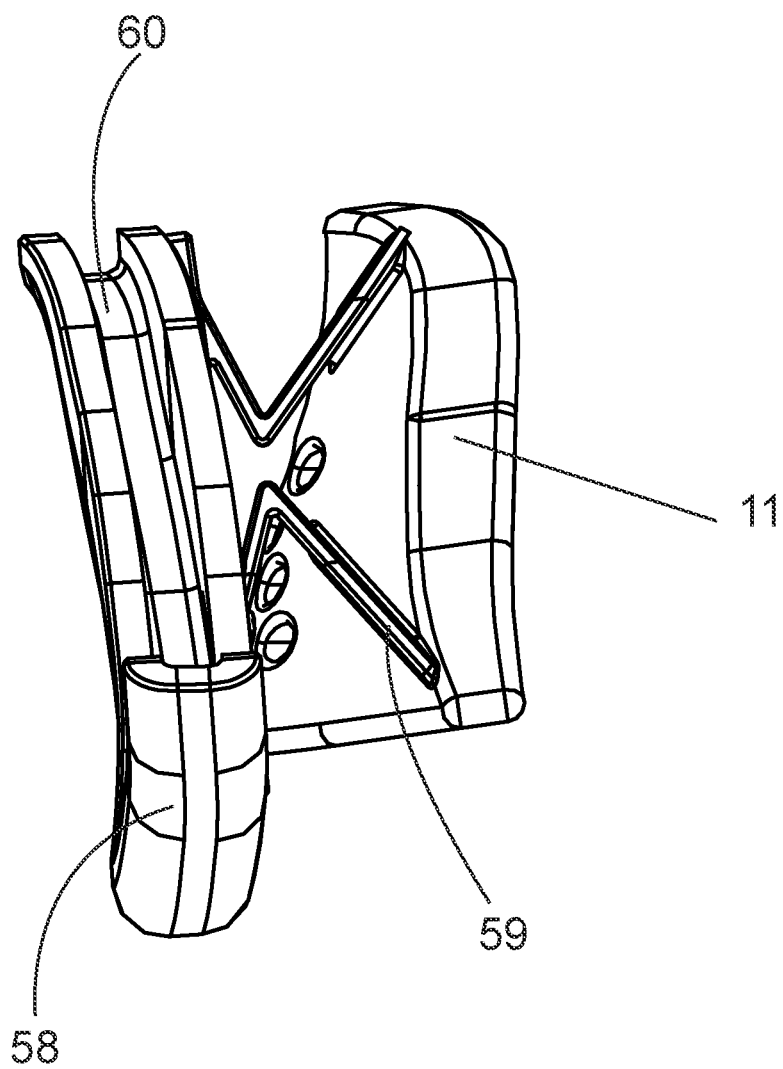
FIG. 46 provides a side view of an exemplary embodiment of a detachable nosepiece.

Referring now to FIGS. 44-47, some embodiments of a slip-resistant eyewear system 10 may comprise a detachable nosepiece 11 which, in some embodiments, may further comprise a lower frame overlay 58 to secure the detachable nosepiece 11 to the eyewear frame 32. Some such implementations may comprise an expander 59 that is used to reduce the thickness of the nosepiece 11. The expander 59 may be made of any suitable material, but is preferably comprised of a metal, alloy, or other lightweight material of appropriate strength to support the eyewear system on the user's face when in use. In some embodiments, it may be preferable to encapsulate the expander 59 in a rubber or other flexible material to enhance user comfort. Use of the expander 59 may allow for the nosepiece to be purchased in predetermined sizes, clipped to the expander 59, and the angle of the nosepiece 11 relative to the user's face can then be adjusted using the expander 59. While the expander 59 may clip directly to the eyewear frame 32, in some embodiments, the expander 59 may be coupled to a lower frame overlay 58 which may further comprise a groove 60 in its upper surface that is configured to mate with the lower portion of the eyewear frame 32 to secure the detachable nosepiece 11 to the frame 32 when in use as shown in FIGS. 45-46. The lower frame overlay 58 may enhance user comfort to prevent a rigid eyewear frame 32 from protruding into the face of the user and may also enhance the safety of the user by serving as a splashguard to prevent biohazardous materials from contacting the eyes of the user.

Figure 47:
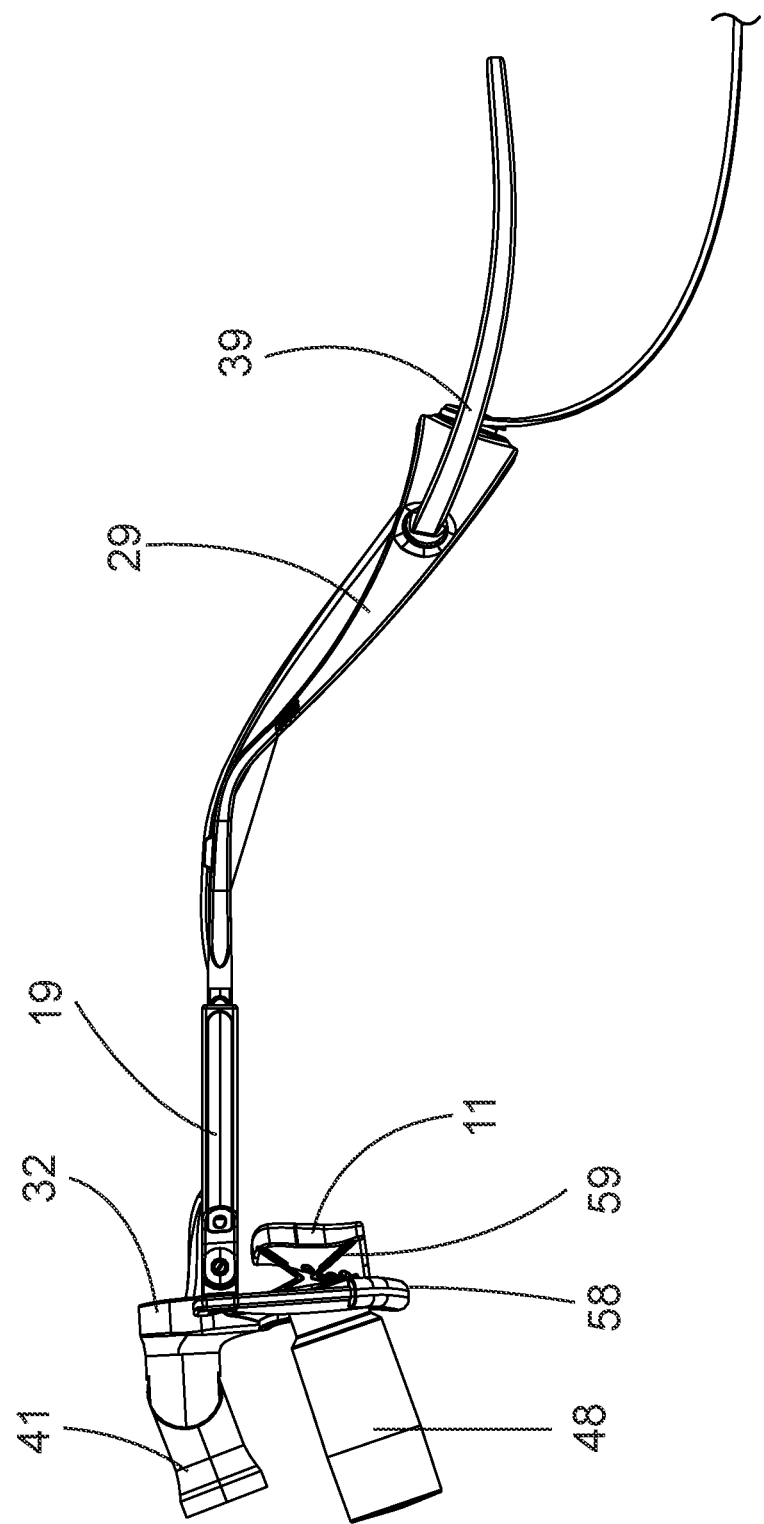
FIG. 47 provides a side view of an exemplary embodiment of a slip-resistant eyewear system comprising a detachable nosepiece with a lower frame overlay.
Figure 48:
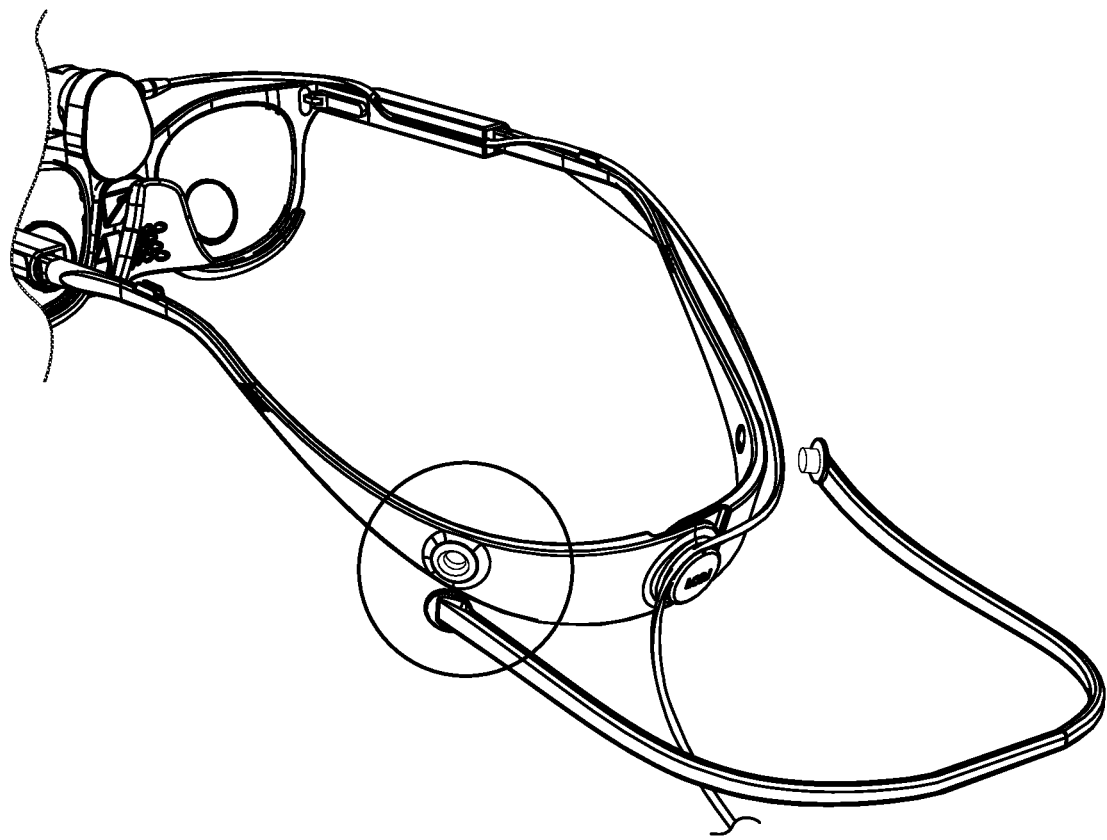
FIG. 48 depicts an exemplary embodiment of a slip-resistant eyewear system comprising a detachable eyewear retainer extension.
Figure 49:
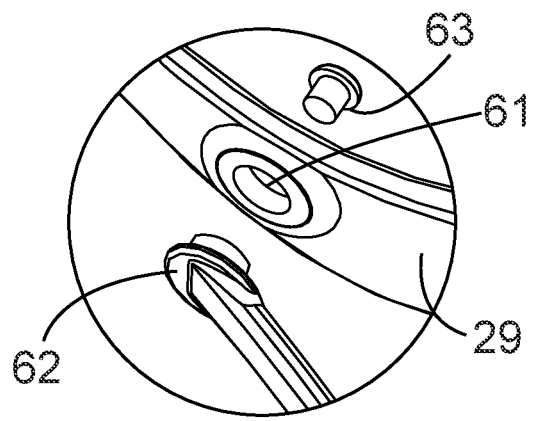
FIG. 49 depicts an exemplary embodiment of an attachment point of the detachable eyewear retainer extension of FIG. 48.
Figure 50:
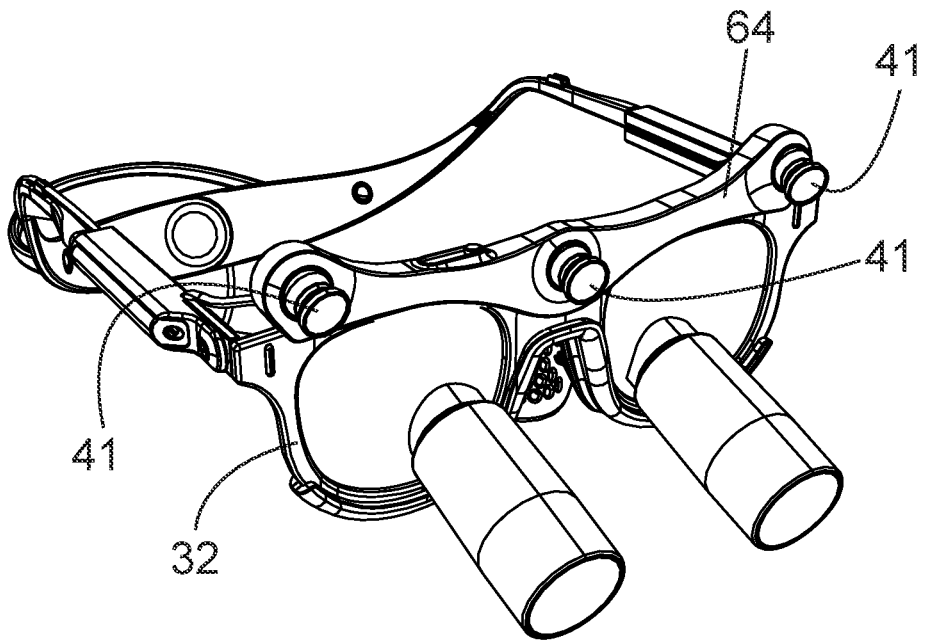
FIGS. 50-51 depict an exemplary embodiment of a slip-resistant eyewear system comprising a light bar.
Figure 51:
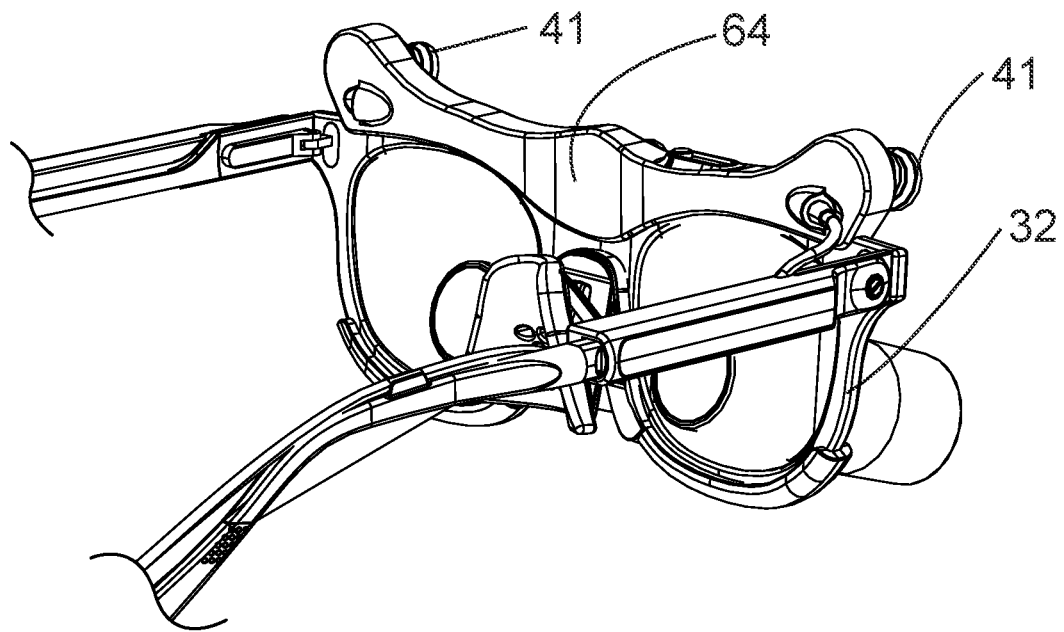
Figure 52:
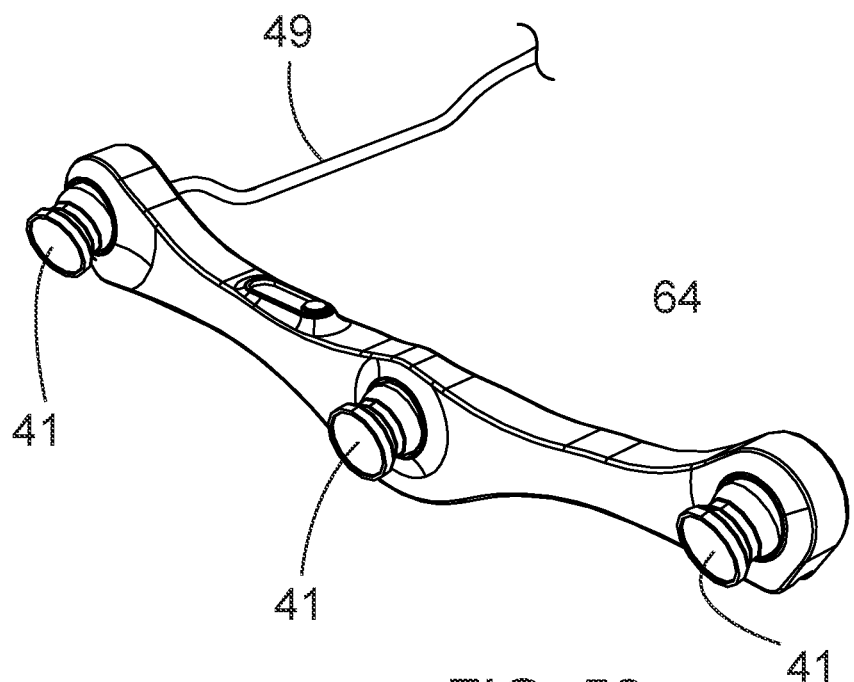
FIGS. 52-53 depict an exemplary embodiment of a light bar.
Figure 53:
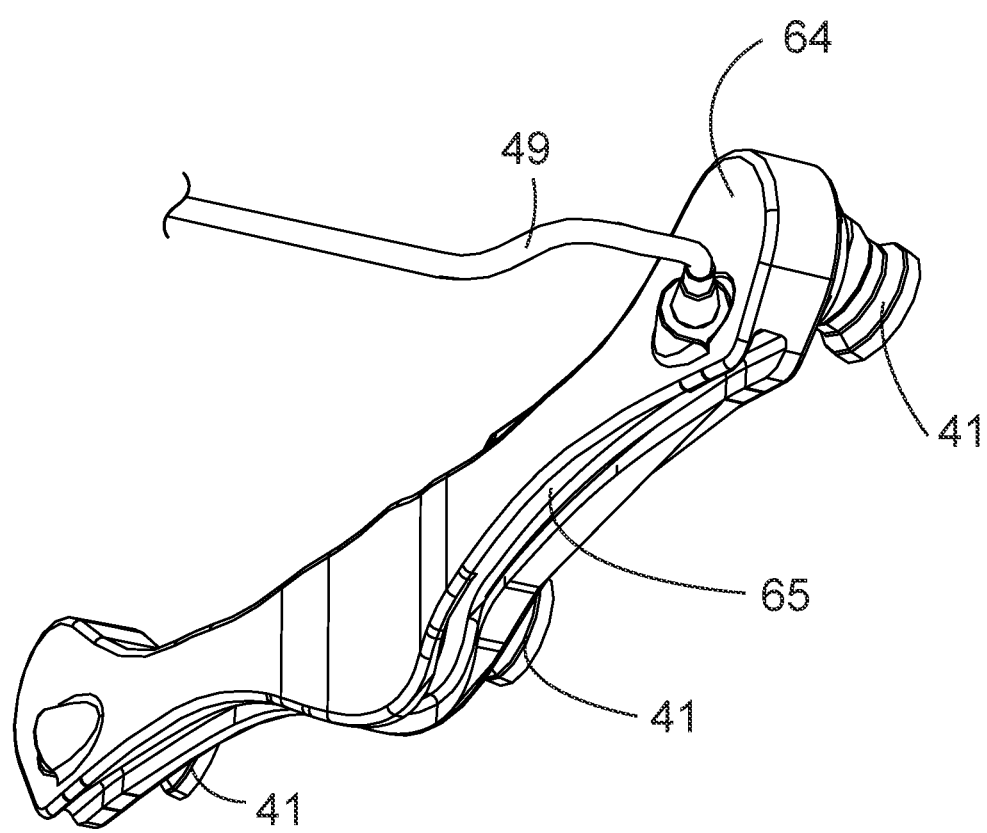

Some embodiments of a slip-resistant eyewear system 10 may comprise a detachable eyewear retainer extension 39 as shown in FIGS. 47-48. As depicted in FIG. 49, the eyewear retainer 29 may comprise an opening 61 configured to mate with an eyewear retainer extension end 62 such that an attachment screw 63 may be used to secure the detachable eyewear retainer extension 39 to the eyewear retainer 29.

As shown in FIGS. 50-53, some embodiments of a slip-resistant eyewear system 10 may comprise a light bar 64 for use when lighting is desired across a broader visual range than that which may be provided by a single point source of light. The light bar 64 may comprise any number of lights 41 which may be adjustable as to their angles and in some embodiments, one or more lights 41 may comprise a flexible neck to allow for a maximum range of adjustment by the user. The light bar may be coupled to the top of the eyewear frame 32 and may be detachable. In instances in which the light bar 64 is not battery operated, the a power cord 49 may run through a channel on the housing of the tension adjustor 42 and/or a channel on the eyewear retainer 43. The light bar may further comprise a groove 65 configured to mate with the top of the eyewear frame 32 to secure the light bar when use is desired.

Figure 54:
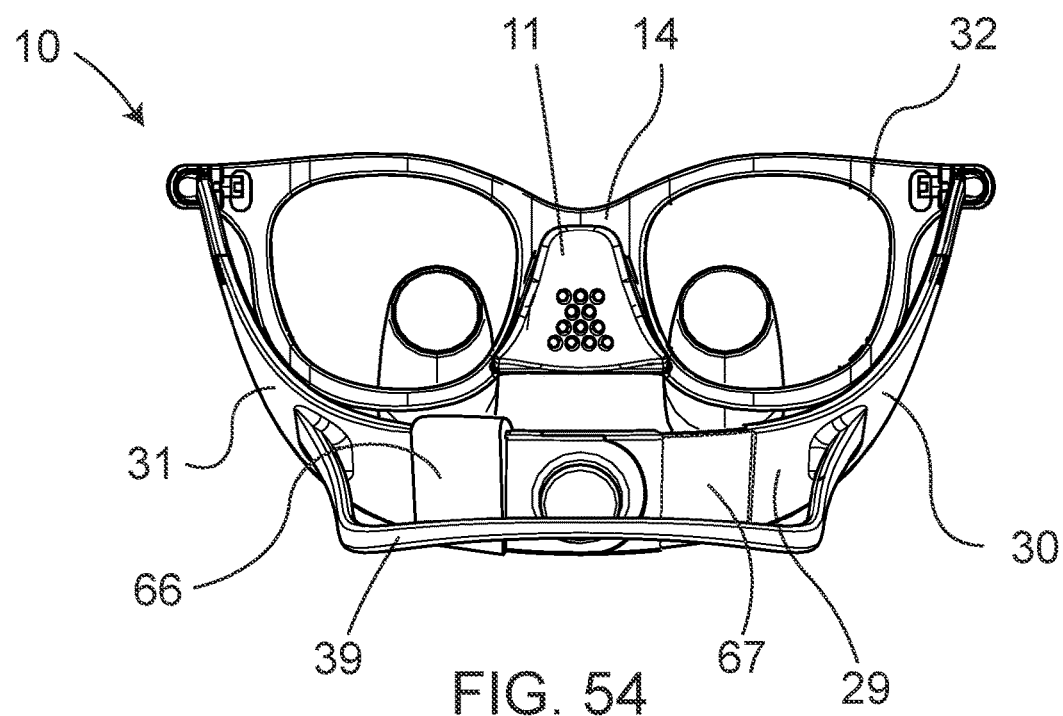
FIGS. 54-55 depict an exemplary embodiment of a slip-resistant eyewear system comprising a counterweight.
Figure 55:
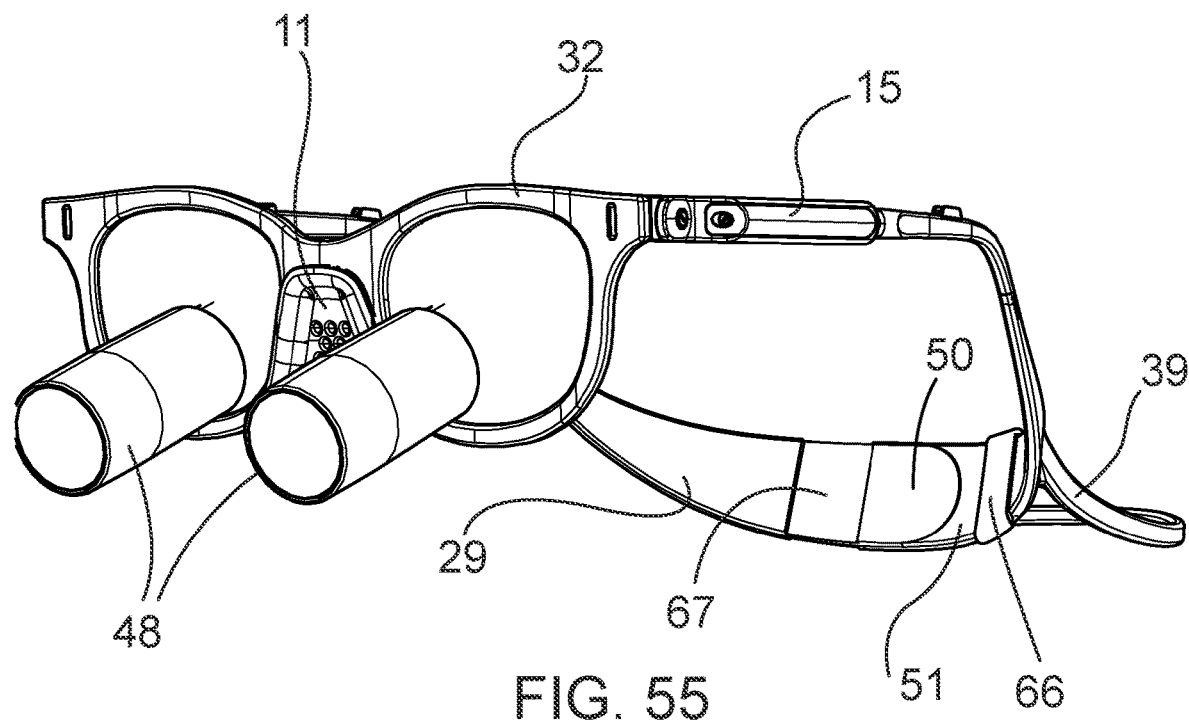
Figure 56:
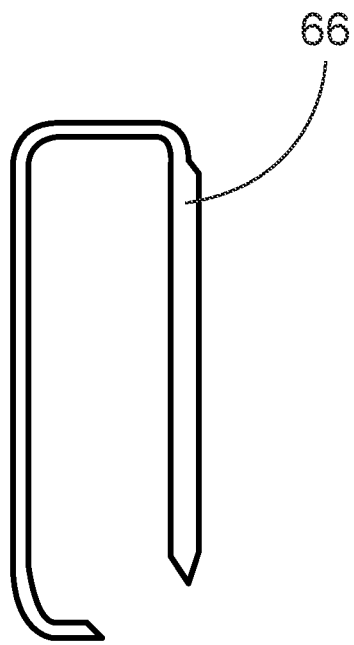
FIGS. 56-58 depict an exemplary embodiment of a counterweight.
Figure 57:
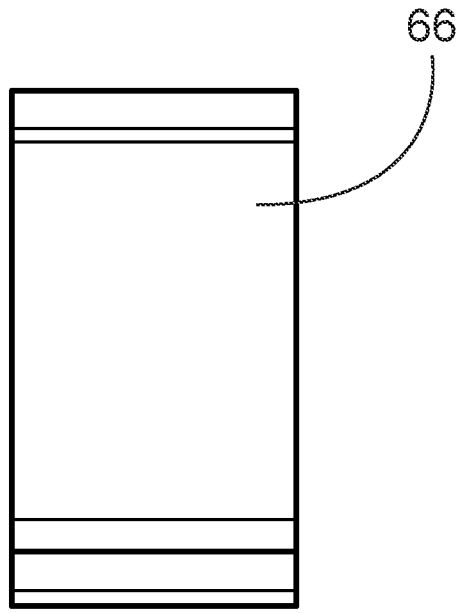
Figure 58:
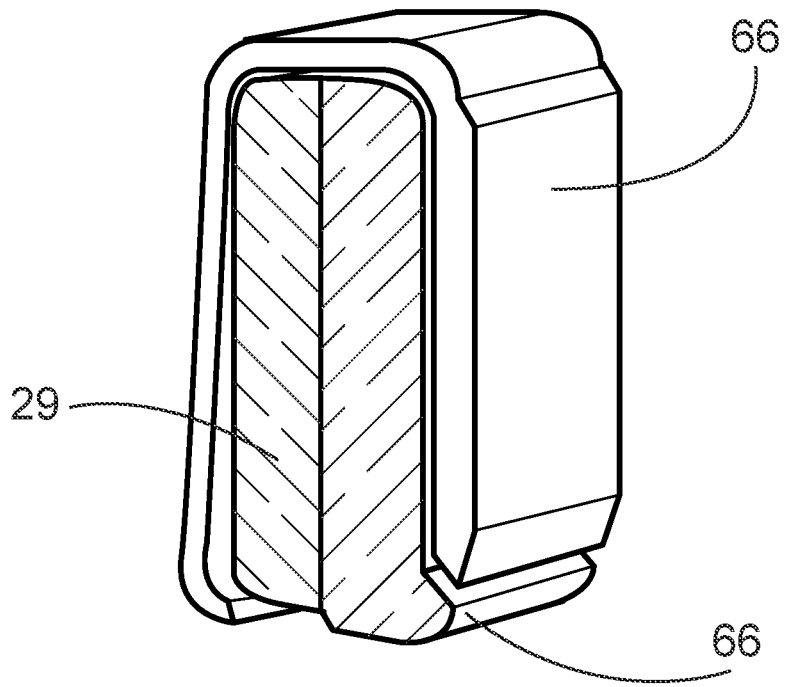
Figure 59:
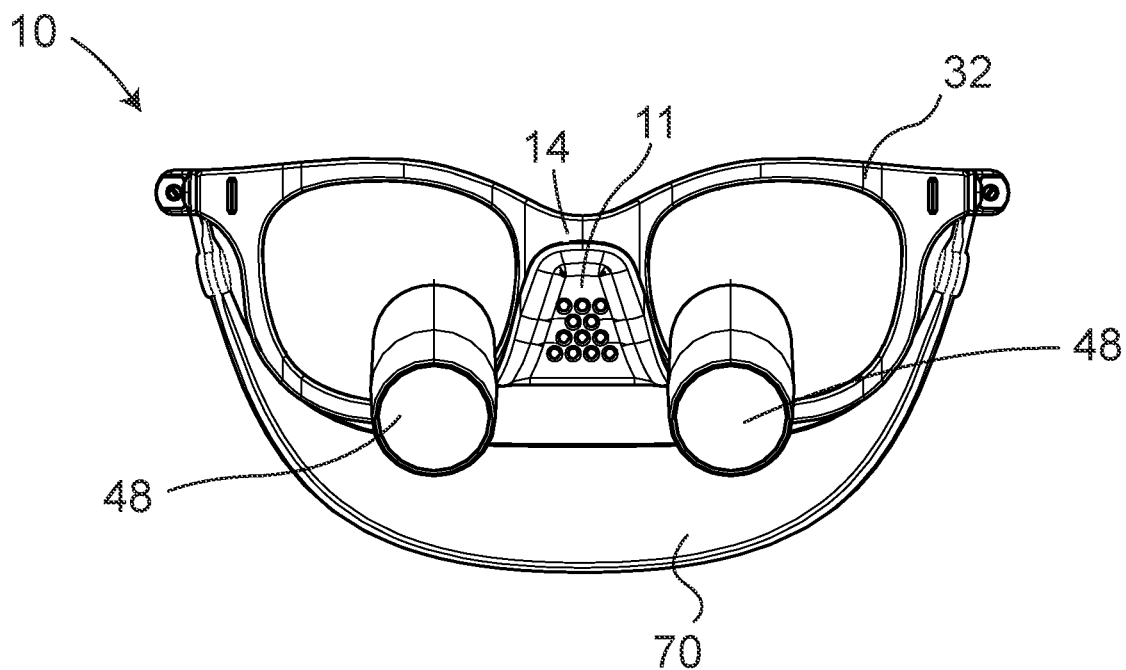
FIGS. 59-61 and 63 depict an exemplary embodiment of a slip-resistant eyewear system comprising a unitary eyewear retainer.
Figure 60:
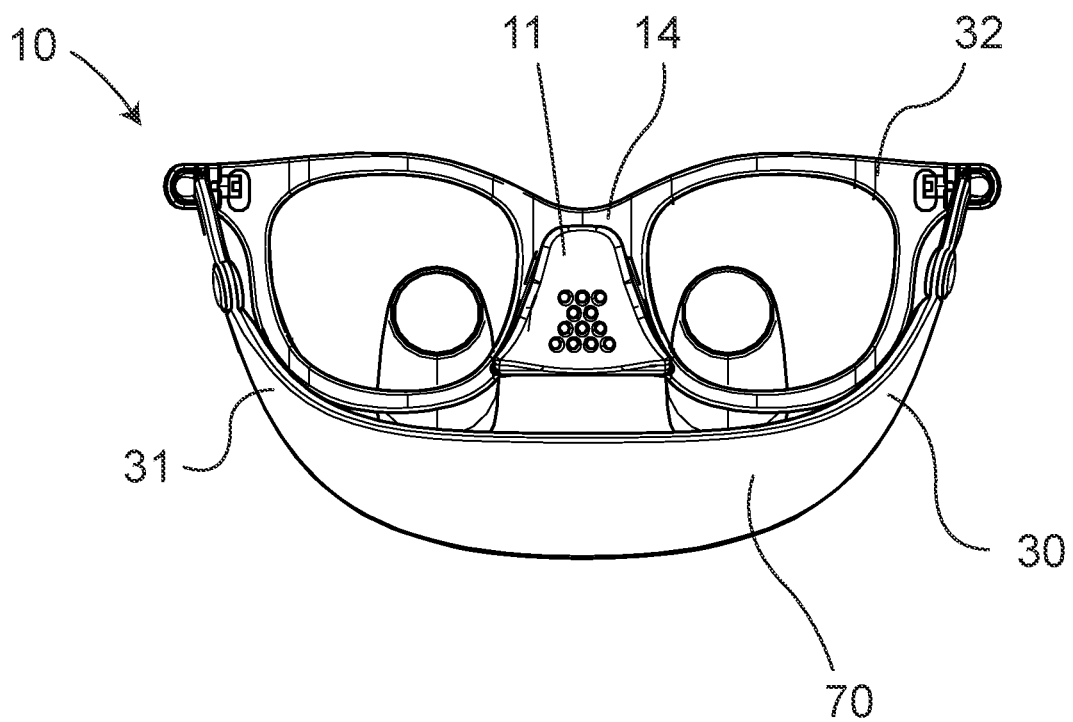
Figure 61:
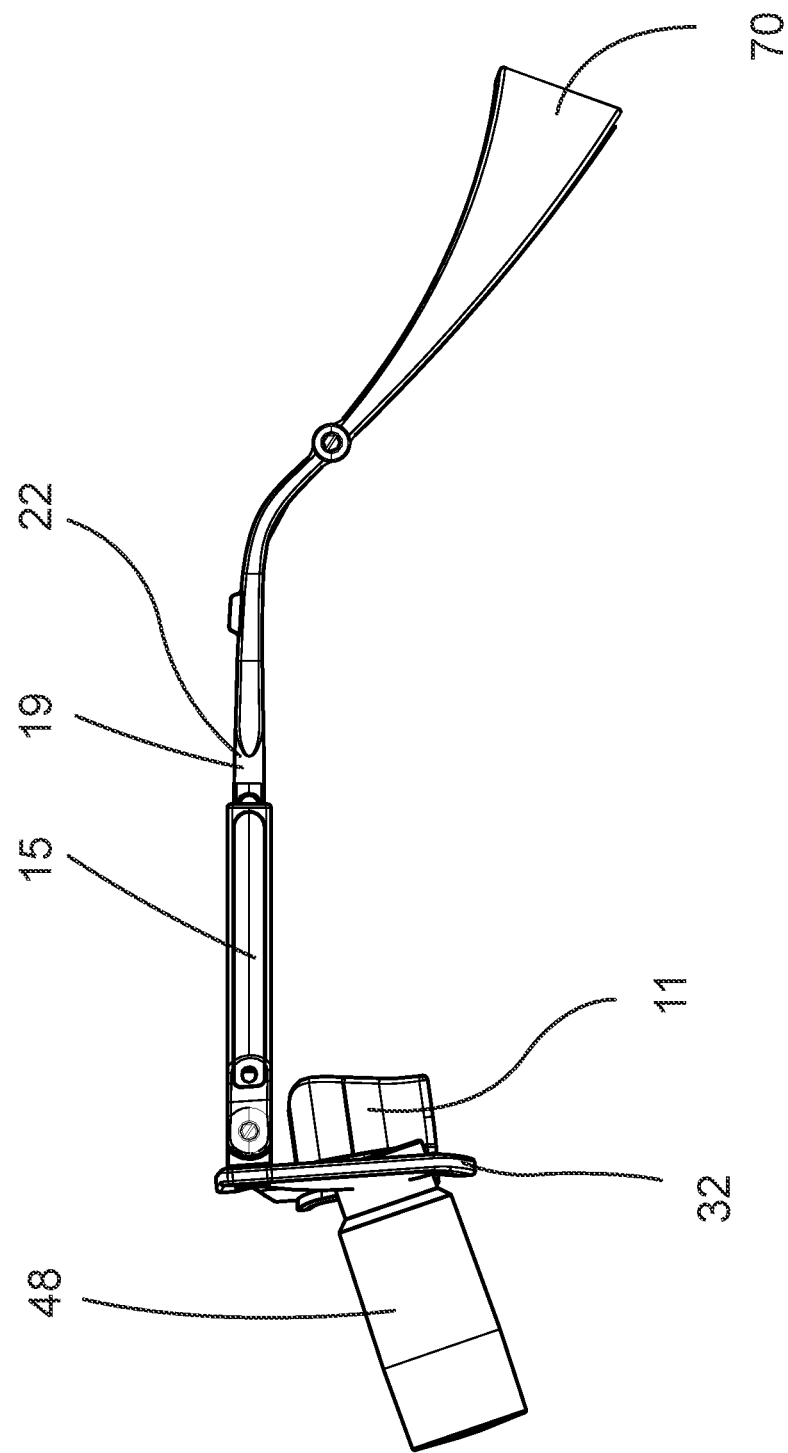

FIGS. 54-55 provide an example of the use of a counterweight 66 on the eyewear retainer 29 to reduce the pressure on the face of a user that results from a relatively heavy weight of the loupes 48. By using one or more counterweights 66 on the eyewear retainer 29, the weight of the loupes 48 can be more properly balanced across the slip-resistant eyewear system 10. In some embodiments, one or more counterweights 66 may be clipped or otherwise coupled to the eyewear retainer 29 as shown in FIGS. 54-55. One or more slots 67 may be located in the eyewear retainer 29 to aid in placement of the counterweights 66 and to prevent movement or a shift in positioning when a counterweight 66 is in use. The counterweights 66 may be of different weights and may be interchangeable to accommodate the user's need to provide counterbalance for differently weighted loupes 48. FIGS. 56-58 provide an example of a counterweight 66 and how it may be clipped or otherwise secured to the eyewear retainer 29. While any appropriate material may be used, in some implementations, it may be preferable to use a material such as by non-limiting example, tungsten, stainless steel, or any other metal or alloy which may be coated with rubber or a similar material to enhance user comfort.

Figures 62A, 62B, 62C:
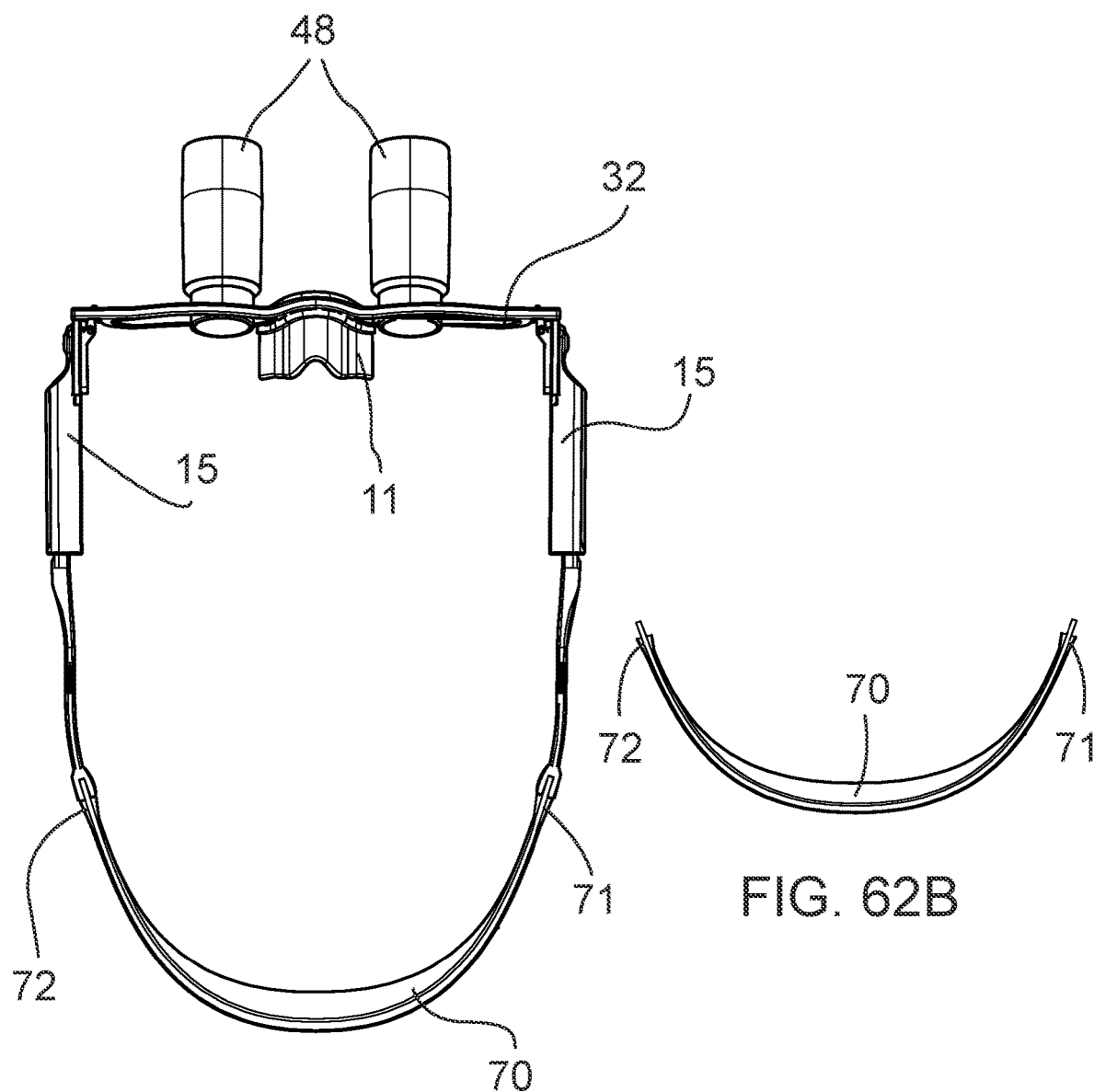
FIGS. 62A-C depict an exemplary embodiment of a slip-resistant eyewear system comprising a plurality of detachable unitary eyewear retainers of various sizes.
Figure 63:
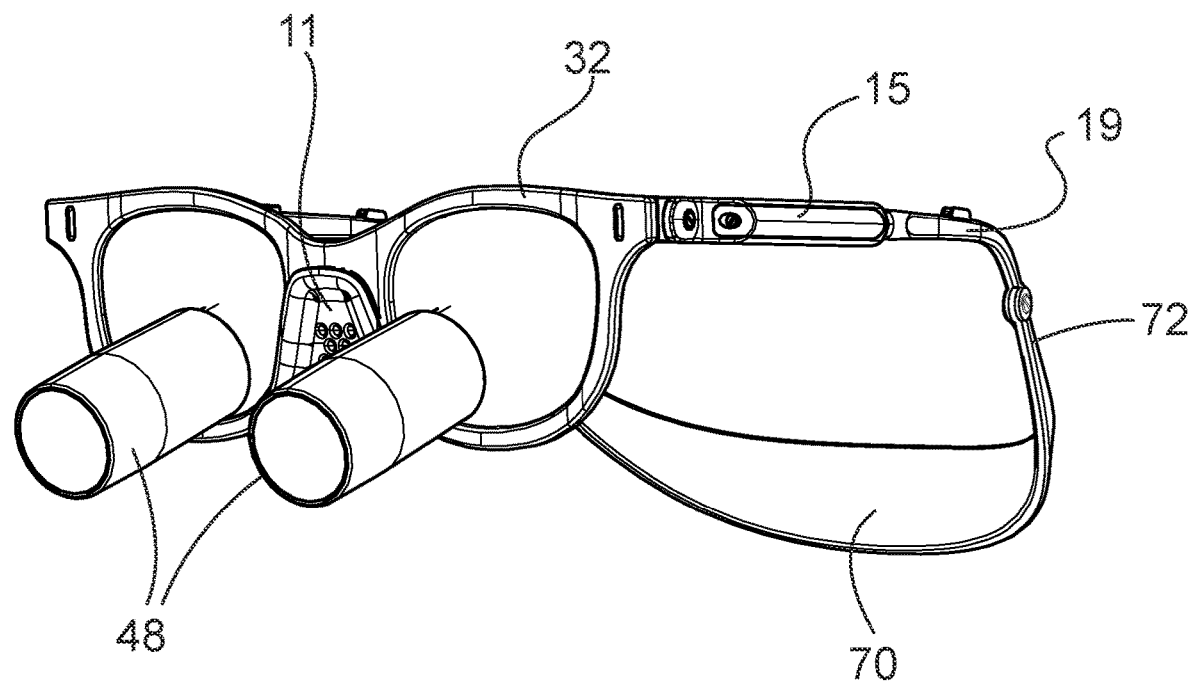
Figure 64:
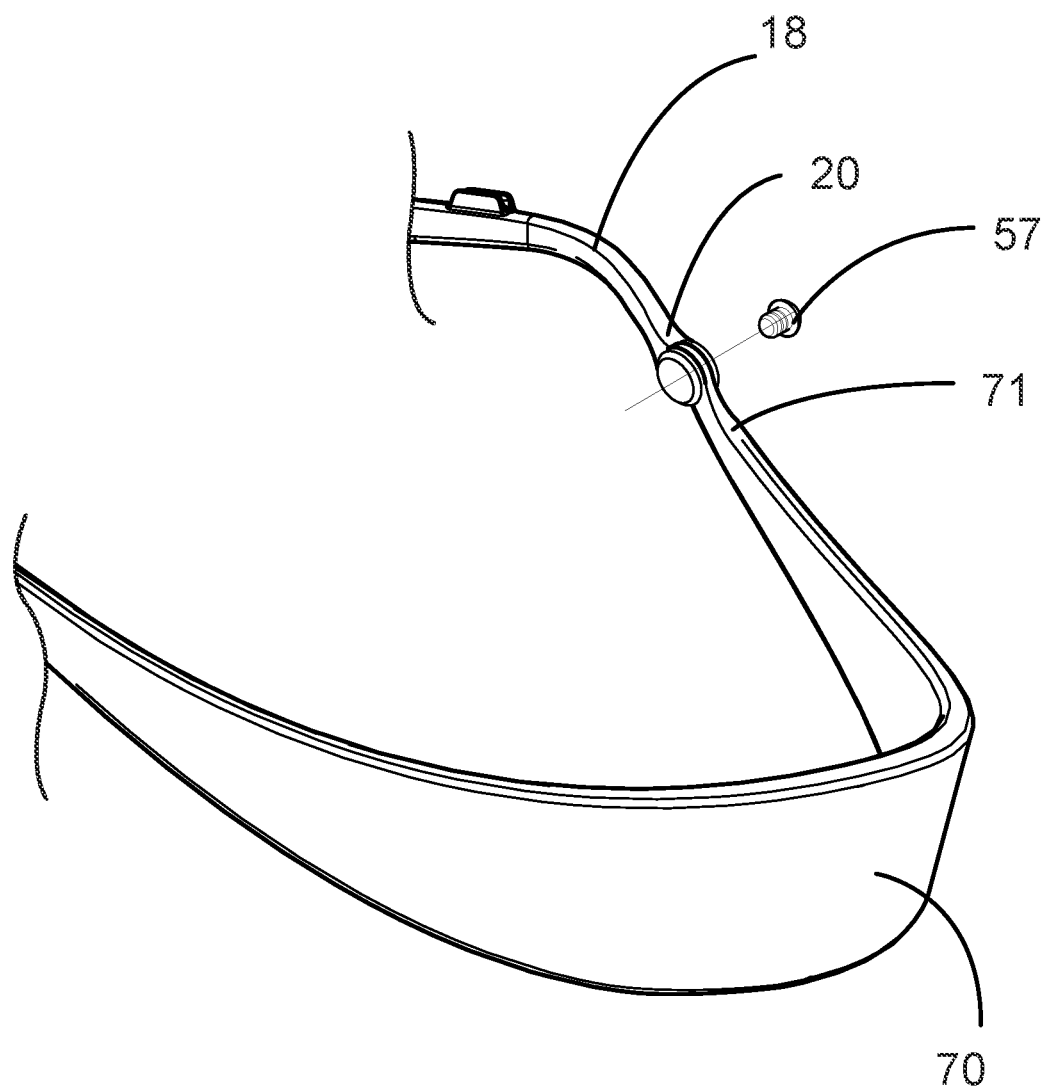
FIGS. 64-67 depict an exemplary coupling point for an implementation of a detachable unitary eyewear retainer.
Figure 65:
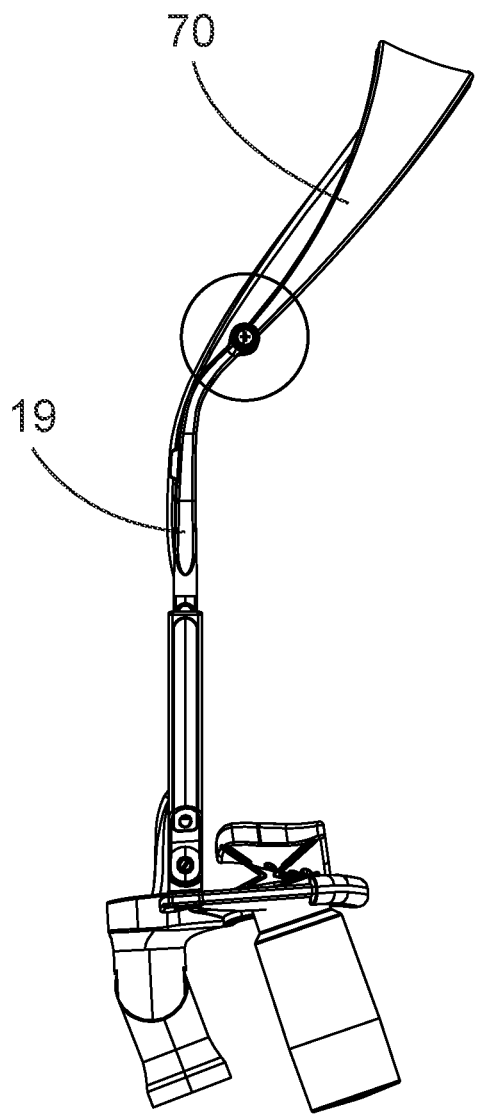
Figure 66:
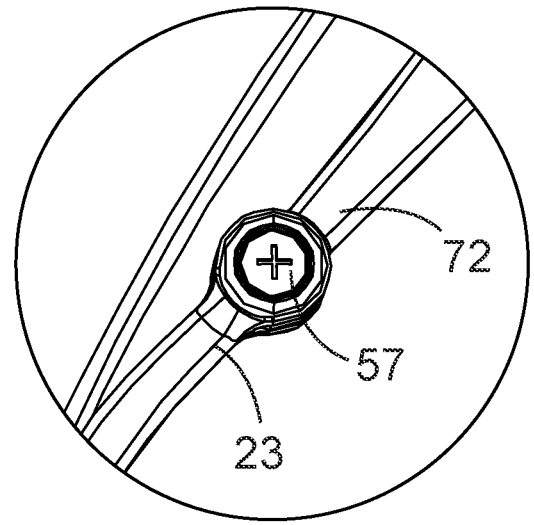
Figure 67:
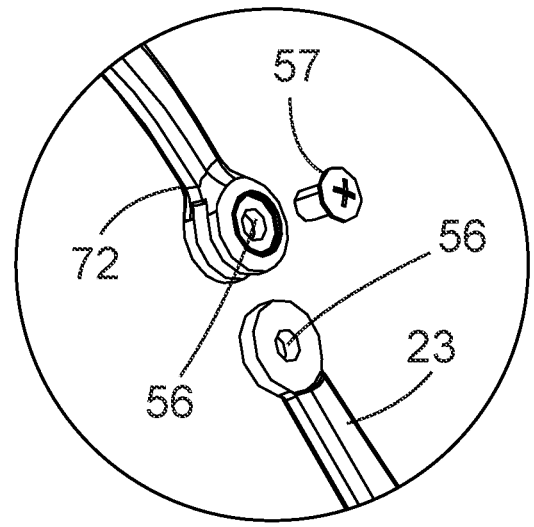

FIGS. 59-61 and 63 depict an alternative embodiment of a slip-resistant eyewear system 10 comprising a unitary eyewear retainer 70 that is designed to fit around the back of a user's head with a snug enough fit so as to prevent the eyewear system 10 from changing position on the user's face when in use. Because of differences in anatomy among users, it may be desirable to use a unitary eyewear retainer 70 that is shorter, longer, wider, or narrower than the unitary eyewear retainer 70 sold with the slip-resistant eyewear system 10. As such, the unitary eyewear retainer 70 may be detachable from the first and second bows 18, 19 of the eyewear frame 32 such that unitary eyewear retainers 70 of different dimensions, sizes, or materials, may be substituted to adjust the fit for optimal user comfort as shown in FIGS. 62A-C. By selecting a unitary eyewear retainer 70 of the correct size, the unitary eyewear retainer 70 should sit at least partially on or under the occipital bone of the user to provide proper fit and best slip resistance when the eyewear system 10 is in use.

While any fastening mechanism that appropriately allows the unitary eyewear retainer 70 to detachably couple to the first and second bows 18, 19 may be used, in some implementations such as those depicted as examples in FIGS. 64-67, it may be preferable that at least one of the first and second bows 18, 19 comprises an attachment opening 56 located substantially proximal a second end 21, 23 of the at least one of the first and second bows 18, 19. This attachment opening 56 may be configured to align with a corresponding attachment opening 56 in at least one of a first and second end 71, 72 of the unitary eyewear retainer 70. An attachment screw 57 may be threadably coupled through the aligned attachment openings 56 and secured to couple the bow 18, 19 to the unitary eyewear retainer 70. Alternatively, a pin, snap, or other appropriate fastener may also be used to detachably couple the bows 18, 19 to the unitary eyewear retainer 70.

Figure 68:
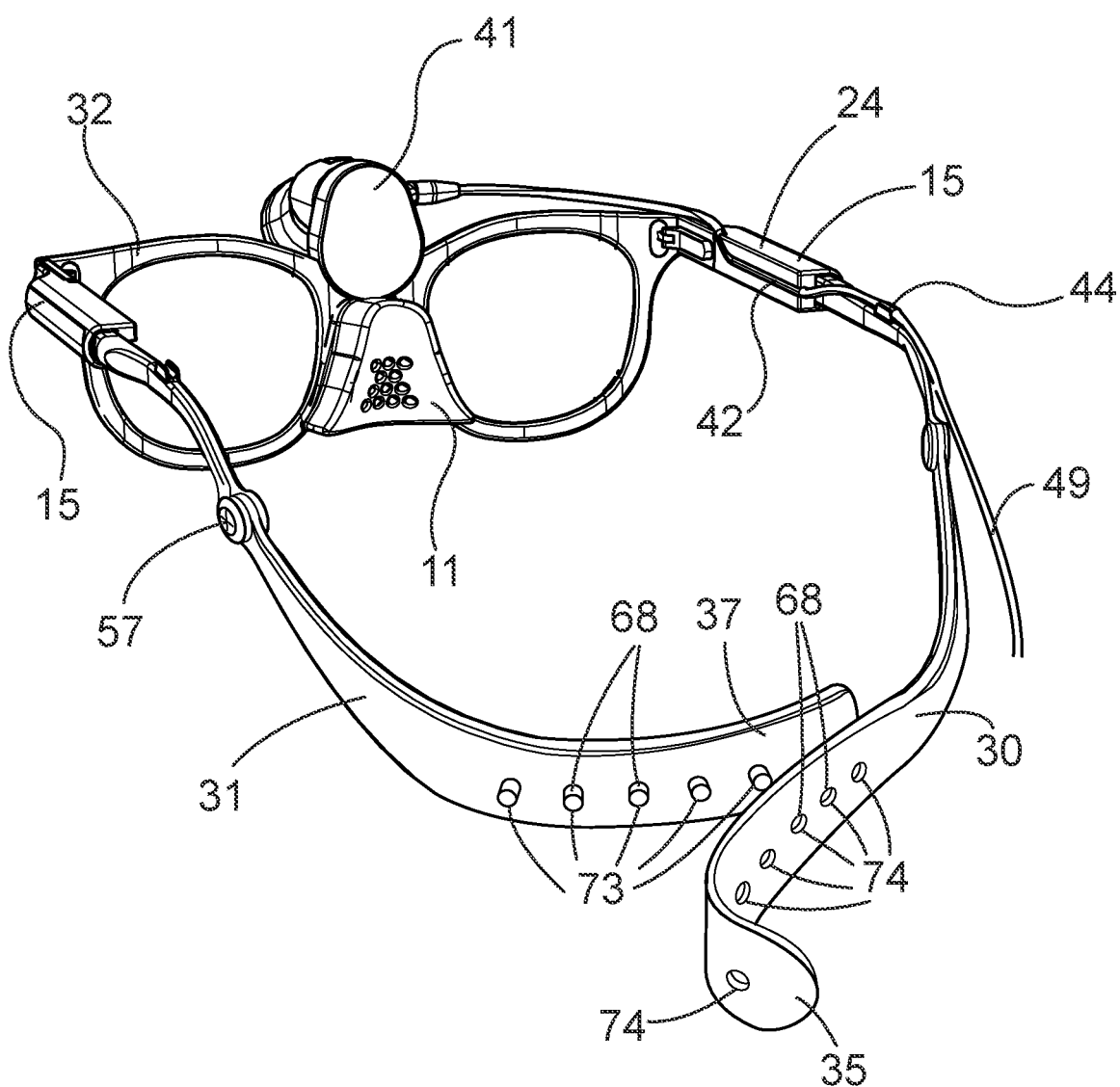
FIGS. 68-69 depict an exemplary embodiment of a slip-resistant eyewear system comprising first and second bow extension elements.
Figure 69:
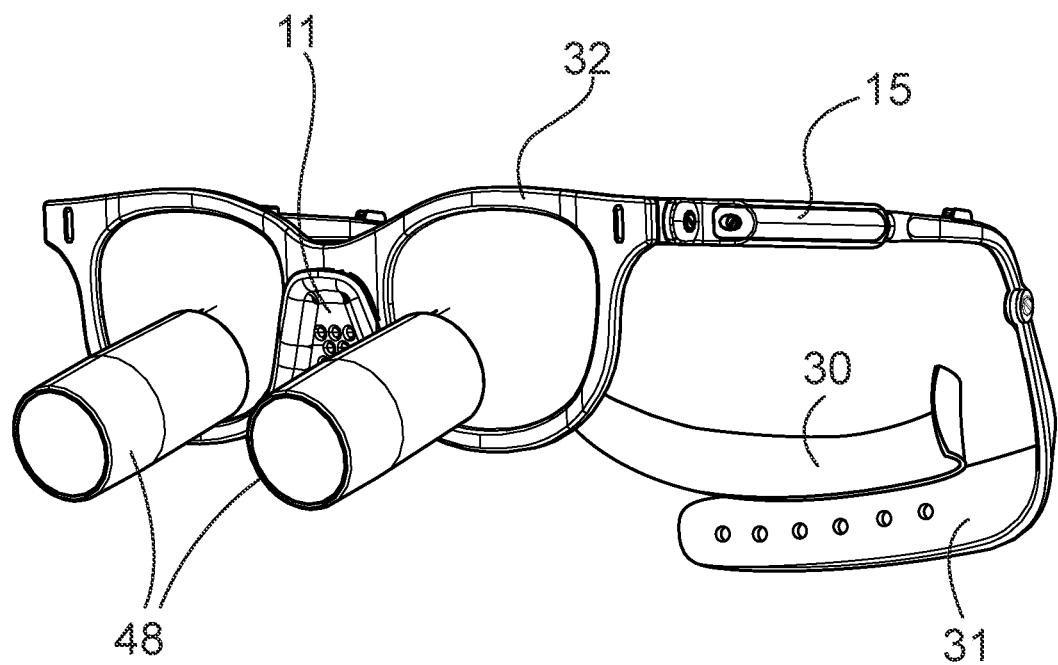
Figure 70:
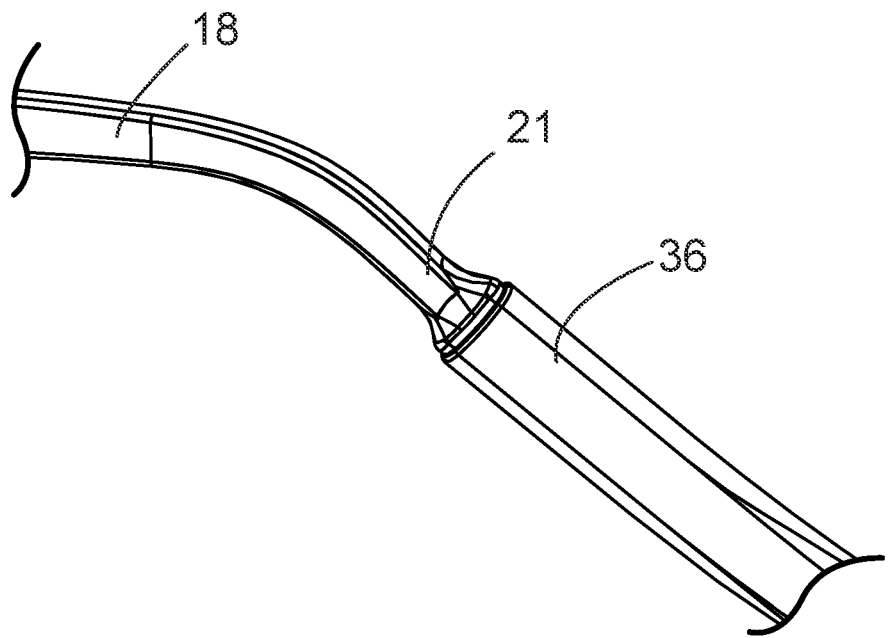
FIGS. 70-76 and 80-82 depict alternative embodiments of coupling a bow extension element to a second end of an eyewear bow.
Figure 71:
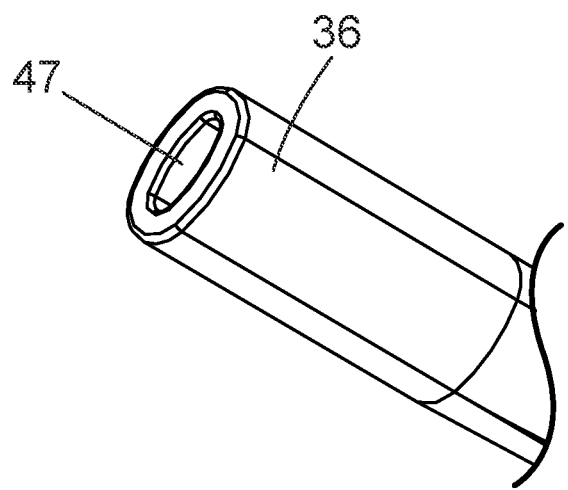
Figure 72:
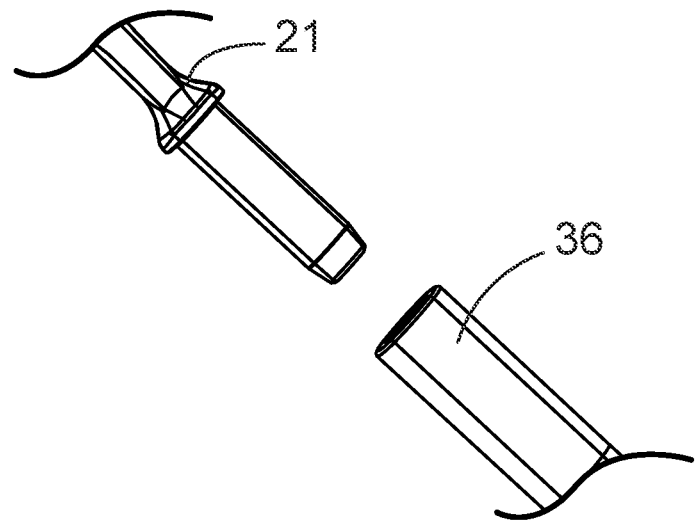
Figure 73:
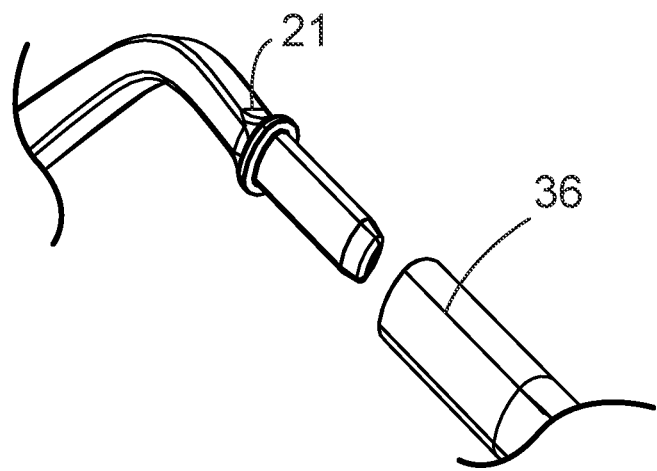
Figure 74:
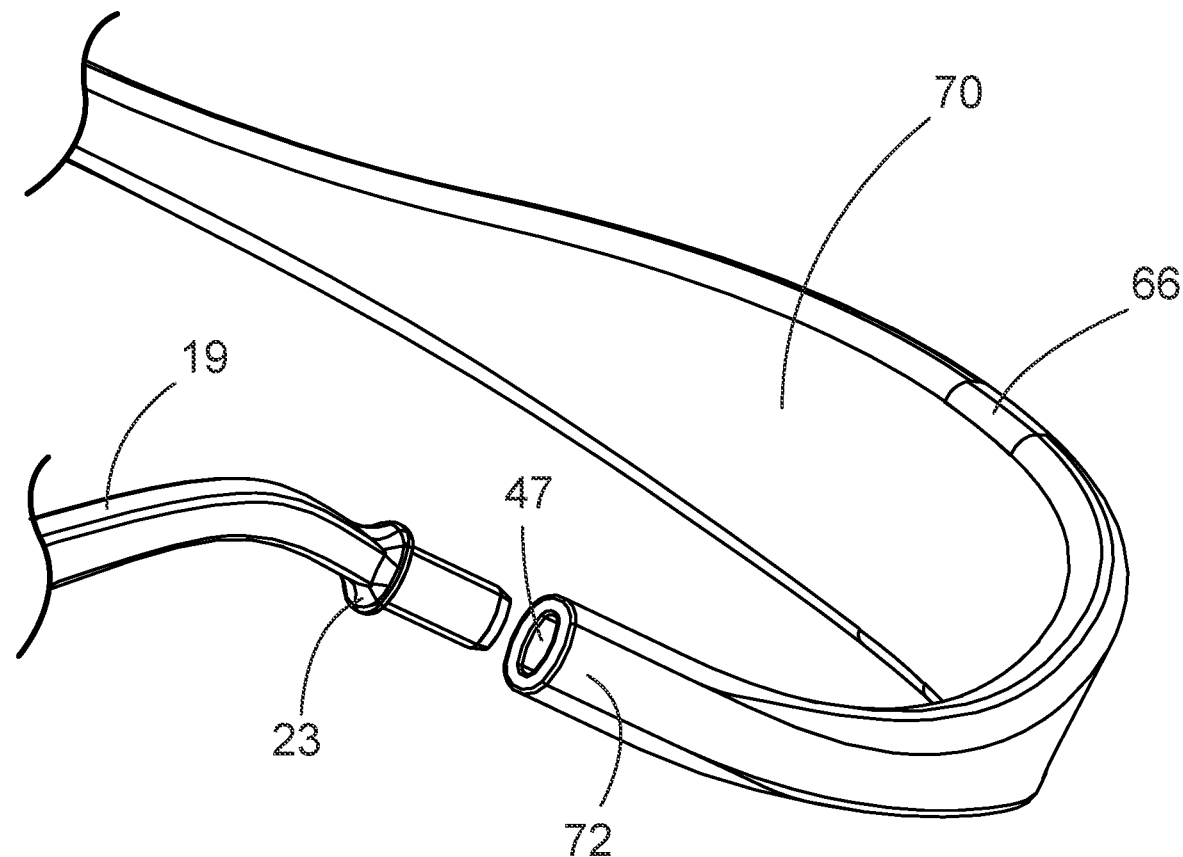
Figure 75:
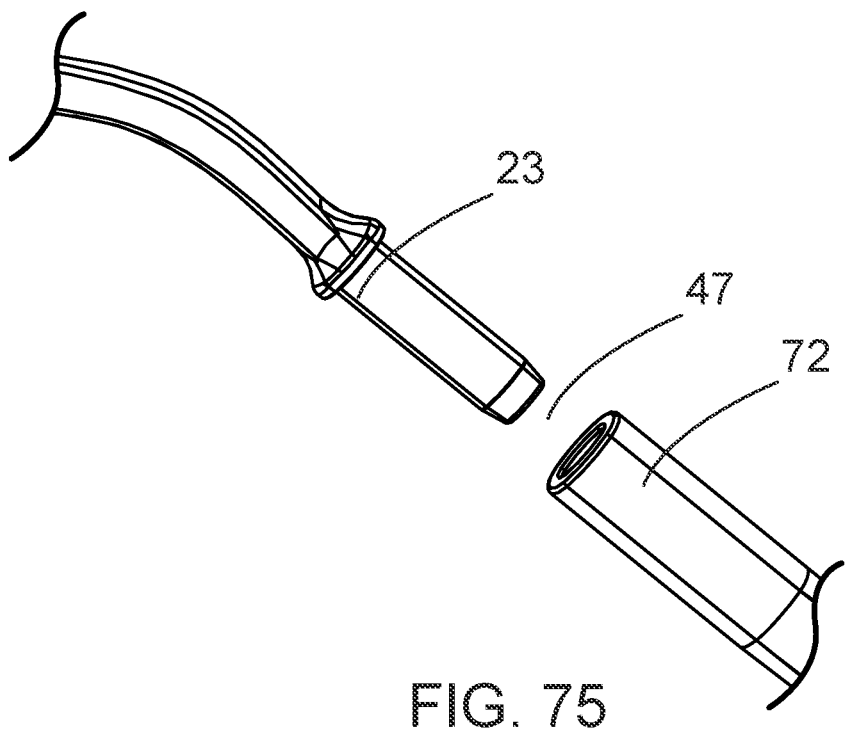
Figure 76:
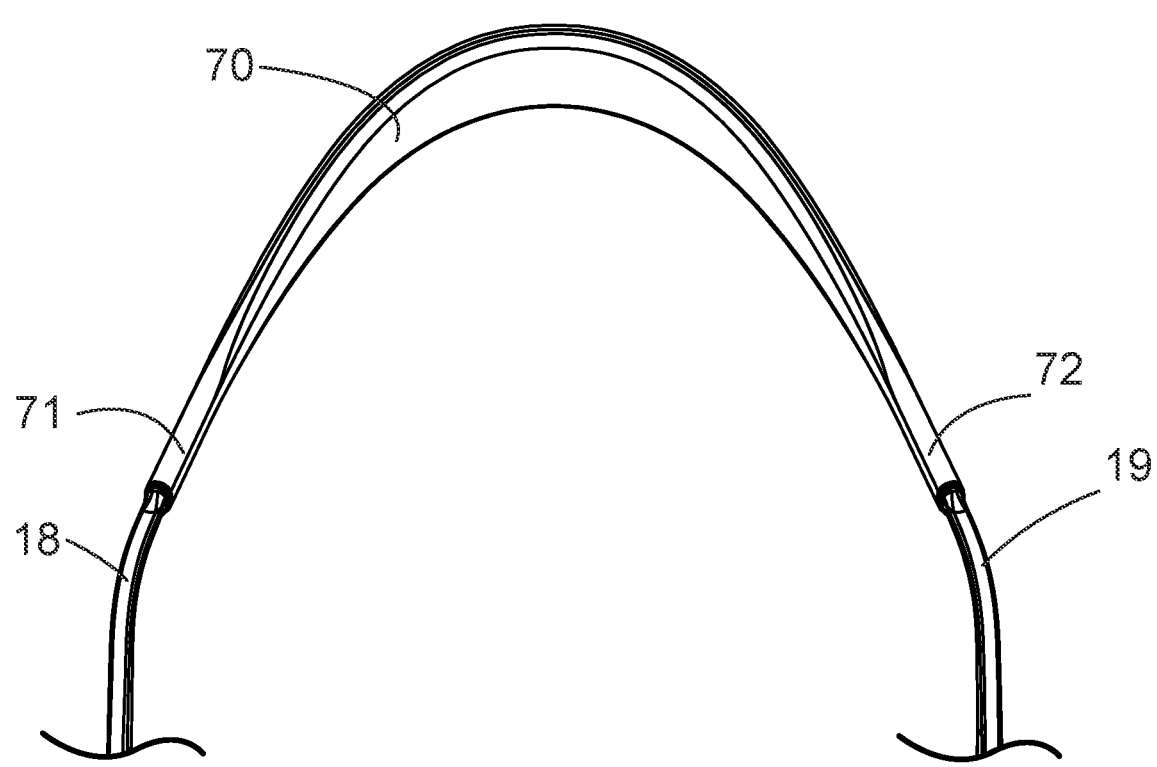

FIGS. 68-69 depict an alternative embodiment of an eyewear retainer 29 comprising first and second bow extension elements 30, 31. As shown, the eyewear retainer 29 may be detached from the eyewear frame 32 by removing the attachment screws 57 to allow for an eyewear retainer of different size or materials to be coupled to the first and second bows 18, 19 to provide optimal user comfort. At least one of the first or second bow extension elements 30, 31 comprise a plurality of fastening elements 69 that correspond to a plurality of mating fastening elements 69 on the opposite bow extension element 30, 31. The fastening elements may comprise a plurality of protrusions 73 located on the second bow extension element 31 and a plurality of mating openings 74 located on the first bow extension element 30. Alternatively, the first bow extension element 30 may comprise a plurality of protrusions 73 that mate with at least a portion of a plurality of openings 74 on the second bow extension element 31. Such a configuration may allow the user to adjust the desired tension of the eyewear retainer 29 when in use or to disengage the eyewear retainer 29 when use of the slip-resistant eyewear system 10 is not desired. While these fastening elements 68 may be located anywhere along the first and second bow extension elements 30, 31, as shown in FIG. 68, it may be preferable to located the fastening elements 68 substantially proximal the first ends 35, 37 of the first and second bow extension elements 30, 31.

While the following embodiments may be depicted in the figures as corresponding to an eyewear retainer 29 or a unitary eyewear retainer 70, it is intended that any such embodiments described may be used interchangeably with either an eyewear retainer 29 or a unitary eyewear retainer 70 and the term eyewear retainer is intended to encompass both eyewear retainer embodiments regardless of which eyewear retainer is depicted in the exemplary figures. FIGS. 70-76 provide structural examples of possible coupling mechanisms that may allow the eyewear retainer to detachably couple to the first and second bows 18, 19. As shown, in some embodiments, a narrowed or alternatively-shaped second end 21, 23 of either or both of the first and second bows 18, 19 may be configured to mate with an opening 47 of the second end 36, 38 of the first or second bow extension elements 30, 31 in a male-female coupling. Alternatively, as shown in FIGS. 80-83, the second end 21, 23 of the first or second bows 18, 19 may further comprise a plurality of notches 79, grooves, or protrusions configured to mate with a corresponding notch, groove, or other internal structure within an opening 72 of the first or second bow extension elements 30, 31. Depending on which notch or groove the user desires to use to secure the eyewear retainer 29 to the bows 18, 19, the eyewear retainer 29 may be tightened or loosened and locked into position according to the user's preferences.

Figure 78:
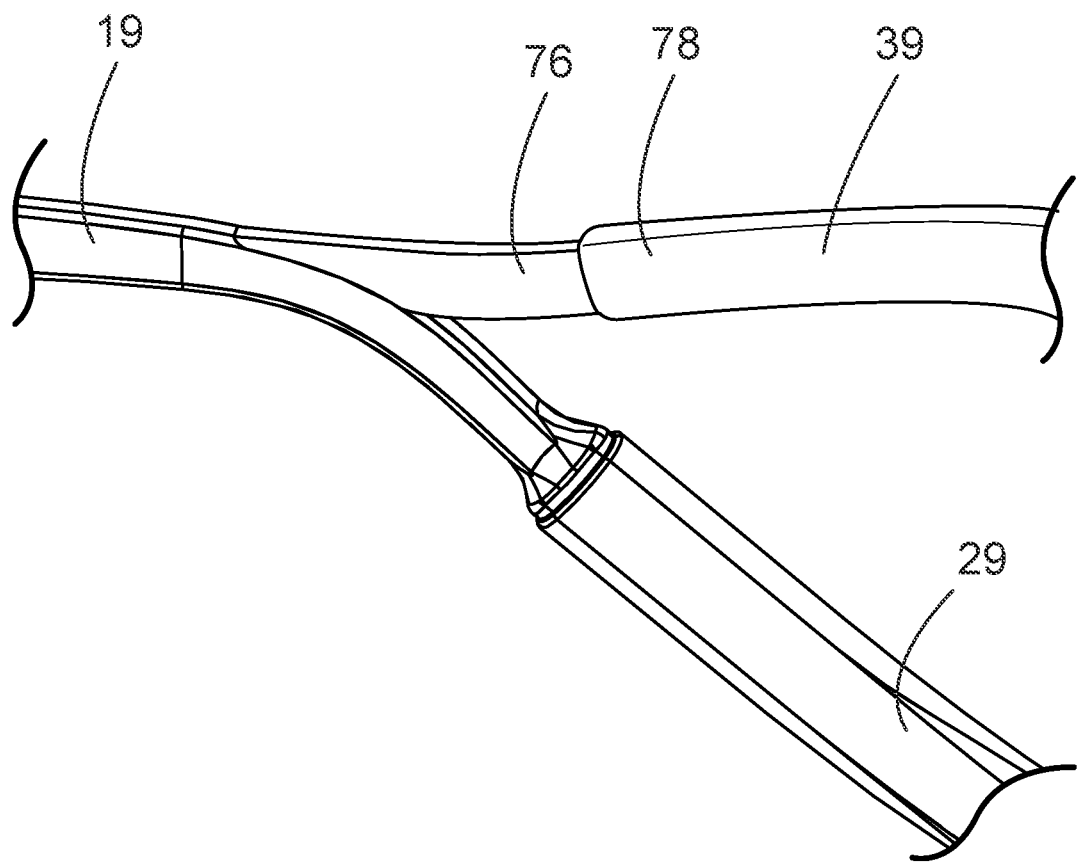
FIGS. 78-79 and 83 depict an alternative embodiment of a slip-resistant eyewear system comprising an eyewear retainer extension.
Figure 79:
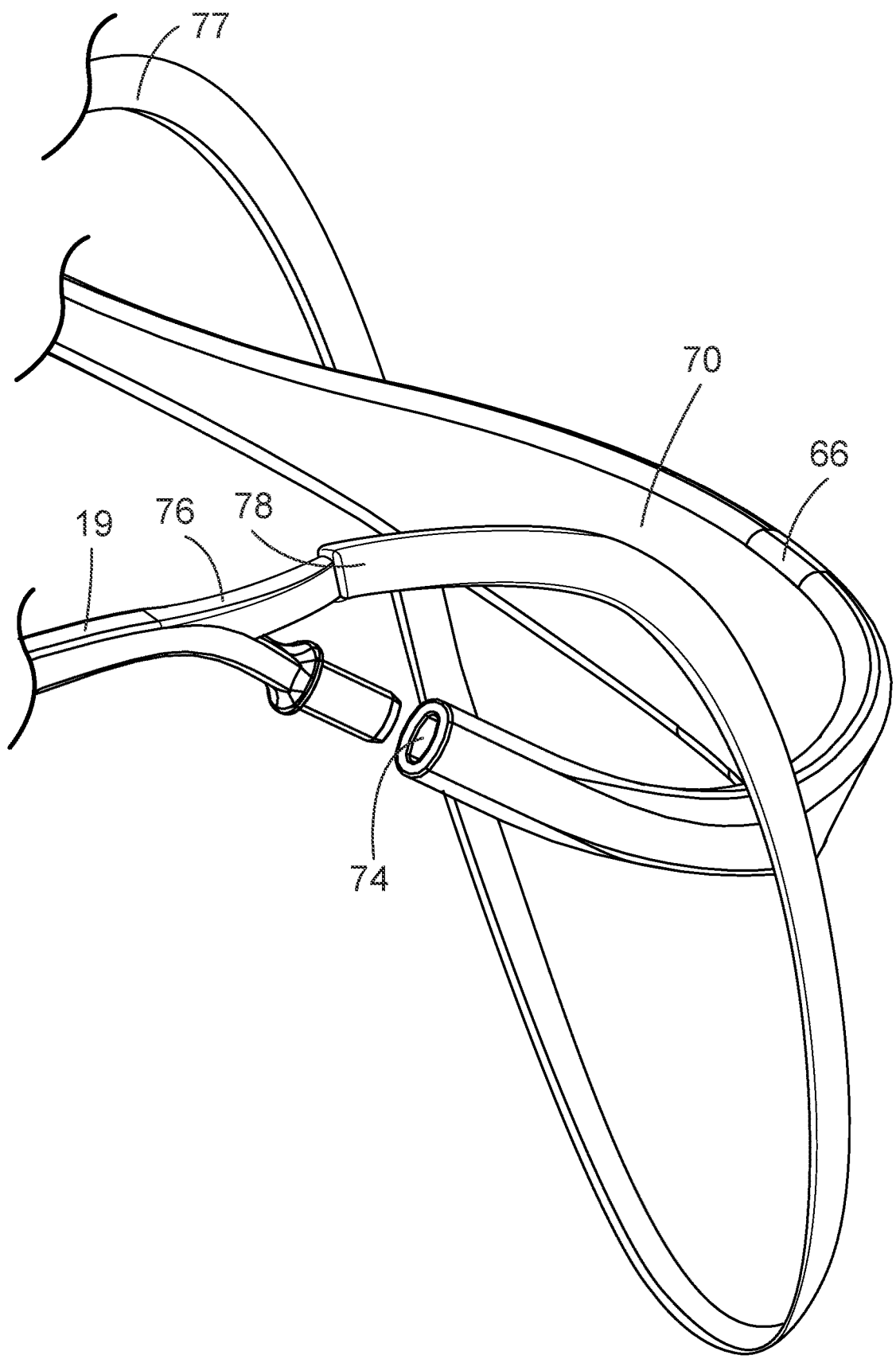
Figure 80:
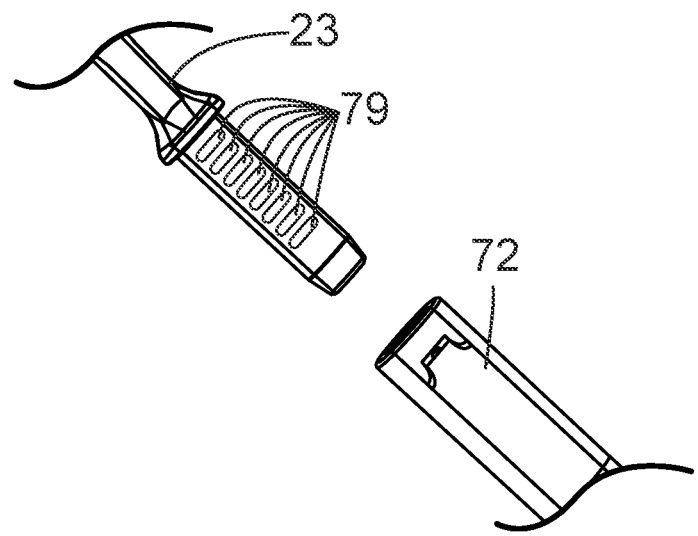
Figure 81:
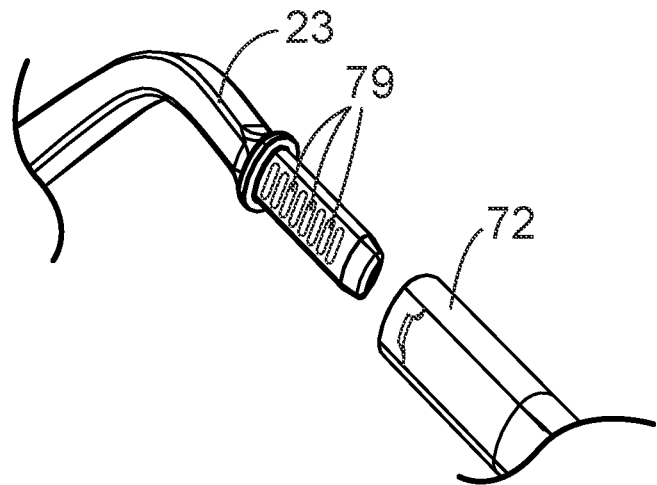
Figure 82:
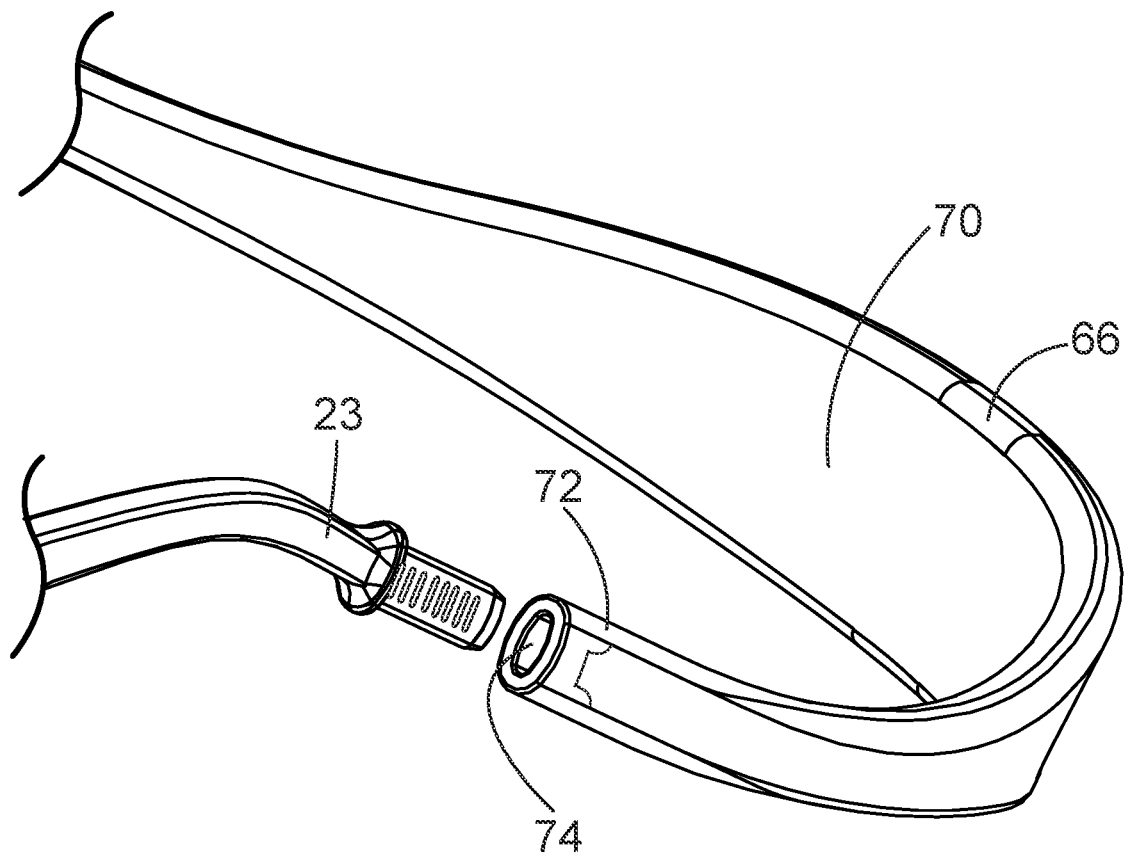
Figure 83:
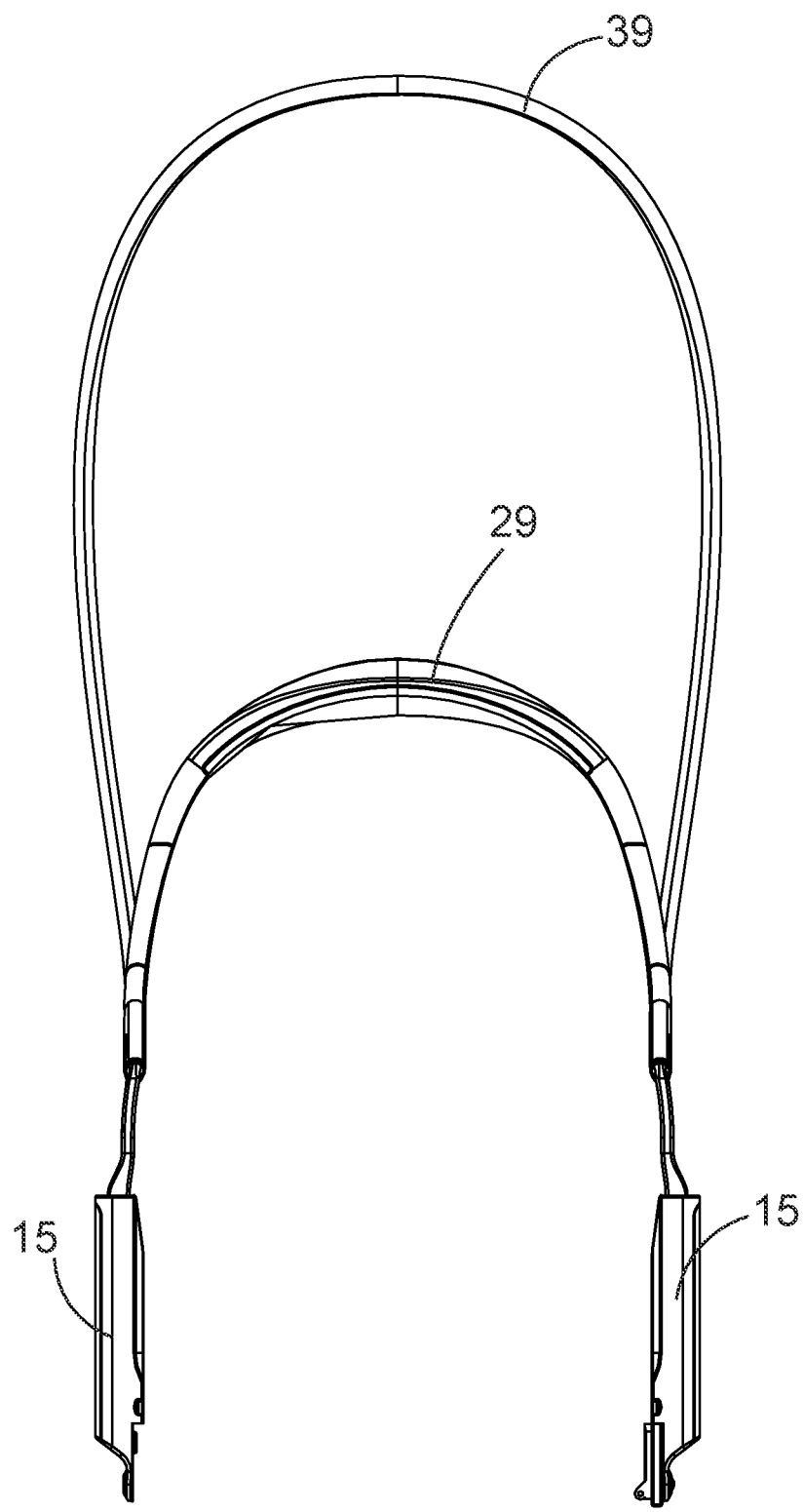
Figure 84:
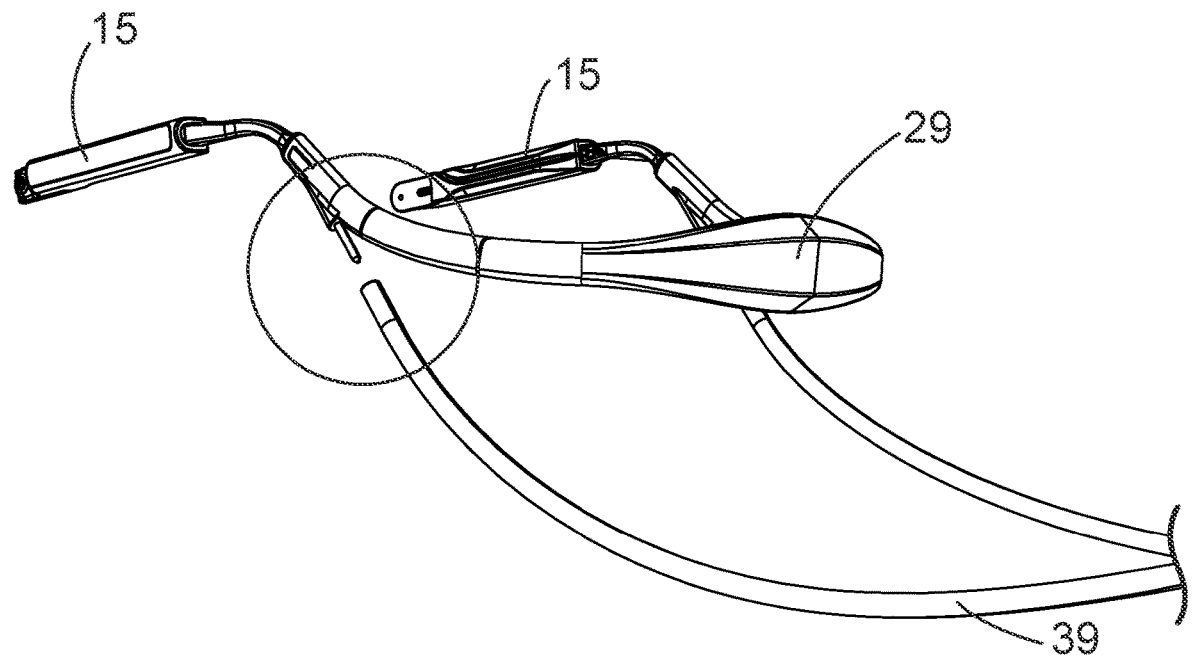
FIGS. 84-86 depict alternative embodiments of coupling an eyewear retainer extension to the slip-resistant eyewear system.
Figure 85:
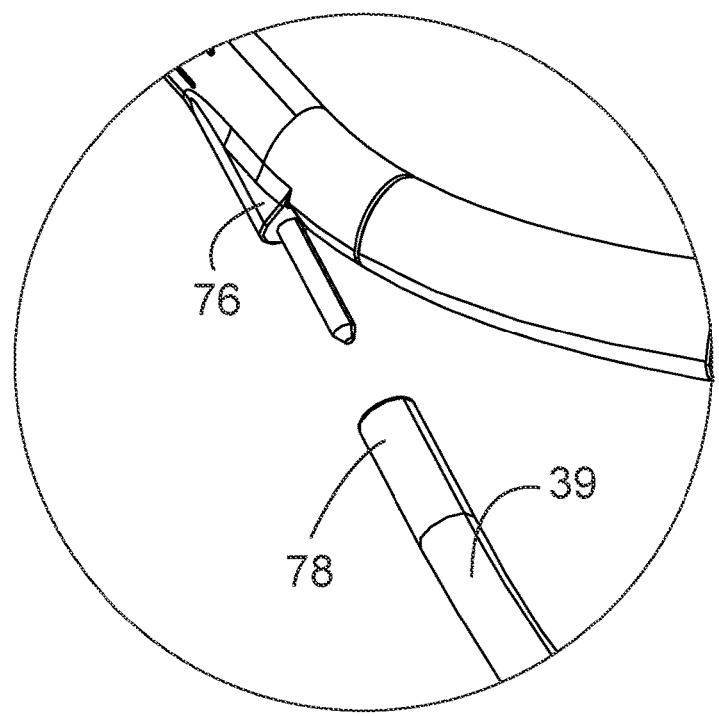
Figure 86:
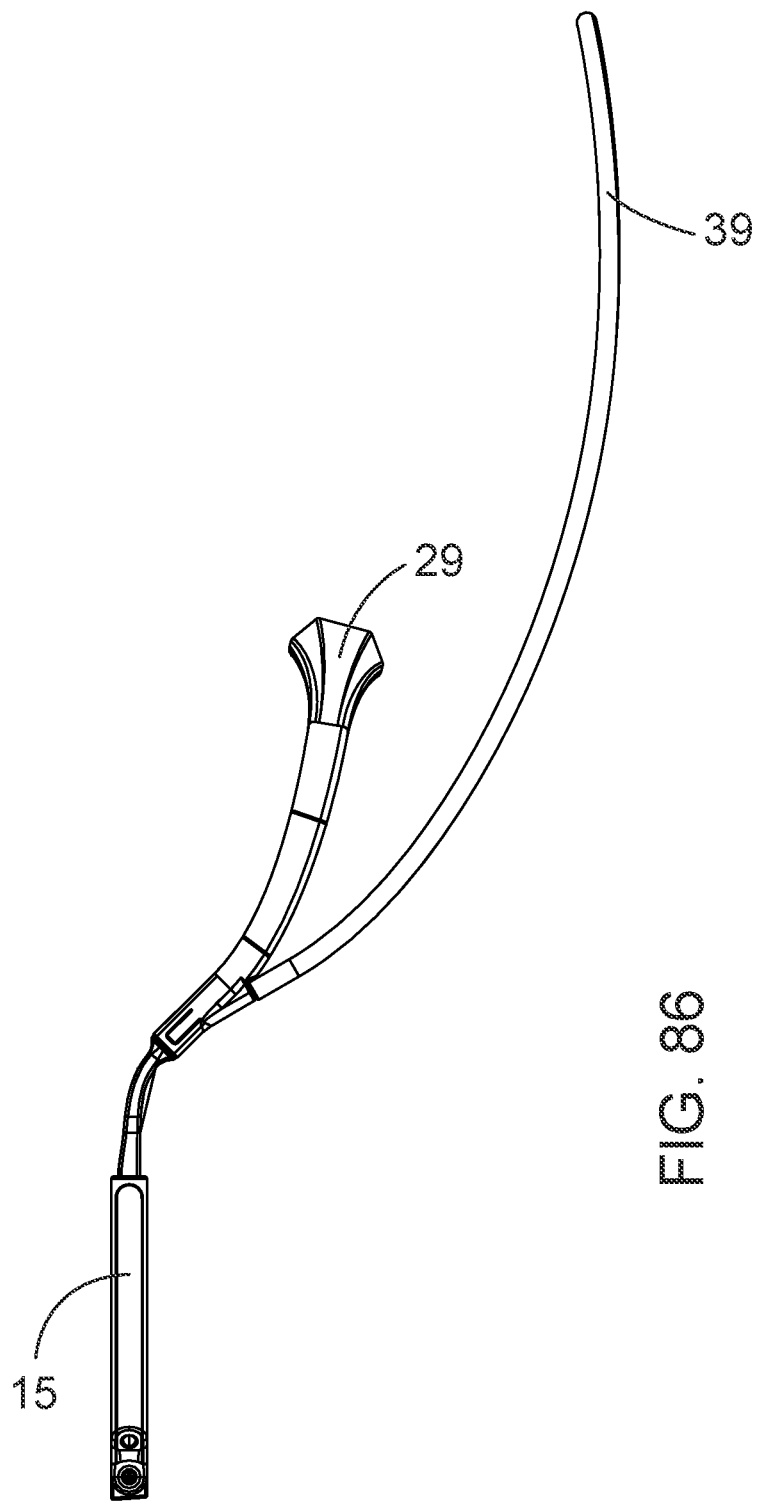

Turning now to FIGS. 78-79, some embodiments of the slip-resistant eyewear system 10 may comprise a secondary bow extension element 76 extending from one or both of the first and second bows 18, 19 or the first and second bow extension elements 30, 31. The secondary bow extension element 76 may be fixedly or detachably coupled to an eyewear retainer extension 39. As shown in FIG. 78, which depicts a secondary bow extension element 76 coupled to the second end 23 of the second bow 19, the eyewear retainer 29 may be detachably coupled to the second bow extension element 31. As shown in FIGS. 84-86, the eyewear retainer extension 39 may be detachably coupled to either or both of a first 77 and second end 78 of the eyewear retainer extension 39 using any of the same coupling mechanisms described above in association with the detachable eyewear retainer 29 or any other appropriate coupling structure.

Figure 77:
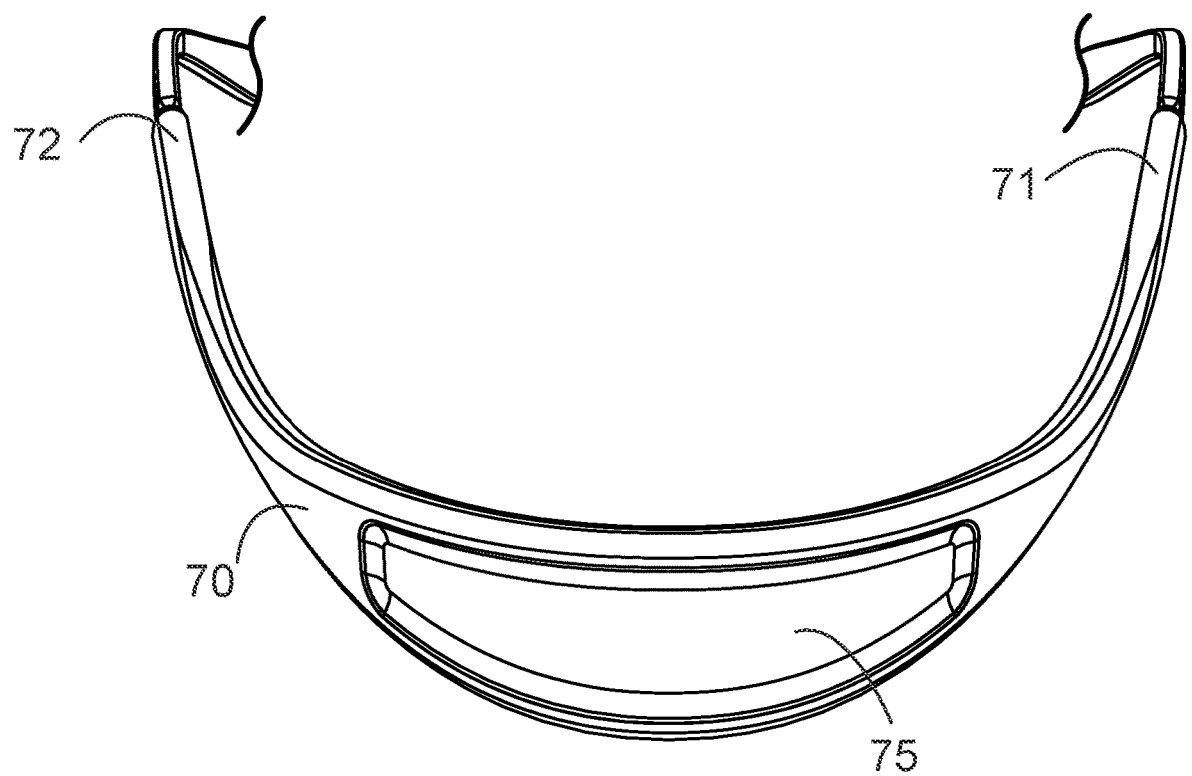
FIG. 77 depicts an alternative embodiment of an unitary eyewear retainer.

FIG. 77 depicts an embodiment of a unitary eyewear retainer 70 comprising an embellishment area 75 into which a logo, manufacturer's name, or other relevant information may be placed. It should also be noted that the counterweights 66 described above as related to earlier embodiments may also be used in conjunction with any of the embodiments of an eyewear retainer 20 or unitary eyewear retainer 70 described herein to provide a counterweighted force on the eyewear retainer 29, 70 to additionally prevent slippage of the slip-resistant eyewear system 10 when in use.

It is also contemplated that in embodiments in which it is desirable to couple one or more lights to the eyewear frame 32, in some such embodiments, an LED or other light 41 may be coupled to the frame 32 using a flexible wire having sufficient rigidity to maintain a position once a user bends and aims the light where desired.

In places where the description above refers to particular implementations of a slip-resistant eyewear system, it should be readily apparent that a number of modifications may be made without departing from the spirit thereof and that these implementations may be applied to other to systems and techniques for slip-resistant eyewear systems.

What is claimed is:

1. A slip-resistant eyewear system comprising:
    an angular adjustment screw configured to couple to a first hinge of an eyewear frame such that an angle of the eyewear frame is adjustable relative to a first bow of the eyewear frame, the first bow being coupled to the first hinge of the eyewear frame; and
    a unitary eyewear retainer comprising:
        a first end configured to couple to the first bow and a second end configured to couple to a second bow of the eyewear frame such that a tension is maintained on the unitary eyewear retainer when the unitary eyewear retainer extends around a back of a head of a user;
        wherein a distance between a longitudinal axis of the first bow and a longitudinal axis of the second bow remains constant before and after the angle of the eyewear frame is adjusted by the angular adjustment screw.

2. The slip-resistant eyewear system of claim 1, wherein the unitary eyewear retainer is configured to detach from the first and second bows.

3. The slip-resistant eyewear system of claim 1, further comprising an attachment screw configured to couple a second end of at least one of the first and second bows to at least one of the first and second ends of the unitary eyewear retainer.

4. The slip resistant eyewear system of claim 3, wherein the second end of at least one of the first and second bows and at least one of the first and second ends of the unitary eyewear retainer each comprise an attachment opening through which the attachment screw passes to couple the second end of the at least one of the first and second bows and the at least one of the first and second ends of the unitary eyewear retainer.

5. The slip-resistant eyewear system of claim 1, further comprising a light configured to couple to the eyewear frame.

6. The slip-resistant eyewear system of claim 5, wherein at least one of the first bow and the eyewear retainer comprises a channel configured to pass a power cord of the light there through.

7. The slip-resistant eyewear system of claim 1, further comprising at least one counterweight configured to couple to the unitary eyewear retainer.

8. The slip-resistant eyewear system of claim 1, further comprising an eyewear retainer extension coupled to and extending from at least one of the eyewear frame and the eyewear retainer, the eyewear retainer extension configured to retain the eyewear around a neck of a user when the eyewear retainer is disengaged.

9. The slip-resistant eyewear system of claim 8, wherein the eyewear retainer extension is configured to detach from the slip-resistant eyewear system.

10. The slip-resistant eyewear system of claim 9, further comprising at least one of a first secondary bow extension element and a second secondary bow extension element extending from the first and second bows, respectively, and configured to couple to first and second ends of the eyewear retainer extension, respectively.

11. The slip-resistant eyewear system of claim 10, wherein at least one of the first and second secondary bow extension elements is configured to mate within an opening of at least one of the first and second ends of the eyewear retainer extension.

12. The slip-resistant eyewear system of claim 1, further comprising a nosepiece comprising a nosepiece material configured to couple to a bridge of an eyewear frame.

13. The slip-resistant eyewear system of claim 1, further comprising a plurality of raised protrusions on an end of the first and second bows distal from the hinges and configured to mate with a plurality of openings in the first and second bow extension elements, respectively.

* * * * *